United States Patent [19]

Beck et al.

[11] Patent Number: 5,231,172

[45] Date of Patent: Jul. 27, 1993

[54] FIBER REACTIVE DYES WHICH CONTAIN A SULFONAMIDO-TRIAZINYL GROUP AND ONE OR TWO GROUPS OR THE VINYL SULFONE SERIES

[75] Inventors: Thomas Beck, Bad Soden am Taunus; Werner H. Russ, Flörsheim an Main; Wilhelm Mühlig, Frankfurt am Main, all of Fed. Rep. of Germany

[73] Assignee: Hoechst Aktiengesellschaft, Frankfurt am Main, Fed. Rep. of Germany

[21] Appl. No.: 964,516

[22] Filed: Oct. 21, 1992

[30] Foreign Application Priority Data

Oct. 23, 1991 [DE] Fed. Rep. of Germany ....... 4134892

[51] Int. Cl.⁵ .................... C09B 62/04; C09B 62/503; D06P 1/38
[52] U.S. Cl. ................................ 534/642; 534/617; 534/618; 534/629; 534/641; 540/126; 544/76; 544/189; 544/193.1; 544/197; 544/198; 8/549
[58] Field of Search ............... 534/617, 618, 629, 641, 534/642; 540/126; 544/76, 193.1, 197, 198

[56] References Cited

U.S. PATENT DOCUMENTS 4,740,592  4/1988  Springer et al. ................... 534/642
5,138,041  8/1992  Büch et al. .......................... 534/642

FOREIGN PATENT DOCUMENTS 0377166  7/1990  European Pat. Off. .
40-17113  8/1965  Japan .

OTHER PUBLICATIONS

Chemical Abstract, 58:11499h (1963).
Chemical Abstracts, 66: 3811a (1967).
Derwent Abstract No. 17113/65. (1965).

*Primary Examiner*—Mary C. Lee
*Assistant Examiner*—Fiona T. Powers

[57] ABSTRACT

There are described water-soluble fiber-reactive dyestuffs which possess a triazinylamino radical to which is bonded as second substituent an amino group or an N-containing heterocyclic group which, bonded via an arylene, alkylene or aralkyl radical, possesses a fiber-reactive grouping of the vinyl sulfone series, and to which is bonded as third substituent a sulfonamide group, wherein the sulfone radical is substituted by optionally substituted aryl, alkylenearyl or arylenealkyl or optionally substituted amino groups.

The dyestuffs are used for dyeing hydroxy - and/or carboxamido-containing material, in particular fiber material, such as cellulose fibers, wool and synthetic polyamide.

7 Claims, No Drawings

FIBER REACTIVE DYES WHICH CONTAIN A SULFONAMIDO-TRIAZINYL GROUP AND ONE OR TWO GROUPS OR THE VINYL SULFONE SERIES

The invention relates to the technical field of fiber-reactive dyestuffs.

Fiber-reactive dyestuffs which contain an s-triazine radical to which a fiber-reactive group from the vinyl sulfone series is bonded and in which the third substituent is an optionally substituted amino group are known from U.S. Pat. No. 4,740,592, European Patent Application Publication No. 0,377,166 and from the Japanese Patent Publication Sho-40-17113.

The practice of dyeing using reactive dyestuffs has recently led to increased requirements being imposed on the quality of the dyeings and the efficiency of the dyeing process. There consequently continues to be a need for novel reactive dyestuffs which have improved properties, not only in respect of the fastnesses, and in particular exhibit a high degree of fixing on the material to be dyed and yield strong dyeings. Furthermore, there is an increasing demand for dyestuffs which give high-quality discharge and resist prints.

In discharge printing, a discharge agent is printed onto a dyed web of material (the ground shade) in a desired pattern; the discharge agent destroys the dyestuff, provided the dyestuff is dischargeable, so that, on completion of the discharge process, a white pattern appears on the dyeing (white discharge). If the discharge print additionally contains a discharge-stable dyestuff, then, after the discharge process has been completed and the customary treatment for fixing this admixed dye, a printed pattern is obtained on the ground shade in a different color (colored discharge).

In resist printing, the fabric is first printed with a suitable resist agent in a desired pattern. The fabric preprinted in this way is then cross-dyed (overpadded or overprinted) with a dyestuff which is capable of binding with the resist agent and therefore is no longer capable of becoming fixed to the fabric, with the consequence that no fixing of the dyestuff occurs on the resist-printed areas and the resulting dyeing (print) thus has a white pattern corresponding to the pattern of the resist agent.

Novel water-soluble dyestuffs which have these good properties have now been discovered with the present invention, these dyestuffs corresponding to the following general formula (1)

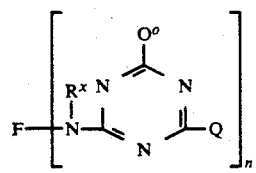
(1)

In formula (1):

F is the radical of a monoazo, disazo or polyazo dyestuff or of a heavy metal complex azo dyestuff derived therefrom, or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dyestuff;

$R^x$ is a hydrogen atom or an alkyl group having 1 to 4 carbon atoms, such as the methyl or ethyl group, which can be substituted by halogen, such as chlorine and bromine, hydroxy, cyano, alkoxy having 1 to 4 carbon atoms, such as methoxy and ethoxy, alkoxycarbonyl having 2 to 5 carbon atoms, carboxy, sulfamoyl, sulfo or sulfato, preferably the methyl or ethyl group and in particular a hydrogen atom;

n is the number 1 or 2, preferably 1; and

Q is a group of the general formula (2a) or (2b)

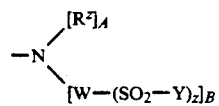
(2a)

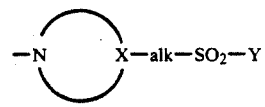
(2b)

in which $R^z$ is a hydrogen atom or an alkyl group having 1 to 4 carbon atoms, such as, in particular, the methyl or ethyl group, which can be substituted by halogen, such as chlorine and bromine, hydroxy, cyano, alkoxy having 1 to 4 carbon atoms, such as methoxy and ethoxy, carboxy, sulfamoyl, sulfo or sulfato or by a phenyl radical which is optionally substituted by substituents from the group comprising halogen, such as chlorine and bromine, alkoxy having 1 to 4 carbon atoms, such as methoxy and ethoxy, alkyl having 1 to 4 carbon atoms, such as methyl, sulfo and carboxy, or is a cyclohexyl radical or a phenyl radical which is optionally substituted by substituents from the group comprising halogen, such as chlorine and bromine, alkoxy having 1 to 4 carbon atoms, such as methoxy and ethoxy, alkyl having 1 to 4 carbon atoms, such as methyl, sulfo and carboxy, W is an optionally substituted arylene radical or an alkylene-arylene or arylene-alkylene or alkylene-arylene-alkylene or arylene-alkylene-arylene radical, in which the alkylene radicals are those having 1 to 8 carbon atoms, preferably 2 to 6 carbon atoms and in particular 2 to 4 carbon atoms and can be substituted and the arylene radicals are optionally substituted phenylene or naphthylene radicals, and in which the alkylene radicals can be interrupted by 1 or more, such as 2 or 3, hetero groups, such as groups of the formulae —NH—, —N(R)— with R being alkyl having 1 to 4 carbon atoms which can be substituted by sulfo, sulfato, carboxy or phosphato, —SO$_2$—, —CO—, —NH—SO$_2$—, —NH—CO—, —SO$_2$—NH— and —CO—NH—, and the alkylene and arylene portions in the combined alkylene/arylene radicals can in each case be separated from one another by such a hetero group, Y is the vinyl group or a β-sulfatoethyl, β-thiosulfatoethyl or β-phosphatoethyl group or a β-alkanoyloxy-ethyl group having 2 to 5 carbon atoms in the alkanoyl radical, such as the β-acetoxyethyl group, or the β-benzoyloxy-ethyl, β-(sulfobenzoyloxy)-ethyl or β-(p-toluenesulfonyloxy)-ethyl group or a β-halogenoethyl group, such as the β-bromoethyl or β-chloroethyl group, preferably the vinyl group and in particular the β-sulfatoethyl group, z is the number 1 or 2, A is the number zero or 1 and B is the number 1 or 2, in which the sum of (A+B) equals the number 2, and in which, in the case where B is 2, the groups of the formula —W—(SO$_2$—Y)$_z$ can have the same meaning as one another or a different meaning to one another, X together with the N atom forms the bivalent radical of a heterocyclic ring consisting of 1 or 2 alkylene groups having 1 to 5 carbon atoms and optionally 1 or 2 hetero groups, such as nitrogen and oxygen atoms or a group —NH—, such as, for example, the piperazin-1,4-ylene or a piperidinylene radical, and alk is an alkylene radical having 1 to 4 carbon atoms, preferably 2 or 3 carbon atoms, such as the ethylene or n-propylene radical;

Q° is group of the general formula (2A)

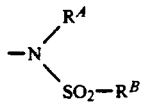

(2A)

in which $R^A$ is a hydrogen atom or an alkyl group of 1 to 4 carbon atoms, such as methyl or ethyl, which can be substituted, for example by halogen, such as chlorine or bromine, hydroxy, cyano, alkoxy of 1 to 4 carbon atoms, such as methoxy or ethoxy, alkoxycarbonyl of 2 to 5 carbon atoms, carboxy, sulfamoyl, sulfo or sulfato, or is an aryl radical, such as naphthyl or phenyl, which can be substituted, for example by substituents selected from the group consisting of halogen, such as chlorine or bromine, alkoxy of 1 to 4 carbon atoms, such as methoxy or ethoxy, alkyl of 1 to 4 carbon atoms, such as methyl or ethyl, sulfo and carboxy, but preferably is methyl or ethyl and particularly preferably hydrogen, and $R^B$ is an optionally substituted aryl, alkylenearyl, arylenealkyl, alkylenearylenealkyl or arylenealkylenearyl radical, wherein the optionally substituted alkylene radicals are those of 1 to 8 carbon atoms, preferably 2 to 6 carbon atoms, in particular of 2 to 4 carbon atoms, and the optionally substituted alkyl radicals are those of 1 to 6 carbon atoms, preferably 1 to 4 carbon atoms, in particular methyl or ethyl, and the arylene radicals and aryl radicals are respectively optionally substituted phenylene or naphthylene radicals or phenyl or naphthyl radicals, and wherein the alkylene radicals or alkyl radicals can be interrupted by 1 or more, such as 2 or 3, hetero groups, such as groups of the formulae —NH—, —N(R)—, where R is alkyl of 1 to 4 carbon atoms, which can be substituted by sulfo, sulfato, carboxy or phosphato, or —O—, —S—, —SO$_2$—, —CO—, —N-H—SO$_2$—, —NH—CO—, —SO$_2$—NH— and —CO—NH—, preferably amino or oxygen, and wherein the alkylene, alkyl, arylene and aryl moieties in the combined alkyl(ene)/aryl(ene) radicals can each be separated from one another by such a hetero group, or $R^B$ is an amino group of the general formula —NR$^C$R$^D$, where R$^C$ and R$^D$ are each independently of one another hydrogen or alkyl of 1 to 4 carbon atoms which can be substituted by sulfo, carboxy, sulfato, phenyl, cyano, nitro, chlorine or bromine, or is an optionally methyl-monosubstituted, -disubstituted or -trisubstituted cycloalkyl radical of 5 to 8 carbon atoms, such as, for example, cyclopentylene and cyclohexylene, or is an optionally sulfo-monosubstituted, -disubstituted or -trisubstituted naphthyl radical or a phenyl radical which can be substituted by 1 to 3 substituents, preferably 1 or 2 substituents, selected from the group consisting of alkyl of 1 to 4 carbon atoms, such as methyl or ethyl, alkoxy of 1 to 4 carbon atoms, such as methoxy or ethoxy, halogen, such as chlorine or bromine, carboxy, nitro and sulfo.

F is preferably the radical of a mono- or disazo dyestuff or the radical of a metal complex azo dyestuff, such as an o,o'-1:1-copper complex mono- or disazo dyestuff, or of a triphendioxazine or an anthraquinone, copper formazan or a phthalocyanine dyestuff, such as a nickel or copper phthalocyanine dyestuff.

The radical F can contain the substituents customary in organic dyestuffs, including fiber-reactive groups, such as, for example, those of the formula —SO$_2$—Y defined above, bonded in its basic structure. Examples of such substituents are: alkyl groups having 1 to 4 carbon atoms, such as methyl, ethyl, propyl, isopropyl or butyl, and of these preferably ethyl and in particular methyl; alkoxy groups having 1 to 4 carbon atoms, such as methoxy, ethoxy, propoxy, isopropoxy and butoxy, and of these preferably ethoxy and in particular methoxy; acylamino groups having 2 to 8 carbon atoms, such as the acetylamino, propionylamino or benzoylamino group; primary and mono- or disubstituted amino groups, such as, for example, amino groups substituted by alkyl groups having 1 to 4 carbon atoms and/or phenyl groups, such as monoalkylamino and dialkylamino groups having 1 to 4 carbon atoms in the alkyl radical and phenylamino or N-($C_1$-$C_4$-alkyl)-N-phenyl-amino groups, in which the alkyl radicals can also be substituted, for example by phenyl, sulfophenyl, hydroxy, sulfato, sulfo and carboxy, and the phenyl groups can also be substituted, such as by chlorine, sulfo, carboxy, methyl and/ or methoxy, thus, for example, methylamino, ethylamino, propylamino, isopropylamino, butylamino, N,N-di-(β-hydroxyethyl)amino, N,N-di-(β-sulfatoethyl)-amino, sulfobenzylamino, N,N-di-(sulfobenzyl)-amino and diethylamino groups, as well as phenylamino and sulfophenylamino groups; alkoxycarbonyl groups with an alkyl radical having 1 to 4 carbon atoms, such as methoxycarbonyl and ethoxycarbonyl; alkylsulfonyl groups having 1 to 4 carbon atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl having 1 to 4 carbon atoms, it being possible for the alkyl radicals in turn to be substituted, such as, for example, by hydroxy, sulfato, sulfo, carboxy, phenyl and sulfophenyl, such as, for example, N-methyl-carbamoyl and N-ethyl-carbamoyl; sulfamoyl groups, which can be mono- or disubstituted by alkyl groups having 1 to 4 carbon atoms, and N-phenyl-N-alkylsulfamoyl groups with an alkyl group having 1 to 4 carbon atoms, it being possible for these alkyl groups in turn to be substituted by hydroxy, sulfato, sulfo, carboxy, phenyl and sulfophenyl, such as, for example, N-methyl-sulfamoyl, N-ethyl-sulfamoyl, N-propyl-sulfamoyl, N-isopropyl-sulfamoyl, N-butylsulfamoyl, N-(β-hydroxyethyl)-sulfamoyl and N,N-di-(β-hydroxyethyl)-sulfamoyl; N-phenyl-sulfamoyl, ureido, hydroxy, carboxy, sulfomethyl and sulfo groups; and β-sulfatoethylsulfonyl, β-thiosulfatoethylsulfonyl, β-phosphatoethylsulfonyl, β-acetoxyethylsulfonyl, β-chloroethylsulfonyl and vinylsulfonyl groups.

The dyestuff radical F is preferably substituted by one or more, such as 2 to 4, sulfo groups, and furthermore can preferably contain substituents selected from the group comprising sulfo, methyl, ethyl, methoxy, ethoxy, alkanoylamino having 2 to 5 carbon atoms, such as acetylamino, benzoylamino, amino, chlorine, bromine, ureido, hydroxy, carboxy and sulfomethyl.

The fiber-reactive radical F can also contain other fiber-reactive groups which are known from the literature and do not correspond to the structure of the general formula (3)

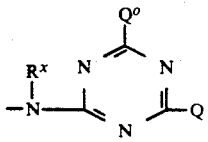
(3)

in which $R^x$, Q and $Q°$ have the abovementioned meanings. Examples of such known fiber-reactive groups are a group of the vinylsulfone series, such as the group, already mentioned above, of the formula $—SO_2—Y$, where Y has the above meaning, which can be bonded to F via an alkylene radical having 1 to 4 carbon atoms, such as a methylene group, or via a methylamino or ethylamino, or are a low molecular weight alkenoylamino or alkenesulfonylamino radical substituted by an atom which can be split off or a group which can be split off, or are a cyclic, carbocyclic-heterocyclic or heterocyclic radical which is substituted by an atom which can be split off or a group which can be split off and is bonded to the radical F via a carbonylamino or sulfonylamino group, the heterocyclic portions of these radicals being four-, five- or six-membered, or are a triazinyl or pyrimidinyl radical bonded to the radical F via an amino, methylamino or ethylamino group and substituted via an atom which can be split off or a group which can be split off. Examples of such radicals are a halogen-substituted six-membered heterocyclic radical bonded via an amino, methylamino or ethylamino group, such as, for example, a halogenotriazinyl or halogenopyrimidinyl radical, or aliphatic acylamino radicals, such as a halogenoacetylamino or halogenopropionylamino radical.

Examples of formula radicals $R^x$ are: hydrogen, methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, β-bromopropyl, -hydroxyethyl, β-hydroxybutyl, β-cyanoethyl, sulfomethyl, β-sulfoethyl, amidosulfonylmethyl and β-sulfatoethyl.

Examples of formula radicals $R^z$ are: hydrogen, methyl, ethyl, carboxymethyl, carbomethoxymethyl, carbethoxymethyl, sulfomethyl, sulfamidomethyl, β-carboxyethyl, β-sulfoethyl, n-propyl, β-carboxypropyl, β-sulfatoethyl, β-ethoxyethyl, β-methoxypropyl, γ-chloropropyl, γ-bromopropyl, n-butyl, isobutyl, n-pentyl, n-hexyl, n-nonyl, n-dodecyl, n-hexadecyl, n-pentadecyl, cyclohexyl, phenyl, 2-chlorophenyl, 3-chlorophenyl, 4-chlorophenyl, 2- or 3- or 4-sulfophenyl, 2-methyl-phenyl, 4-methoxy-phenyl, 3-methyl-phenyl and 4-ethyl-phenyl. Of these, the optionally substituted alkyl groups are preferred, and the methyl and ethyl group and the hydrogen atom are particularly preferred.

Examples of groups of the general formula (2a) and (2b) are, for example: 2-(β-sulfatoethylsulfonyl)-phenylamino, 3-(β-sulfatoethylsulfonyl)-phenyl-amino, 4-(β-sulfatoethylsulfonyl)-phenyl-amino, 2-carboxy-5-(β-sulfatoethylsulfonyl)-phenyl-amino, 2-chloro-3-(β-sulfatoethylsulfonyl)-phenyl-amino, 2-chloro-4-(β-sulfatoethylsulfonyl)-phenyl-amino, 2-ethoxy-4- or -5-(β-sulfatoethylsulfonyl)-phenyl-amino, 2-ethyl-4-(β-sulfatoethylsulfonyl-phenyl-amino, 2-methoxy-5-(β-sulfatoethylsulfonyl)-phenyl-amino, 2,4-diethoxy-5-(β-sulfatoethylsulfonyl)-phenyl-amino, 2,4-dimethoxy-5-(β-sulfatoethylsulfonyl)-phenyl-amino, 2,5-dimethoxy-4-(β-sulfatoethylsulfonyl)-phenyl-amino, 2-methoxy-5-methyl-4-(β-sulfatoethylsulfonyl)-phenyl-amino, 2- or 3-or 4-(β-thiosulfatoethylsulfonyl)-phenyl-amino, 2-methoxy-5-β-thiosulfatoethylsulfonyl)-phenyl-amino, 2-sulfo-4-( -phosphatoethylsulfonyl)-phenyl-amino, 2-sulfo-4-vinylsulfonyl-phenyl-amino, 2-hydroxy-4- or -5-(β-sulfatoethylsulfonyl)-phenyl-amino, 2-chloro-4- or -5-(β-chloroethylsulfonyl)-phenyl-amino, 2-hydroxy-3-sulfo-5-(β-sulfatoethylsulfonyl)-phenyl-amino, 3- or 4-(β-acetoxyethylsulfonyl)-phenyl-amino, 2-methoxy-4-[β-(N-methyl-tauryl)-ethylsulfonyl]-phenyl-amino, 5-(β-sulfatoethylsulfonyl)naphth-2-yl-amino, 6- or 7- or 8-(β-sulfatoethylsulfonyl)-naphth-2-yl-amino, 6-(β-sulfatoethylsulfonyl)-1-sulfo-naphth-2-yl-amino, 5-(β-sulfatoethylsulfonyl)-1-sulfo-naphth-2-yl-amino, 8-(β-sulfatoethylsulfonyl)-6-sulfo-naphth-2-yl-amino, -[4-(β',-sulfatoethylsulfonyl)-phen]-ethylamino, -[2-sulfo-4-(β'-sulfatoethylsulfonyl)-phen]-ethylamino, β-(β'-chloroethylsulfonyl)-ethylamino, β-(β'-sulfatoethylsulfonyl)ethylamino, β-(vinylsulfonyl)-ethylamino, γ-(β'-chloroethylsulfonyl) propylamino, γ-(β'-sulfatoethylsulfonyl)propylamino, γ-(β'-bromoethylsulfonyl)-propylamino, γ-(vinylsulfonyl)-propylamino, 1-methyl-1-(β-sulfatoethylsulfonyl)-1-ethylamino, δ-(β'sulfatoethylsulfonyl)butylamino, 2-methyl-2-(β-chloroethylsulfonyl)-1-propylamino, ω-(β'-chloroethylsulfonyl)-pentylamino, β-(β'-chloroethylsulfonyl)-n-hexylamino, N-methyl-N-[β-(β'-chloroethylsulfonyl)-ethyl]-amino, N-ethyl-N-[β-(β'-chloroethylsulfonyl)-ethyl]-amino, N-n-propyl-N-[β-(β'-chloroethylsulfonyl)-ethyl]-amino, N-n-butyl-N-[β-(β'-chloroethylsulfonyl)-ethyl]-amino, N-n-pentyl-N-[β-(β-chloroethylsulfonyl)-ethyl]-amino, N-n-hexyl-N-[β-(β'-chloroethylsulfonyl)-ethyl]-amino, N-n-nonyl-N [β-(β'-chloroethylsulfonyl)-ethyl]-amino, N-n-dodecyl-N-[β-(β'-chloroethylsulfonyl)-ethyl]-amino, N-n-hexadecyl-N-[β-(β'-chloroethylsulfonyl)-ethyl]-amino, N-n-octadecyl-N-[β-(β'-chloroethylsulfonyl)-ethyl]-amino, N-carboxymethyl-N-[β-(β'-bromoethylsulfonyl)-ethyl]-amino, N-sulfatomethyl-N-[β-(β'-chloroethylsulfonyl)-ethyl]-amino, N-(β-carboxyethyl)-N-[γ'-(β"-chloroethylsulfonyl)propyl]-amino, N-(β-sulfatoethyl)-N-[γ'-(β"-chloroethylsulfonyl)-propyl]-amino, N-(β-sulfatoethyl)-N-[δ'-(β"-chloroethylsulfonyl)-butyl]-amino, N-(β-ethoxyethyl)-N-[γ'-(β"-choroethylsulfonyl)-butyl]-amino, N-(γ-chloropropyl)-N-[β'-(β"-chloroethylsulfonyl)ethyl]-amino, N-phenyl-N-[β-(β'-chloroethylsulfonyl)-ethyl]-amino, N-(4-chlorophenyl)-N-[β-(β'-chloroethylsulfonyl)-ethyl]-amino, N-(2-methylphenyl)-N-[β-(β'-chloroethylsulfonyl)-ethyl]amino, N-(4-methoxyphenyl)-N-[β-(β'-chloroethylsulfonyl)ethyl]-amino, N-(3-sulfophenyl)-N-[β-(β'-chloroethylsulfonyl)-ethyl]-amino, N-(4-sulfophenyl)-N-[β-(β'-chloroethylsulfonyl)-ethyl]-amino, bis-[β-(β'-chloroethylsulfonyl)-ethyl]-amino, bis-[β-(β'-bromoethylsulfonyl)-ethyl]-amino, bis-[γ-(β'-chloroethylsulfonyl)propyl]-amino, bis-[γ-(β'-chloroethylsulfonyl)-butyl]amino, bis-(β-vinylsulfonyl-ethyl)-amino, N-(β-cyanoethyl)-N-[γ'-(β"-chloroethylsulfonyl)-proyl]- amino, β-[β'-(β''-chloroethylsulfonyl)-ethylamino]-ethylamino, β-[β'-(β''-sulfatoethylsulfonyl)-ethylamino]-ethylamino, β-[β'-(β''-chloroethylsulfonyl)-ethoxy]-ethylamino, β-[β'-(β''-sulfatoethylsulfonyl)-ethoxy]-ethylamino, 4-[β-(β'-chloroethylsulfonyl)-ethyl]-piperazin-1-yl, 4-[γ-(β'-chloroethylsulfonyl)-propyl]-piperazin-1-yl, 4-[β-(β'-sulfatoethylsulfonyl)-ethyl]-piperazin-1-yl, 4-[γ-(β'-sulfatoethylsulfonyl)-propyl]-piperazin-1-yl, 4-{N-[β-(4'-β'-sulfatoethylsulfonyl-phenyl)-ethyl]-amidocarbonylmethoxy}-phenylamino, 4-{N-[3'- or -4'-(β-sulfatoethylsulfonyl)-phenyl]-amidocarbonyl-methoxy}-phenylamino, 3,4-di-(β-sulfatoethylsulfonyl)-phenylamino, 2,5-di-(β-sulfatoethylsulfonyl)-phenylamino, 4-[γ-(β'-sulfatoethylsulfonyl)-propoxy]-phenylamino, 2,5-bis-[(β-sulfatoethylsulfonyl)-methyl]-phenylamino, 3- or 4-{N-[γ-(β'-sulfatoethylsulfonyl)-propyl-amidocarbonyl]}-phenylamino, 3-sulfo-4-{[N-γ-(β'-sulfatoethylsulfonyl)-propyl-amidocarbonyl]-methoxy}phenylamino and 4-{[N-γ-(β'-sulfatoethylsulfonyl)-propyl-amidocarbonyl]methoxy}-phenylamino.

In the bridge member W and in the radical $R^B$, arylene radicals are preferably phenylene and naphthylene radicals, which can contain one or more, such as 1, 2 or 3, preferably 1 or 2, substituents which belong, for example, to the group of substituents comprising alkyl having 1 to 4 carbon atoms, such as methyl and ethyl, halogen, such as fluorine, chlorine and bromine, hydroxyl, cyano, alkoxy having 1 to 4 carbon atoms, such as methoxy and ethoxy, carboxyl, sulfamoyl, sulfo, trifluoromethyl and alkoxycarbonyl having 2 to 5 carbon atoms, such as methoxycarbonyl and ethoxycarbonyl. W here is preferably a phenylene radical, which can be substituted by the abovementioned substituents, substituents from the group comprising alkyl having 1 to 4 carbon atoms, chlorine, alkoxy having 1 to 4 carbon atoms, carboxy and sulfo being preferred.

If in the formula (2A) the radical $R^B$ is an optionally substituted aryl radical, then it is preferably a phenyl radical which can be substituted by 1 to 3 substituents, preferably 1 or 2 substituents, belonging to the group of substituents consisting of alkyl of 1 to 4 carbon atoms, such as methyl or ethyl, alkoxy of 1 to 4 carbon atoms, such as methoxy or ethoxy, halogen, such as chlorine or bromine, carboxy, nitro and sulfo.

Alkylene radicals in the formula radicals W and $R^B$ are preferably straight-chain or branched alkylene groups having 2 to 6 carbon atoms, which can be interrupted by the hetero groups mentioned, such as 1 or 2 of these hetero groups. Of these, straight-chain alkylene groups having 2 to 4 carbon atoms or a butylene group interrupted by an oxygen atom or an amino or methylamino group are preferred. Of the alkylene groups, the 1,3-propylene radical is particularly preferred. Substituents in the alkylene groups of W can be, for example, sulfo, carboxy, hydroxy and cyano groups.

If the formula radical $R^B$ is an alkyl radical, then it is preferably methyl or ethyl. The ethyl group can preferably be substituted by sulfo, hydroxy, sulfato, cyano, nitro, carboxy, chlorine or bromine.

If the formula radical W is a radical combined from alkylene and arylene radicals and the radical $R^B$ is a radical combined from alkylene and/or aryl radicals with an alkyl or aryl radical, in these groups the alkylene radical is preferably a straight-chain alkylene radical having 1 to 3 carbon atoms and the arylene radical is preferably a 1,3- or in particular 1,4-phenylene radical. Alkylene-arylene radicals are, in particular, the radicals of the formulae —CH$_2$—CH$_2$-phenylene- and —CH$_2$-phenylene-.

The fiber-reactive grouping of the formula (3) is preferably a radical of the general formula (3a) or particularly preferably a radical of the general formula (3b)

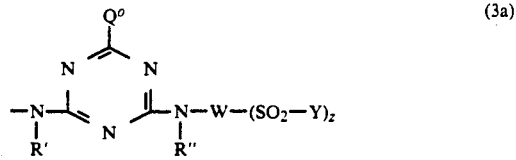

(3a)

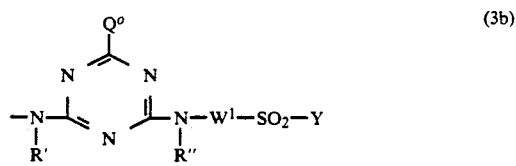

(3b)

in which, in formula (3a), R' is the methyl or ethyl group or in particular a hydrogen atom, R" is a hydrogen atom or the methyl or ethyl group and W, Q°, Y and z have one of the abovementioned particularly preferred meanings, and in formula (3b), R' is methyl or ethyl or in particular a hydrogen atom, R" is the methyl group or in particular a hydrogen atom, Q° and Y have one of the abovementioned particularly preferred meanings and $W^1$ is an alkylene group having 2 to 4 carbon atoms, preferably 2 or in particular 3 carbon atoms, or is a phenylene radical, which can be substituted by 1 or 2 substituents from the group comprising methyl, methoxy, ethoxy and chlorine, and of these preferably the 1,3- or 1,4-phenylene radical, or is a group of the general formula (a)

—(CH$_2$)$_w$-phenylene-  (a)

in which w is the number 1, 2, 3 or 4, preferably 2, and phenylene is the 1,3- or 1,4-phenylene radical.

In the formulae (3a) and (3b) Q° is preferably methylsulfonamido, ethylsulfonamido, propylsulfonamido, butylsulfonamido or phenylsulfonamido.

Important azo dyestuffs corresponding to the general formula (1) are those in which F is a radical of a dyestuff of the benzene-azo-naphthol, the benzene-azo-1-phenyl-5-pyrazolone, the benzene-azo-benzene, the naphthalene-azo-benzene, the benzene-azo-aminonaphthalene, the naphthaleneazo-naphthalene, the naphthalene-azo-1-phenyl-5-pyrazolone, the benzene-azo-pyridone or the naphthalene-azo-pyridone series, the dyestuffs containing sulfo groups also being preferred here.

Of the 1:1 copper complex azo dyestuffs according to the invention, those of the benzene and naphthalene series are preferred.

Examples of preferred mono- and disazo dyestuffs of the general formula (1) are those of the general formulae (4a), (4b) and (4c)

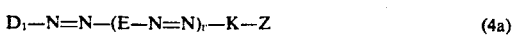  (4a)

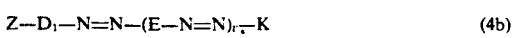  (4b)

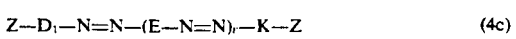  (4c)

and the heavy metal complex compounds derived therefrom, such as 1:1 copper complex compounds, in which $D_1$ is the radical of a diazo component of the benzene or naphthalene series, E is the radical of a central component of the benzene or naphthalene series, K is the radical of a coupling component of the benzene, naphthalene, pyrazolone, 6-hydroxy-2-pyridone or acetoacetic acid arylamide series, in which $D_1$, E and K can contain substituents customary for azo dyestuffs, such as, for example, hydroxy, amino, methyl, methoxy, ethoxy, sulfo and carboxy groups, optionally substituted alkanoylamino groups having 2 to 4 carbon atoms in the alkanoyl radical, optionally substituted benzoylamino groups and halogen atoms, such as bromine and chlorine atoms, and $D_1$, E and K together have at least two sulfo groups, preferably three or four sulfo groups, v is the number zero or 1 and Z is a group of the formula (3) or preferably of the formula (3a) or (3b).

Compounds which are furthermore preferred are the disazo dyestuffs of the general formula (4d) or (4e)

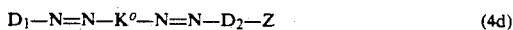  (4d)

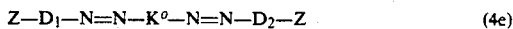  (4e)

in which $D_1$ and $D_2$ independently of one another are the radical of a diazo component of the benzene or naphthalene series and $K^o$ is the radical of a bivalent coupling component of the naphthalene series, it being possible for $D_1$, $D_2$ and $K^o$ to carry the substituents customary for azo dyestuffs, such as those already mentioned above, $D_1$, $D_2$ and $K^o$ together containing at least two sulfo groups, preferably three or four sulfo groups.

Such azo dyestuffs of the general formula (1) are, in particular, dyestuffs of the general formulae (4f), (4g) and (4h)

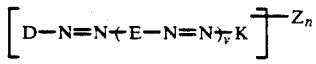  (4f)

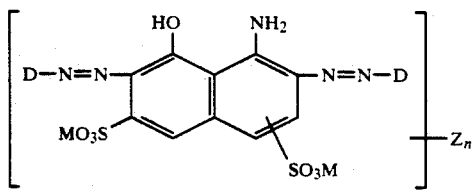  (4g)

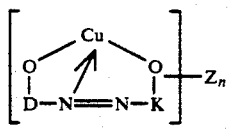  (4h)

in which

D in each case is the radical of a diazo component, which can have meanings which are identical to one another or different from one another, such as, for example, a radical D having the above meaning, E is the bivalent radical of a diazotizable compound which can undergo coupling, for example having the above meaning, K is the radical of a coupling component, for example having the above meaning, v is the number zero or 1, Z is a radical of the general formula (3) or (3a) or (3b), n is the number 1 or 2, preferably 1, and the radical Z is bonded to the radical D or the radical K or, in the case where n=2, is bonded in each case to D and K or to both D, and M is a hydrogen atom or an alkali metal, such as sodium, potassium or lithium.

In all the formulae given above and below the individual formula members not only of differing but also of identical designation within a formula can be identical to or different from one another within their meaning.

The groups "sulfo", "carboxy", "phosphato", "thiosulfato" and "sulfato" include both the acid form thereof and the salt form thereof. Accordingly, sulfo groups are groups conforming to the formula $-SO_3M$, carboxy groups are groups conforming to the formula $-COOM$, phosphato groups are groups conforming to the formula $-OPO_3M_2$, thiosulfato groups are groups conforming to the formula $-S-SO_3M$ and sulfato groups are groups conforming to the formula $-O-SO_3M$, and in each case M has the abovementioned meaning.

The present invention furthermore relates to processes for the preparation of the dyestuffs of the general formula (1) according to the invention. They can be prepared in a manner which is customary per se by routes analogous to known synthesis routes specific for the particular class of dyestuff, by reacting the typical precursors for the particular dyestuff, at least one of which contains a group of the general formula (3), with one another, or by starting from a starting compound containing amino groups, of the general formula (60)

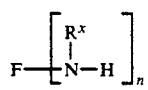  (60)

in which F, $R^x$ and n have the abovementioned meanings, and reacting this with a trihalogeno-s-triazine of the general formula (61)

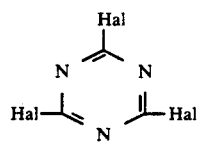  (61)

in which Hal is a halogen atom, such as, in particular, a chlorine or fluorine atom, with a sulfonamide of the general formula $H-Q^o$ where $Q^o$ has the abovementioned meaning, or an alkali metal salt thereof and with an amine of the general formula H-Q, where Q has the above-mentioned meaning, in stoichiometric amounts in any desired sequence, and if appropriate subsequently carrying out further necessary conversion reactions which are familiar to the expert.

In particular, the dyestuffs according to the invention can be prepared according to the invention by reacting a compound corresponding to the general formula (62)

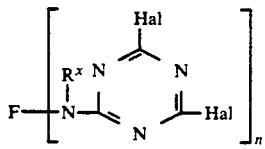 (62)

in which F, $R^x$ and n have the abovementioned meanings and Hal is a halogen atom, such as, in particular, a chlorine or fluorine atom, with a compound H-Q° having the above-mentioned meaning or an alkali metal salt thereof, and reacting the resulting compound of the general formula (63)

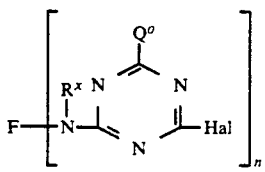 (63)

in which F, Q°, $R^z$ and Hal have the abovementioned meanings, with an amine of the general formula H-Q, where Q has the abovementioned meaning, or reacting a compound of the general formula (64)

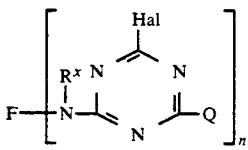 (64)

in which in which F, $R^x$, Hal, Q and n have the abovementioned meanings, with a compound H-Q° having the abovementioned meaning or an alkali metal salt thereof, or reacting a compound of the general formula (60) with a compound of the general formula (65)

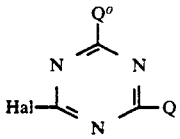 (65)

where Hal, Q° and Q have the abovementioned meaning.

The reaction of a starting compound of the general formula (63) with the amine of the general formula H-Q is carried out in an aqueous or aqueous-organic medium in suspension or solution at a temperature between 30° and 100° C., preferably between 65° and 85° C., and at a pH between 3 and 7, preferably between 3.0 and 4. If the reaction is carried out in an aqueous-organic medium, the organic medium is, for example, acetone, dimethylformamide or N-methyl-pyrrolidone. The hydrogen halide liberated during the condensation is advantageously neutralized continuously by addition of aqueous alkali metal hydroxides, carbonates or bicarbonates.

The reaction of the compound of the formula (60) with the compound of the general formula (65) is preferably carried out at a temperature between 25° and 90° C., in particular between 45° and 75° C., and at a pH between 3 and 8, in particular between 3.5 and 6.5.

The reaction of a starting compound of the formula (62) with an amine of the formula H-Q is likewise effected in the same way as the reaction of the compound (63) with the amine H-Q in an aqueous or aqueous-organic medium in suspension or solution, although in this case a temperature between 15° and 70° C., preferably between 25° and 45° C., and a pH between 3 and 11.5, preferably between 3.5 and 7, is maintained.

Compounds of the general formula (63) are preparable not only by the reaction of a compound of the formula (62) with a compound H-Q° or an alkali metal salt thereof but also by reacting, analogously to known procedures, a compound of the formula (66)

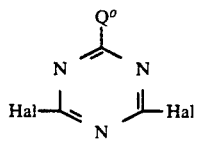 (66)

where Hal and Q° have the abovementioned meaning, with a starting compound of the formula (60), or, likewise analogously to known procedures, by reacting a precursor customary for the type of dye which, however, contains a group of the formula (67)

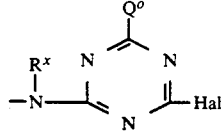 (67)

where $R^x$, Q° and Hal have the abovementioned meanings, with a further precursor optionally containing a group of the formula (67).

The amine of the formula H-Q is as a rule employed in the reactions in the form of a salt, such as a sulfate or preferably in the form of the hydrochloride.

The starting compounds of the formula (64) can be prepared by reacting, analogously to known procedures, for example a compound of the formula (62) with an amine of the formula H-Q where Q has the abovementioned meaning or a compound of the formula (68)

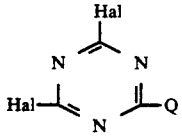 (68)

where Hal and Q have the abovementioned meanings, with a starting compound of the formula (60). The starting compound (68) itself can in turn be prepared analogously to known procedures by reaction of a trihalo-s-triazine with an amine of the formula H-Q, where Q has the above-mentioned meaning.

The condensation of the halotriazine of the formula (61) with a compound of the formula H-Q is effected, likewise preferably in aqueous solution or suspension, at 0° to 30° C. at a pH between 1.8 and 9.5. Again the hydrogen halide set free in the course of the condensation is advantageously neutralized by continuous addition of aqueous alkali metal hydroxides, carbonates or bicarbonates.

Under certain reaction conditions a halotriazine radical may undergo hydrolysis; for this reason it is necessary that an intermediate or precursor which contains a protective group, such as, for example, an acetylamino group, should have the acetyl group eliminated from it by hydrolysis before the reaction takes place with the halotriazine. In which order the various abovementioned reactions between the halotriazine and amino starting compounds are conveniently carried out first will vary from case to case and depends in particular on the solubility of the amino compounds involved and on the basicity of the amino groups which shall react with the halogeno-triazine.

If diazo and coupling components of which one or both contain a group of the general formula (3) are used as starting substances in the azo dyestuff synthesis according to the invention, the reactions are carried out by the customary procedure of diazotization and coupling reactions, thus the diazotization is as a rule carried out at a temperature between $-5°$ C. and $+15°$ C. and at a pH below 2, by means of a strong acid and an alkali metal nitrite in a preferably aqueous medium, and the coupling reaction is as a rule carried out at a pH between 1.5 and 4.5, in the case of a coupling component which contains amino groups, and at a pH between 3 and 7.5, in the case of a coupling component which contains hydroxy groups, and at a temperature between $0°$ and $25°$ C., likewise preferably in an aqueous medium.

Examples of starting compounds which can be used as diazo components are: aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonic acid amide, N-methylamide, N-ethylamide, N,N-dimethylamide or N,N-diethylamide, dehydrothio-p-toluidinesulfonic acid, 1-amino-4-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- or -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-amino-naphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2,'5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'-aminobenzoylamino)-1-aminobenzene-6-sulfonic acid, 3-(4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid,1,3-diaminobenzene-5-carboxylic acid, 1,4-diamino-2-methylbenzene, 4,4'-diaminodiphenyl oxide, 4,4'-diamino-diphenylurea-2,2'-disulfonic acid, 4,4'-diaminodiphenyloxyethane-2,2'-disulfonic acid, 4,4'-diaminostilbene-2,2'-disulfonic amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 2-($\beta$-sulfatoethylsulfonyl)-phenyl-aniline, 3-($\beta$-sulfatoethylsulfonyl)-aniline, 4-($\beta$-sulfatoethylsulfonyl)-aniline, 2-carboxy-5-( -sulfatoethylsulfonyl)-aniline, 2-chloro-3- -sulfatoethylsulfonyl)-aniline, 2-chloro-4-( -sulfatoethylsulfonyl)aniline, 2-ethoxy-4- or -5-($\beta$-sulfatoethylsulfonyl)aniline, 2-ethyl-4-($\beta$-sulfatoethylsulfonyl)-aniline, 2-methoxy-5-($\beta$-sulfatoethylsulfonyl)-aniline, 2,4-diethoxy-5-($\beta$-sulfatoethylsulfonyl)-aniline, 2,4-dimethoxy-5-($\beta$-sulfatoethylsulfonyl)-aniline, 2,5-dimethoxy-4-($\beta$-sulfatoethylsulfonyl)-aniline, 2-methoxy-5-methyl-4-($\beta$-sulfatoethylsulfonyl)-aniline, 2- or 3- or 4-($\beta$-thiosulfatoethylsulfonyl)-aniline, 2-methoxy-5-(-thiosulfatoethyl-sulfonyl)-aniline, 2-sulfo-4-(-phosphatoethylsulfonyl)aniline, 2-sulfo-4-vinylsulfonyl-aniline, 2-hydroxy-4- or -5-(β-sulfatoethylsulfonyl)-aniline, 2-chloro-4- or -5-(β-sulfatoethylsulfonyl)-aniline, 3- or 4-(β-acetoxyethylsulfonyl)-aniline, 2-methoxy-4-[β-(N-methyl-tauryl)ethylsulfonyl]-aniline, 5-(β-sulfatoethylsulfonyl)-2-amino-naphthalene, 6- or 7- or 8-(β-sulfato-ethylsulfonyl)-2-amino-naphthalene, 6-(β-sulfatoethyl-sulfonyl)-1-sulfo-2-amino-naphthalene, 5-(β-sulfatoethylsulfonyl)-1-sulfo-2-amino-naphthalene and 8-(β-sulfato-ethylsulfonyl)-6-sulfo-2-amino naphthalene.

If an amino-acetylamino compound is employed instead of a diamine as the diazo component in the synthesis according to the invention and the acetyl group is subsequently split off again from this by hydrolysis, the monoacetyl compounds of the abovementioned diazo components are suitable, such as, for example, 1-acetylamino-3-aminobenzene-4-sulfonic acid and 1-acetylamino-4-aminobenzene-3-sulfonic acid.

Examples of coupling components which can be used for the synthesis of the azo dyestuffs according to the invention are: phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylaminoβ-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methylamino- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6-or -4,6-disulfonic acid, 1-(4,-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy2-pyridone, 1-ethyl-3-sulfomethyl-4-methyl-6-hydroxy-2-pyridone 2,4,6-triamino-3-cyanopyridine, 2-(3'-sulfophenylamino)-4,6-diamino-3-cyanopyridine, 2-(2'-hydroxy-ethylamino)-3-cyano-4-methyl-6-aminopyridine, 2,6-bis-(2'-hydroxyethylamino)-3-cyano-4-methylpyridine, 1-ethyl-3-carbonyl-4-methyl-6-hydroxy-2-pyridone, 1-ethyl-3-sulfomethyl-4-methyl-5-carbonyl-6-hydroxy-2-pyridone, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-(β-aminoethyl)-3-cyano-4-methyl-6-hydroxy-2-pyridone, 1-(γ-aminopropyl)-3-sulfomethyl-4-methyl-6-hydroxy-2-pyridone, 1,3-diaminobenzene, 1-amino-3-N,N-di-(β-hydroxyethyl)aminobenzene, 1-amino-3-N,N-di-(β-sulfatoethyl)-aminobenzene, 1-amino-3-N,N-di-(β-hydroxyethyl)-amino-4-methoxybenzene, 1-amino-3-N,N-di-(β-sulfatoethyl)-amino-4-methoxybenzene, 1-amino-3-sulfo-benzylamino-benzene, 1-amino-3-sulfo-benzylamino-4-chlorobenzene, 1-amino-3-N,N-di-(sulfobenzyl)-aminobenzene, 2-(4-β-sulfatoethylsulfonyl-phenyl)-3-methyl-5-pyrazolone and 1-(4-β-sulfatoethylsulfonyl-phenyl)-3-carboxy-5-pyrazolone.

In the novel synthesis of the novel heavy metal complex azo dyestuffs it is possible to start for example from those metal-free azo dyestuffs which conform to the formula (1) but in which the diazo and coupling components each contain ortho to the azo group a hydroxy or carboxy group capable of complex formation. This o,o,-dihydroxy- or o-carboxy-o,-hydroxy-azo starting compound conforming to the formula (1) is then reacted in a conventional manner with a heavy metal ion donor, for example copper chloride, copper sulfate, chromium chloride, chromium sulfate and cobalt chloride, to form the heavy metal complex azo dyestuff according to the invention.

For example, the novel copper complex azo compounds of the formula (4h) can be prepared by reacting a compound of the formula (4z)

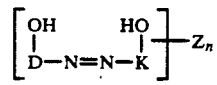

(4z)

in which the individual formula members have one of the abovementioned meanings, with a copper ion donor, for example copper chloride or copper sulfate, in an aqueous medium at a temperature between 0° and 30° C.

Examples of aromatic amino compounds of the formulae D—NH$_2$ and D$_1$—NH$_2$ which do not carry a fiber-reactive group of the general formula (3) and which can serve as diazo components in the synthesis of azo dyestuffs are those of the general formulae (5a) and (5b)

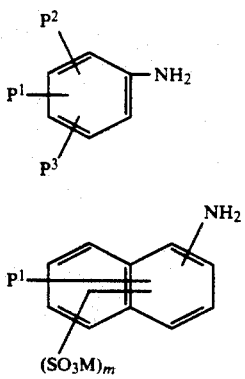

(5a)

(5b)

in which

P¹ is hydrogen, sulfo or a group of the general formula —SO$_2$—Y, where Y has the abovementioned meaning, P² is hydrogen, methyl, ethyl, methoxy, ethoxy, alkanoyl having 2 to 5 carbon atoms, such as acetyl and propionyl, cyano, carboxy, sulfo, alkoxycarbonyl having 2 to 5 carbon atoms, carbamoyl, N-($C_1$-$C_4$-alkyl)-carbamoyl, fluorine, chlorine, bromine or trifluoromethyl, P³ is hydrogen, methyl, ethyl, methoxy, ethoxy, cyano, carboxyl, sulfo, alkanoylamino having 2 to 5 carbon atoms, such as acetylamino, alkoxycarbonyl having 2 to 5 carbon atoms, carbamoyl, N-($C_1$-$C_4$-alkyl)-carbamoyl, fluorine, chlorine, nitro, sulfamoyl, N-($C_1$-$C_4$-alkyl)sulfamoyl, alkylsulfonyl having 1 to 4 carbon atoms, phenylsulfonyl or phenoxy, in which the benzene or naphthalene nucleus can also contain a hydroxy group in the ortho-position relative to the NH$_2$ group, m is the number zero, 1 or 2 (this group being a hydrogen atom in the case where m is zero) and M has the abovementioned meaning.

Of these, P² is preferably hydrogen, methyl, methoxy, bromine, chlorine, carboxy or sulfo, and P³ is preferably hydrogen, methyl, methoxy, chlorine, carboxy, sulfo or acetylamino.

Examples of aromatic amines of the general formula D—NH$_2$ or D$_1$—NH$_2$ corresponding to the formulae (5a) and (5b) are: 2-amino- or 4-aminobenzoic acid, 3-amino-benzoic acid, 3-chloroaniline-6-carboxylic acid, aniline-2- or -3- or -4-sulfonic acid, 2,5-disulfo-aniline, 2,4-disulfo-aniline, 3,5-disulfoaniline, 2-aminotoluene-4-sulfonic acid, 2-amino-anisole-4-sulfonic acid, 2-amino-anisole-5-sulfonic acid, 4-amino-anisole-2-sulfonic acid, 2-ethoxy-aniline-5-sulfonic acid, 2-ethoxy-aniline-4-sulfonic acid, 4-sulfo-2-aminobenzoic acid, 2,5-dimethoxy-aniline-4-sulfonic acid, 2,4-dimethoxyaniline-5-sulfonic acid, 2-methoxy-5-methyl-aniline-4-sulfonic acid, 4-amino-anisole-3-sulfonic acid, 4-aminotoluene-3-sulfonic acid, 2-amino-toluene-5-sulfonic acid, 2-chloro-aniline-4-sulfonic acid, 2-chloro-aniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 3-acetylamino-6-sulfoaniline, 4-acetylamino-2-sulfo-aniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 4-($\beta$-sulfatoethylsulfonyl)-aniline, 3-($\beta$-sulfatoethylsulfonyl)-aniline, 2-sulfo-5-($\beta$-sulfatoethylsulfonyl)-aniline, 2-sulfo-4-($\beta$-sulfatoethylsulfonyl)-aniline, 2-methoxy-5-($\beta$-sulfatoethylsulfonyl)-aniline, 2-methoxy-5-methyl-4-($\beta$-sulfatoethylsulfonyl)-aniline, 2,5-dimethoxy-4-($\beta$-sulfatoethylsulfonyl)-aniline, 2-amino-5-($\beta$-sulfatoethylsulfonyl)-phenol, 2-amino-4-($\beta$-sulfatoethylsulfonyl)-phenol, 2-amino-6-($\beta$-sulfatoethylsulfonyl)-naphthalene-8-sulfonic acid, 2-amino-8-($\beta$-sulfatoethylsulfonyl)-naphthalene-6-sulfonic acid, 2-amino-5-($\beta$-sulfatoethylsulfonyl)-naphthalene-7-sulfonic acid and 2-amino-7-($\beta$-sulfatoethylsulfonyl)-naphthalene-5-sulfonic acid.

Aromatic amines of the diazo component Z—D—NH$_2$ or Z—D$_1$—NH$_2$ or Z—D$_2$—NH$_2$ having the fiber-reactive radical Z are preferably based on aromatic amines of the general formulae (6a) and (6b)

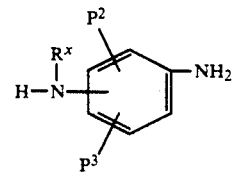

(6a)

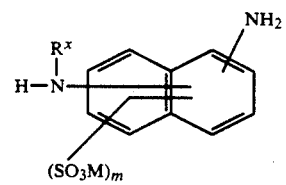

(6b)

in which R$^x$, M, m, P² and P³ have the abovementioned particularly preferred meanings, it being possible for the benzene nucleus in formula (6a) and (6b) additionally to contain a hydroxyl group in the ortho-position relative to the amino group —NH$_2$.

Examples of amines of the general formulae (6) are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methyl-benzene, 1,4-diamino-2-methoxybenzene, 1,3-diamino-4-methylbenzene, 1,5-diamino-4-methylbenzene-2-sulfonic acid, 1,5-diamino-4-methoxybenzene-2-sulfonic acid, 1,3-diaminobenzene-5-sulfonic acid, 1,3-diamino-5-methylbenzene, 2,6-diamino-naphthalene, 2,6-diamino-naphthalene-4,8-disulfonic acid, 2-amino-5-methylamino-naphthalene-1-sulfonic acid, 2-amino-5-methylamino-naphthalene-1,7-disulfonic acid and 1,4-diamino-naphthalene-6-sulfonic acid.

Preferred radicals D, D$_1$ or D$_2$ without or with the radical Z are, in the formulae (4a) to (4g), those of the general formulae (5c) and (5d) or (5g) and, in formula (4h), those of the general formulae (5e) and (5f) or (5h):

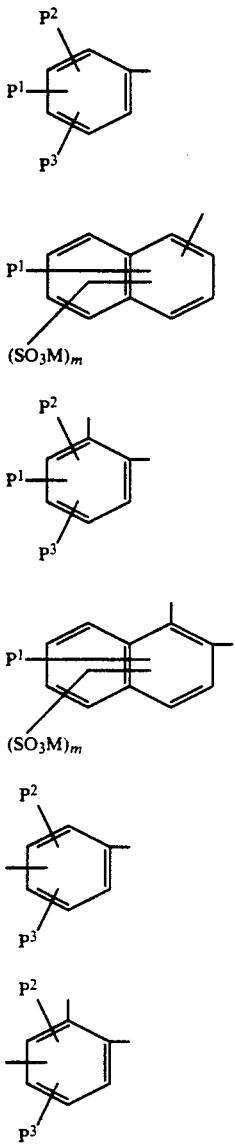

in which $P^1$, $P^2$, $P^3$, m and M have the abovementioned meanings.

Examples of aromatic radicals E of a diazotizable compound which can undergo coupling, of the general formula H—E—NH$_2$, are those of the general formulae (7a), (7b) and (7c)

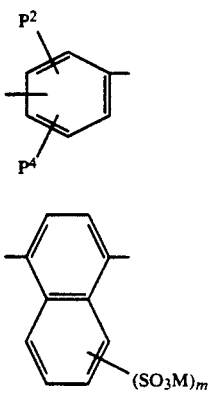

in which $P^2$ and M have the abovementioned meanings, $P^4$ is hydrogen, alkyl having 1 to 4 carbon atoms, such as methyl or ethyl, alkoxy having 1 to 4 carbon atoms, such as methoxy or ethoxy, chlorine, alkanoylamino having 2 to 5 carbon atoms, such as acetylamino or propionylamino, benzoylamino, ureido, phenylureido, alkylureido having 1 to 4 carbon atoms in the alkyl radical, phenylsulfonyl or alkylsulfonyl having 1 to 4 carbon atoms and m is the number zero, 1 or 2 (this group being hydrogen in the case where m is zero).

Examples of compounds of the formula H—E—NH$_2$ are: aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetyl-aminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylamino-aniline, 2,3-dimethylaniline, 3,5-dimethylaniline, 1-amino-2-methoxy-5-acetylamino-benzene, 3-propionylamino-aniline, 3-butyrylamino-aniline,2-sulfo-5-acetylamino-aniline,2-amino-5-naphthol-7-sulfonic acid and 2-amino-8-naphthol-6-sulfonic acid.

The radicals K of the coupling component preferably originate from the aniline, naphthalene, pyrazole or acylacetarylide series; they can contain fiber-reactive groups.

Examples of coupling components of the formula H—K of the aniline and naphthalene series are the anilines, N-mono- and N,N-disubstituted anilines, m-phenylenediamines and derivatives thereof, naphtholsulfonic acids, aminonaphthalenes, naphthols, hydroxynaphthoic acid derivatives, aminonaphthalenesulfonic acids or aminonaphtholsulfonic acids.

Examples of coupling components of the formula H-K which carry no fiber-reactive group of the general formula (3) are compounds of the general formulae (8a) to (8g)

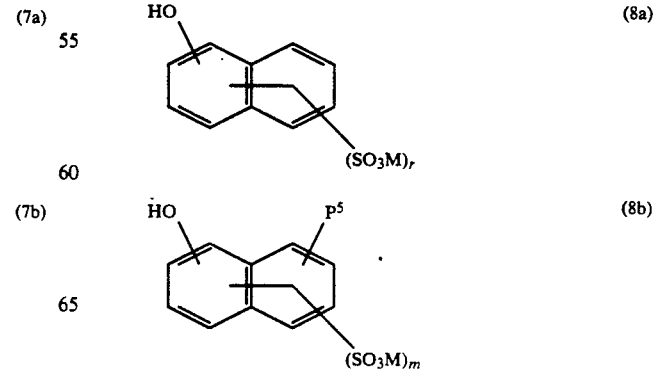

-continued

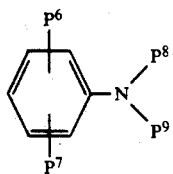
(8c)

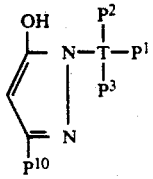
(8d)

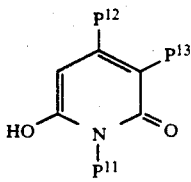
(8e)

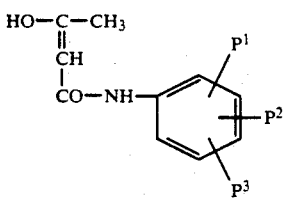
(8f)

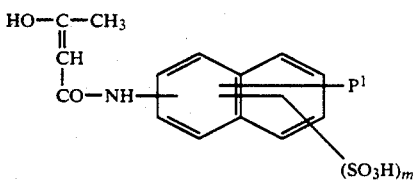
(8g)

in which $P^1$, $P^2$, $P^3$, m and M have the abovementioned meanings, r is the number zero, 1, 2 or 3 (this group being hydrogen in the case where r is zero), $P^5$ is alkylureido with alkyl groups having 1 to 6 carbon atoms, phenylureido, phenylureido which is substituted in the phenyl radical by chlorine, methyl, methoxy, nitro, sulfo and/or carboxy and/or a group —$SO_2$—Y, where Y has the above meaning, alkanoylamino having 2 to 7 carbon atoms, such as, for example, acetylamino and propionylamino, cyclohexanoylamino, benzoylamino or benzoylamino which is substituted in the benzene radical by chlorine, methyl, methoxy, nitro, sulfo and/or carboxy and/or a group —$SO_2$—Y, where Y has the above meaning, $P^6$ is hydrogen, alkyl having 1 to 4 carbon atoms, such as methyl and ethyl, alkoxy having 1 to 4 carbon atoms, such as methoxy and ethoxy, bromine, chlorine or alkanoylamino having 2 to 7 carbon atoms, such as acetylamino and propionylamino, $P^7$ is hydrogen, alkyl having 1 to 4 carbon atoms, such as methyl and ethyl, alkoxy having 1 to 4 carbon atoms, such as methoxy and ethoxy, chlorine, alkanoylamino having 2 to 7 carbon atoms, such as acetylamino and propionylamino, ureido or phenylureido, $P^8$ is hydrogen or alkyl having 1 to 4 carbon atoms, which can be substituted by hydroxy, cyano, carboxy, sulfo, sulfato, methoxycarbonyl, ethoxycarbonyl or acetoxy, $P^9$ is alkyl having 1 to 4 carbon atoms, which can be substituted by hydroxy, cyano, carboxy, sulfo, sulfato, methoxycarbonyl, ethoxycarbonyl or acetoxy, or benzyl or phenyl, or phenyl which is substituted by alkyl having 1 to 4 carbon atoms, alkoxy having 1 to 4 carbon atoms, chlorine and/or sulfo, $P^{10}$ is hydrogen, alkyl having 1 to 4 carbon atoms, such as methyl, cyano, carboxy, carbalkoxy having 2 to 5 carbon atoms, such as carbomethoxy and carbethoxy, carbamoyl or phenyl, preferably methyl, carboxyl, methoxycarbonyl, ethoxycarbonyl or phenyl and in particular methyl or carboxy, T is a benzene or naphthalene ring, preferably a benzene ring, $P^{11}$ is hydrogen, alkyl having 1 to 6 carbon atoms, preferably 1 to 4 carbon atoms, which can be substituted by phenyl or sulfophenyl or by hydroxy, amino, methoxy, ethoxy, carboxy, sulfo, acetylamino, benzoylamino or cyano, cyclohexyl, phenyl or phenyl which is substituted by carboxy, sulfo, benzoylamino, acetylamino, methyl, methoxy, cyano or chlorine, and preferably hydrogen or alkyl having 1 to 4 carbon atoms, which can be substituted by phenyl, sulfo or sulfophenyl, $P^{12}$ is hydrogen or alkyl having 1 to 4 carbon atoms, such as methyl, or alkyl having 1 to 4 carbon atoms, which is substituted by alkoxy having 1 to 4 carbon atoms, such as methoxy, or cyano, preferably alkyl having 1 to 4 carbon atoms or phenyl, and $P^{13}$ is hydrogen, chlorine, bromine, sulfo, carbamoyl, methylsulfonyl, phenylsulfonyl, cyano or sulfoalkyl having 1 to 4 carbon atoms, preferably hydrogen, sulfo or sulfoalkyl with an alkyl radical having 1 to 4 carbon atoms, such as sulfomethyl, or cyano or carbamoyl.

Examples of compounds of the general formulae (8) are: 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 2-acetylamino-5-hydroxynaphthalene-7-sulfonic acid, 3-acetylamino-5-hydroxynaphthalene-7-sulfonic acid, 2-methyl-amino-8-hydroxynaphthalene-6-sulfonic acid or 2- (3'- and 4'-sulfophenyl)-amino-8-hydroxynaphthalene-6-sulfonic acid, 3-(3'- and 4'-sulfophenyl)-amino-8-hydroxynaphtha-lene-6-sulfonic acid, N,N-di-($\beta$-sulfoethyl)-aniline and derivatives thereof which are mono- or disubstituted in the benzene nucleus by methyl, methoxy and/or ethoxy, N-ethyl-N-($\beta$-sulfoethyl)-aniline, N-($\beta$-sulfoethyl)-aniline, N-($\beta$-carboxyethyl)-aniline and derivatives thereof which are mono- or disubstituted in the benzene nucleus by methyl, methoxy and/or ethoxy, and moreover 1-[3'-($\beta$-chloroethylsulfonyl)-benzoylamino]-3,6-disulfo-8-naphthol, 1-[3'-(vinylsulfonyl)-benzoylamino]-3,6-disulfo-8-naphthol, 1-[3'-(vinylsulfonyl)-benzoylamino]-4,6-disulfo-8-naphthol, 1-[3'- -sulfatoethylsulfonyl)-benzoylamino]-4,6-disulfo-8-naphthol, 2-[3'-($\beta$- chloroethylsulfonyl)-benzoylamino]-6-sulfo-8-naphthol, 2-[3'-(vinylsulfonyl)-benzoylamino]-6-sulfo-8-naphthol, 3-[3'-(β-chloroethylsulfonyl)-benzoylamino]-6-sulfo-8-naphthol, 3-[3'-(vinylsulfonyl)-benzoylamino]-6-sulfo-8-naphthol, 2-[N-methyl-N-(β-sulfatoethylsulfonyl)-amino]-6-sulfo-8-naphthol, 3-[N-methyl-N-(β-sulfatoethylsulfonyl)-amino]-6-sulfo-8-naphthol, 2-[N-ethyl-N-(β-sulfatoethylsulfonyl)-amino]-6-sulfo-8-naphthol, 1-[N'-(3 -β-chloroethylsulfonyl-phenyl)-ureido]-3,6-disulfo-8-naphthol, 1-[N'-(3'-vinylsulfonyl-phenyl)-ureido]-3,6-disulfo-8-naphthol, 1-[N'-(3'-vinylsulfonylpropyl)ureido] -3,6-disulfo-8-naphthol, 1-[N'-(3'-β-chloroethylsulfonyl-phenyl)-ureido]-4,6-disulfo-8-naphthol, 1-[N'-(3'-vinylsulfonyl-phenyl)-ureido]-4,6-disulfo-8-naphthol, 1-[N'-(3, -chloroethylsulfonyl-propyl)-ureido]-4,6-disulfo-8-naphthol, 2-[N'-(3'-β-sulfatoethylsulfonylphenyl)-ureido]-6-sulfo-8-naphthol, 2-[N'-(3'-β-chloroethylsulfonyl-propyl)-ureido]-6-sulfo-8-naphthol, 3-[N'-(3'-β-chloroethylsulfonyl-phenyl)-ureido]-6-sulfo-8-naphthol and 3-[N'-(3'-vinylsulfonyl-propyl)-ureido]-6-sulfo-8-naphthol.

Of these, coupling components which contain sulfo groups and if appropriate carry azo groups, such as 1 or 2 azo groups, and which couple in the o- or p-position relative to a hydroxy and/or amino group, such as, for example, 2-acetylamino-5-hydroxy-naphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid or 1-benzoylamino-8-hydroxynaphthalene-4,6-disulfonic acid, are of particular importance.

Examples of pyrazolone coupling components are 3-methyl-, 3-carboxy- and 3-($C_2$-$C_5$-alkoxycarbonyl)-5-pyrazolones, which carry hydrogen, phenyl which is substituted by methyl, ethyl, fluorine, chlorine, bromine, trifluoromethyl, methoxy, ethoxy, cyano, phenoxy, phenylsulfonyl, methylsulfonyl, sulfo, benzoyl, acetyl, acetylamino, nitro, hydroxy, carboxy, carbamoyl and/or sulfamoyl or sulfo-substituted 1- or 2-naphthyl in the 1-position, for example:

1-(2'-methoxy-5'-methylphenyl)-, 1-(2'-chloro-5'-sulfophenyl)-, 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)- and 1-(3'-sulfamoylphenyl)-3-carboxy-5-pyrazolone, 1-(3'- or 4'-sulfophenyl)-, 1-(2'-chloro-4'- or -5'-sulfophenyl)-, 1-(2'-methyl-4'-sulfophenyl)-, 1-(4',8'-disulfo-2'-naphthyl)- and 1-(6'-sulfo-1'-naphthyl)-3-methyl-5-pyrazolone, ethyl -phenyl-5-pyrazolone-3-carboxylate, ethyl 5-pyrazolone-3-carboxylate, 5-pyrazolone-3-carboxylic acid, 1-[4'-(β-sulfatoethylsulfonyl)-2'-sulfo]-phenyl-3-methyl-pyrazol-5-one, 1-[4'-(β-sulfatoethylsulfonyl)]-phenyl-3-carboxypyrazol-5-one, 1-[4'-( -sulfatoethylsulfonyl)]-phenyl-3-methyl-pyrazol-5-one, 1-[3'-(β-sulfatoethylsulfonyl)]phenyl-3-carboxy-pyrazol-5-one, 1-[3'-(β-sulfatoethylsulfonyl))]-phenyl-3-methyl-pyrazol-5-one and 1-(4'-sulfophenyl)-3-carboxy-pyrazol-5-one.

Examples of pyridone coupling components are 1-ethyl-2-hydroxy-4-methyl-5-carboxamido-6-pyridone, 1-(2.-hydroxyethyl)-2-hydroxy-4-methyl-5-carboxamido-6-pyridone, 1-(4'-sulfo-phenyl)-2-hydroxy-4-methyl-5-carboxamido-6-pyridone, 1-(2'-sulfoethyl)-2-hydroxy-4-methyl-5-cyano-6-pyridone, 1-ethyl-2-hydroxy-4-sulfomethyl-5-carboxamido-6-pyridone, 1-ethyl-2-hydroxy-4-methyl-5-sulfomethyl-6-pyridone, 1-methyl-2-hydroxy-4-methyl-5-cyano-6-pyridone, 1-methyl-2-hydroxy-5-acetyl-6-pyridone, 1,4-dimethyl-2-hydroxy-5-cyano-6-pyridone, 1,4-dimethyl-2-hydroxy-5-carboxamido-6-pyridone, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethyl-6-pyridone, 1-methyl-2-hydroxy-4-methyl-5-methylsulfonyl-6-pyridone, 1-carboxymethyl-2-hydroxy-4-ethyl-5-phenylsulfonyl-6-pyridone and 1-(2'-sulfo-ethyl)-2-hydroxy-4-carboxy-6-pyridone, and examples of acetoacetyl-arylamide coupling components are acetoacetyl-(2-methoxy-4-sulfo-5-methyl)-aniline, acetoacetyl-(2,4-dimethoxy-5-methyl)aniline and acetoacetyl-(4-β-sulfatoethylsulfonyl)aniline.

Coupling components H-K which may furthermore be mentioned in particular are: 1-amino-8-hydroxynaphthalene-3,6- and -4,6-disulfonic acid and arylazo coupling products thereof, obtained by acid coupling, of the formula (9a)

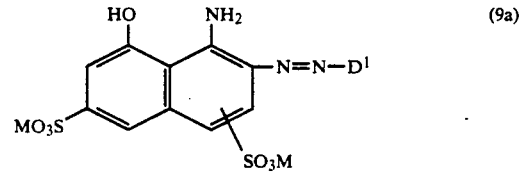

(9a)

in which
$D^1$ is the radical of a diazo component, for example a radical of the formula (10a) or (10b)

(10a)

or

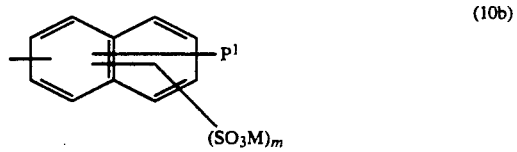

(10b)

in which $P^1$, $P^2$, $P^3$, M and m have the abovementioned meanings.

Examples of individual radicals D are: phenyl, 2-sulfophenyl, 3-sulfo-phenyl, 4-sulfo-phenyl, 2,4-disulfophenyl, 2,5-disulfo-phenyl, 3,5-disulfo-phenyl, 1,5-disulfo-naphth-2-yl, 4,8-disulfo-naphth-2-yl, 3,6,8-trisulfo-naphth-2-yl, 4,6,8-trisulfo-naphth-2-yl, 3,6,8-trisulfo-naphth-1-yl, 4,6,8-trisulfo-naphth-1-yl, 4-sulfo-naphth-1-yl, 1-sulfo-naphth-2-yl, 3-acetylaminophenyl, 4-acetylamino-phenyl, 4-acetylamino-2-sulfophenyl, 5-acetylamino-2-sulfo-phenyl, 4-nitro-phenyl, 4-nitro-2-sulfo-phenyl, 6-acetylamino-4,8-disulfo-naphth-2-yl, 4-(β-sulfatoethylsulfonyl)-phenyl and 3-(β-sulfatoethylsulfonyl)-phenyl.

Examples of coupling components which contain, according to the invention, the fiber-reactive group of the formula (3) or into which the fiber-reactive group can be introduced, if appropriate only after the coupling reaction, are compounds of the general formulae (11a) to (11h) and $Z°$-free precursors thereof (i.e. compounds which contain the group —N(R$^x$)—H instead of the group —N(R$^x$)—Z°:

(11a)
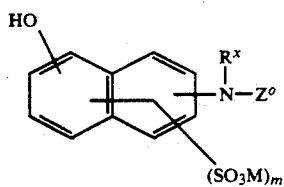

(11b)
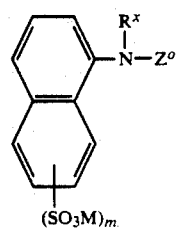

(11c)
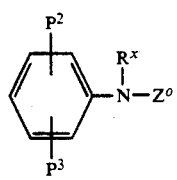

(11d)
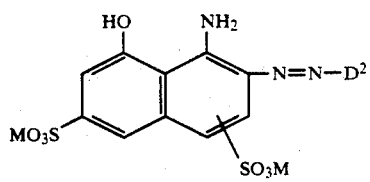

(11e)
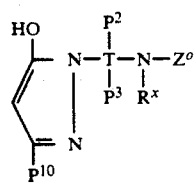

(11f)
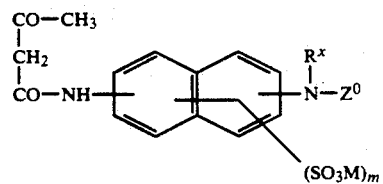

(11g)
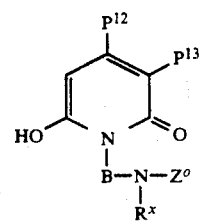

(11h)
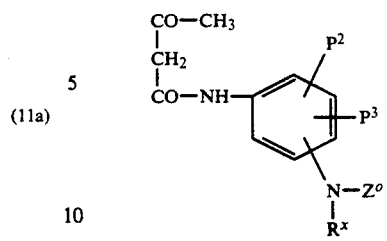

in which

R$^x$, P$^2$, P$^3$, P$^{10}$, P$^{12}$, P$^{13}$, D$^2$, M, m and T have the above-mentioned particularly preferred meanings, B is alkyl having 1 to 4 carbon atoms, benzyl or phenethyl or phenyl, or benzyl, phenethyl or phenyl which is substituted in the benzene radical by fluorine, chlorine, bromine, methyl, methoxy, cyano, sulfo, carboxy, acetyl, nitro, carbamoyl and/or sulfamoyl, the group —N(R$^x$)—Z° being bonded to the benzene nucleus in the case of "benzyl" and "phenethyl", Z° is a radical of the formula (3), (3a) or (3b) which is free from the group —N(R$^x$)— or —N(R')— and D$^2$ is the radical of a diazo component having a fiber-reactive group, in particular of the formula (3), preferably a radical of the abovementioned formula (10a) or (10b), where P$^1$ is a group of the formula —SO$_2$—Y or a radical of the formula (10c)

(10c)
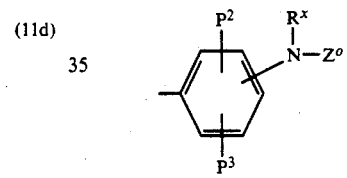

in which R$^x$, P$^2$, P$^3$ and Z° have the abovementioned particularly preferred meanings.

Examples of aromatic diamines from the radical of the formula (10c) are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methyl-benzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid and 1,5-diamino-4-methoxybenzene-2-sulfonic acid, one primary or secondary amino group in all these diamino compounds being substituted by the fiber-reactive radical Z°.

Radicals K in the formulae (4b) and (4f) which do not contain the group Z are, in particular, radicals of the general formulae (12a) to (12h)

(12a)
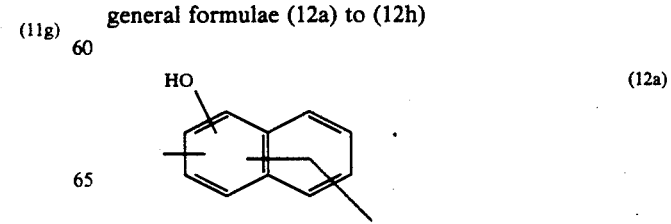

-continued

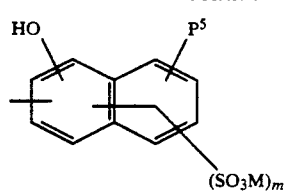 (12b)

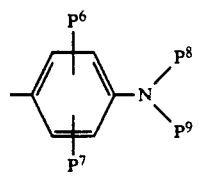 (12c)

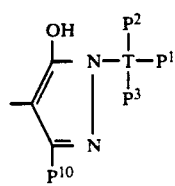 (12d)

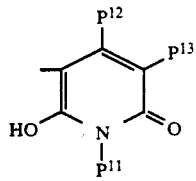 (12e)

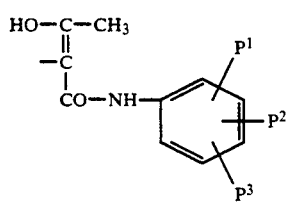 (12f)

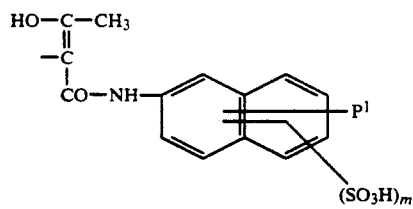 (12g)

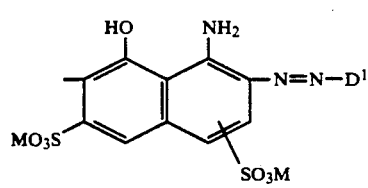 (12h)

in which the individual formula members have the abovementioned meanings.

Radicals K in the formulae (4a), (4c) and (4f) which contain the group Z are therefore, in particular, radicals of the general formulae (12j) to (12p)

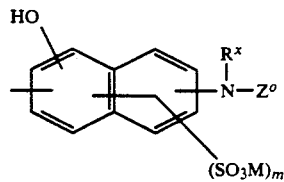 (12j)

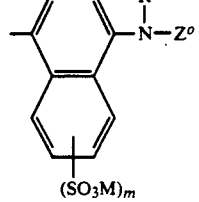 (12k)

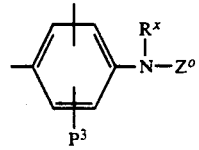 (12m)

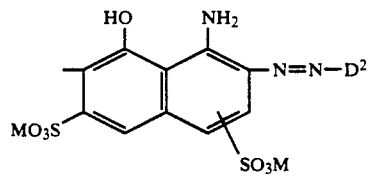 (12n)

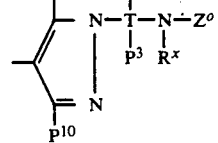 (12o)

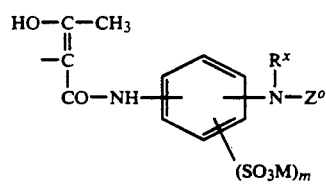 (12p)

in which the individual formula members have the above-mentioned meanings.

Radicals K in the formula (4h) which have an oxygen atom which bonds metal complexes and optionally contain the group Z are, in particular, those of the formulae (13a) to (13f)

 (13a)

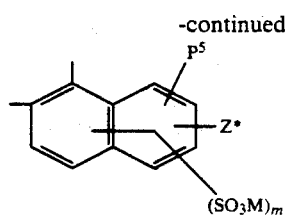
(13b)

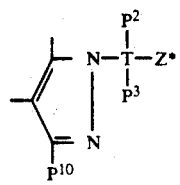
(13c)

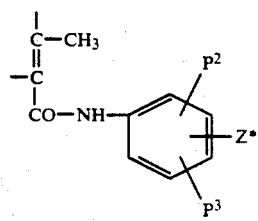
(13d)

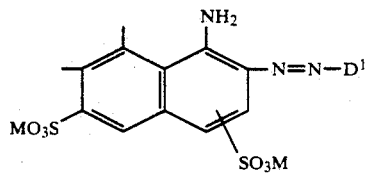
(13e)

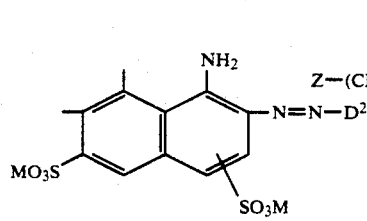
(13f)

themselves also initially serve as coupling components for the preparation of an amino-azo starting compound into which the fiber-reactive radical can then be introduced in the same manner. The coupling components containing the fiber-reactive radical Z° of the general formulae (11a) and (11d) to (11h) can themselves likewise be prepared by reaction of these Z°-free starting compounds containing amino groups with a compound of the formula Hal-Z° analogously to known procedures.

Preferred anthraquinone dyestuffs according to the invention are those which correspond to the general formula (14)

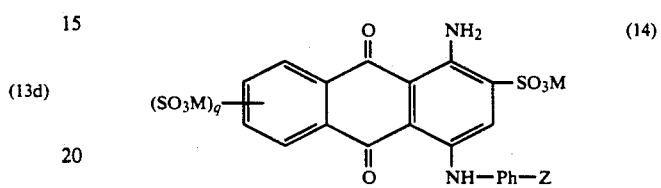
(14)

in which

M is a hydrogen atom or an alkali metal, such as sodium, potassium or lithium, q is the number zero or 1 (this group being a hydrogen atom in the case where q is zero), Ph is a phenylene radical, which can be substituted by 1 or 2 substituents from the group comprising alkyl having 1 to 4 carbon atoms, such as methyl and ethyl, alkoxy having 1 to 4 carbon atoms, such as methoxy and ethoxy, halogen, such as chlorine and bromine, carboxy and sulfo, and Z is the fiber-reactive group of the general formula (3) or preferably (3a) or (3b).

Preferred triphendioxazine dyestuffs according to the invention are those which correspond to the general formula (15)

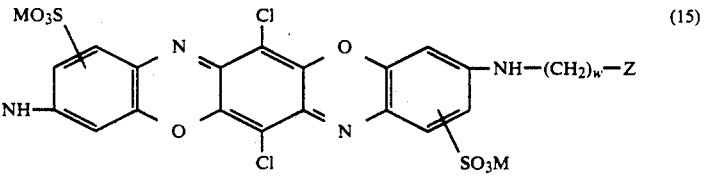
(15)

in which Z* has one of the meanings of P or Z and the formula members have one of the abovementioned meanings.

The abovementioned compounds of the general formulae (11b) and (11c) cannot themselves be employed as coupling components. Z°-free precursors thereof, i.e. which contain an amino group of the formula —N(R$^x$-)—H instead of the group —N(R$^x$)—Z°, are used as coupling components for the synthesis of the azo dyestuffs according to the invention. After these precursors containing amino groups have been coupled with an appropriate diazo component to give the azo compound, the fiber-reactive radical Z° can be introduced into the amino group —N(R$^x$)—H by reaction with a compound of the general formula Hal-Z°, in which Hal is a halogen atom, preferably a fluorine or chlorine atom, and Z° has the abovementioned meaning. Analogously, the Z°-free amino compounds of the compounds of the general formulae (11a) and (11d) to (11h) can in which M is a hydrogen atom or an alkali metal, such as sodium, potassium or lithium, Z is the fiber-reactive group of the general formula (3) or preferably (3a) or (3b) and w is the number 2, 3 or 4, the two sulfo groups —SO$_3$M preferably being bonded to the benzene nucleus in the ortho-position relative to the oxygen atom of the heterocyclic ring.

Preferred phthalocyanine dyestuffs according to the invention are those which correspond to the general formula (16A)

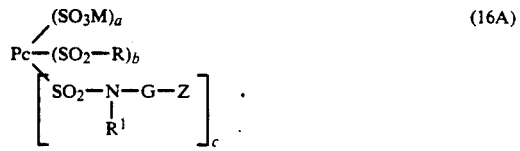
(16A)

in which:

Pc is the radical of a copper or nickel phthalocyanine,

R is an amino group of the formula —$NR^2R^3$, in which $R^2$ and $R^3$ independently of one another are hydrogen or alkyl having 1 to 4 carbon atoms, which can be substituted by hydroxy or sulfo, or is a heterocyclic N-containing radical, such as the morpholino or piperidino radical;

$R^1$ is hydrogen or alkyl having 1 to 4 carbon atoms, such as methyl and ethyl;

G is phenylene, which can be substituted by 1 or 2 substituents from the group comprising alkyl having 1 to 4 carbon atoms, such as ethyl and methyl, halogen, such as chlorine and bromine, carboxy and sulfo, for example sulfophenylene, or is alkylene having 2 to 6 carbon atoms, such as ethylene;

Z is the fiber-reactive group of the formula (3) or preferably (3a) or (3b);

a is a number from 2 to 3, b is a number from zero to 3 and c is a number from 1 to 2, the sum of (a+b+c) being a number from 3 to 4.

Of the copper formazan dyestuffs according to the invention preference is given to those conforming to the formula (16B)

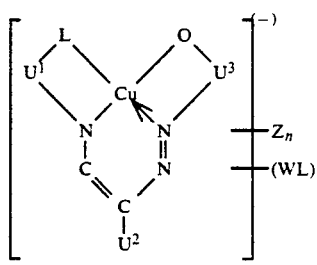

(16B)

in which:

n is 1 or 2, preferably 1;

Z is a fiber-reactive group of the formula (3) or preferably of the formula (3a) or (3b) which is bonded to an aromatic carbon atom of $U^1$ or $U^3$ or to an aliphatic carbon atom of a substituent on $U^1$ or $U^3$, although in the case of n being 2 the two Z radicals are not bonded simultaneously to $U^1$ or $U^3$;

$U^1$ is a benzene or naphthalene ring, preferably a benzene ring, which can each be substituted by substituents selected from the group consisting of hydrogen, such as chlorine or bromine, nitro, alkyl of 1 to 5 carbon atoms, such as methyl or ethyl, alkoxy of 1 to 4 carbon atoms, such as methoxy or ethoxy, alkylsulfonyl of 1 to 4 carbon atoms, such as methylsulfonyl or ethylsulfonyl, phenylsulfonyl, sulfamoyl, and N-monoalkyl- and N,N-dialkyl-sulfamoyl having in each case 1 to 4 carbon atoms in the alkyl;

$U^2$ is a hydrogen atom or a straight-chain or branched-chain alkylene group of 1 to 8 carbon atoms, preferably 1 to 4 carbon atoms, or a straight-chain or branched chain alkenylene group of 2 to 8 carbon atoms, preferably 2 to 4 carbon atoms, which alkylene and alkenylene groups can additionally be substituted by a phenyl radical and this phenyl radical can in turn be substituted by substituents selected from the group consisting of methyl, ethyl, methoxy, ethoxy, fluorine, bromine, chlorine and sulfamoyl, or is an alkylene-phenylene radical having 1 to 4 carbon atoms in the alkylene moiety or an alkenylene-phenylene radical having 2 to 4 carbon atoms in the alkenylene moiety, wherein in each case the phenylene radical can be substituted by substituents selected from the group consisting of methyl, ethyl, methoxy, ethoxy, fluorine, chlorine, bromine and sulfamoyl, or is a phenylene or naphthalene radical, preferably a phenylene radical, which can each be substituted by substituents selected from the group consisting of hydroxyl, nitro, halogen, such as chlorine or bromine, alkyl of 1 to 5 carbon atoms, such as methyl or ethyl, alkoxy of 1 to 4 carbon atoms, such as methoxy or ethoxy, and carbalkoxy having 1 to 4 carbon atoms in the alkyl radical, such as carbomethoxy or carbethoxy, or is the bivalent radical of furan, of thiophene, of pyrrole, of imidazole, of indole, of pyrazole, of pyridine, of pyrimidine, of quinoline or of benzimidazole;

$U^3$ is a benzene or naphthalene ring, preferably a benzene ring, which can each be substituted by substituents selected from the group consisting of hydrogen, such as chlorine or bromine, nitro, alkyl of 1 to 5 carbon atoms, such as methyl or ethyl, alkoxy of 1 to 4 carbon atoms, such as methoxy or ethoxy, alkylsulfonyl of 1 to 4 carbon atoms, such as methylsulfonyl or ethylsulfonyl, phenylsulfonyl, sulfamoyl, and N-monoalkyl- and N,N-dialkyl-sulfamoyl having in each case 1 to 4 carbon atoms in the alkyl;

WL is a water-solubilizing group, such as a carboxy group or preferably a sulfo group, as a substituent on $U^1$, $U^2$ and/or $U^3$ which is additional to the abovementioned, optional substituents for $U^1$, $U^2$ and $U^3$, which is bonded to an aromatic carbon atom or to an aliphatic carbon atom of $U^1$, $U^2$ or $U^3$ or to an aliphatic carbon atom of a substituent, such as a methyl group, on $U^1$, $U^2$ or $U^3$;

q is the number 1, 2 or 3, preferably 1 or 2; if WL is present in the molecule twice or three times, it can have different meanings within the specified meaning;

L is an oxygen atom or the carbonyloxy group of the formula —CO—O—, the group L and the nitrogen atom being bonded to the aromatic nucleus of $U^1$ in ortho-position relative to each other.

Further preferred azo dyestuffs are those which correspond to the general formula (17A) to (17J)

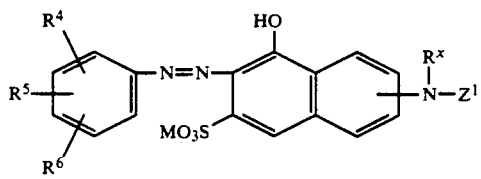

(17A)

-continued
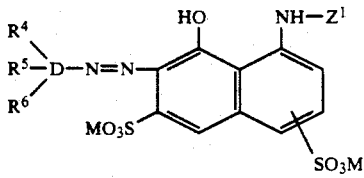 (17B)
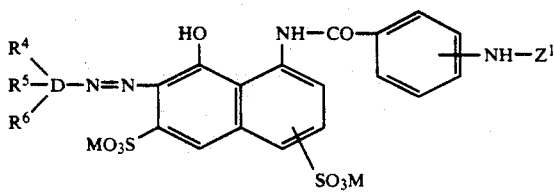 (17C)
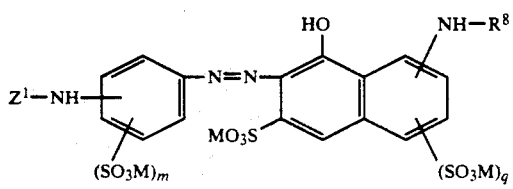 (17D)
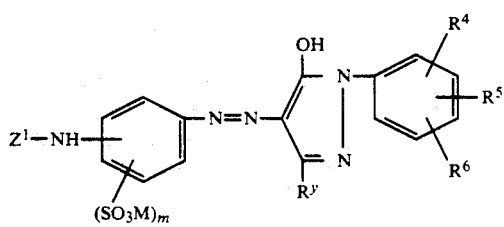 (17E)
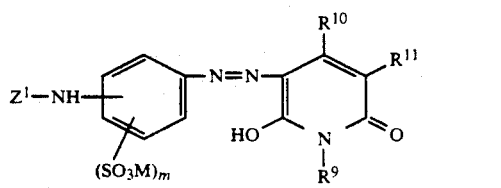 (17F)
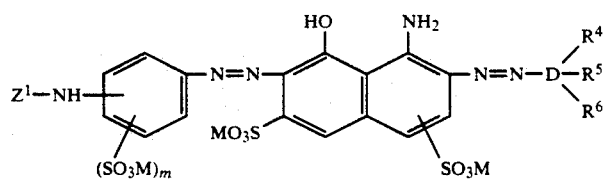 (17G)
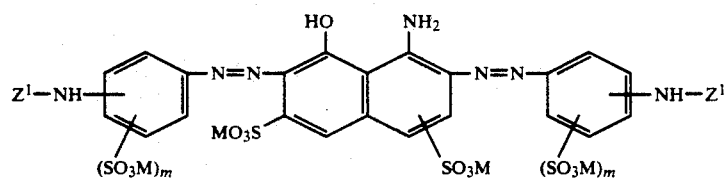 (17H)
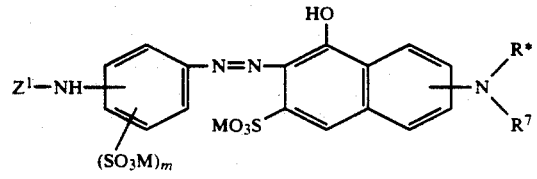 (17J)
in which:
M has one of the abovementioned meanings;
$R^x$ is hydrogen or alkyl having 1 to 4 carbon atoms, such as methyl;
$R^4$ is hydrogen, alkyl having 1 to 4 carbon atoms, such as ethyl and in particular methyl, alkoxy having 1 to 4 carbon atoms, such as ethoxy and in particular methoxy, halogen, such as chlorine and bromine, carboxy, sulfo, β-sulfatoethylsulfonyl, chloroethylsulfonyl or vinylsulfonyl;

$R^5$ is hydrogen, alkyl having 1 to 4 carbon atoms, such as ethyl and in particular methyl, alkoxy having 1 to 4 carbon atoms, such as ethoxy and in particular methoxy, halogen, such as chlorine and bromine, carboxy or sulfo;

$R^6$ is hydrogen or sulfo;

$R^*$ is hydrogen or methyl;

$R^7$ is alkanoyl having 2 to 5 carbon atoms, such as acetyl, or is benzoyl, -sulfatoethylsulfonyl or 3-(β-chloroethylsulfonyl)-benzoyl;

$R^8$ is alkanoyl having 2 to 5 carbon atoms, such as acetyl, or benzoyl;

$R^y$ is methyl or carboxyl;

$R^9$ is hydrogen or alkyl having 1 to 4 carbon atoms, such as methyl or ethyl, which can be substituted by sulfo or carboxyl, or is phenyl;

$R^{10}$ is hydrogen or alkyl having 1 to 4 carbon atoms, such as methyl, or is phenyl;

$R^{11}$ is hydrogen, cyano, carbamoyl, sulfamoyl or sulfomethyl;

$Z^1$ is a radical of the general formula (3A) or preferably of the general formula (3B) or (3C)

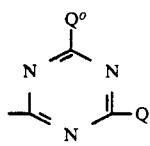
(3A)

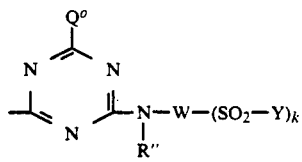
(3B)

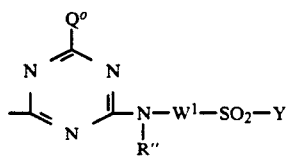
(3C)

in which $R^x$, $Q^o$, Q, R', R", W, $W^1$, Y and k have one of the abovementioned meanings;

D is a benzene ring or is a naphthalene ring, to which the azo group is bonded in the β-position, in which, in the case where D is the naphthalene ring, $R^4$ and $R^5$, preferably each independently of one another, are a hydrogen atom or a sulfo group and $R^6$ is a sulfo group; and m is the number zero, 1 or 2 (this group being hydrogen in the case where m is zero).

Further preferred dyestuffs according to the invention corresponding to the general formula (1) are those of the formulae (18A), (18B), (19) and (20) to (30) given below:

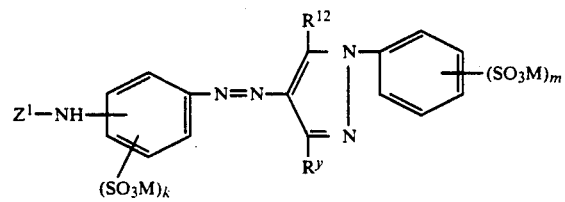
(18A)

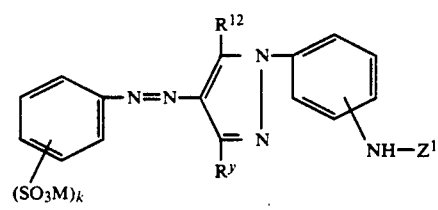
(18B)

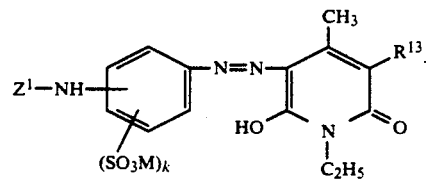
(19)

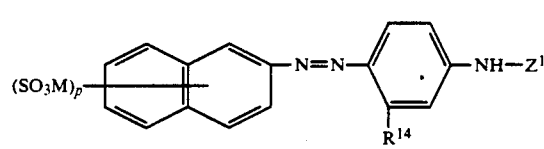
(20)

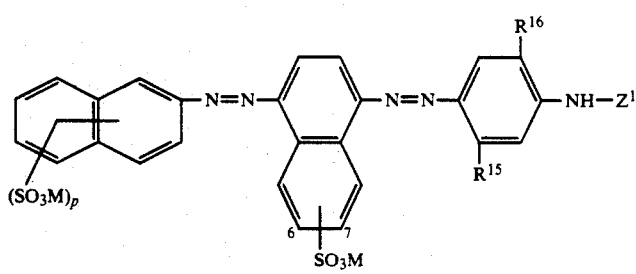
(21)
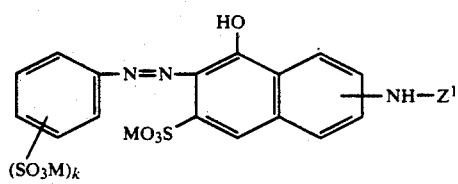
(22)
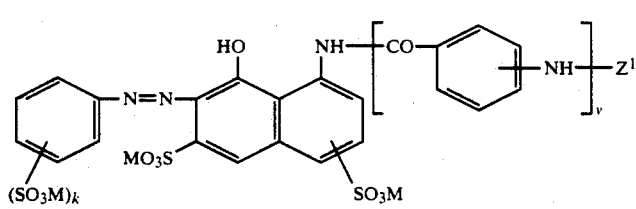
(23)
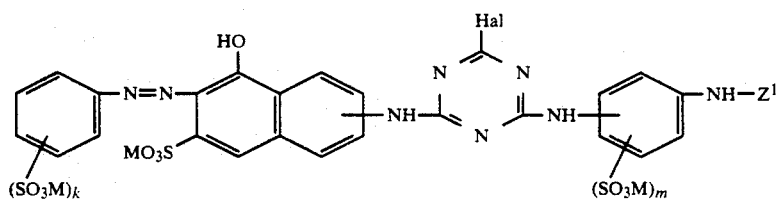
(24)
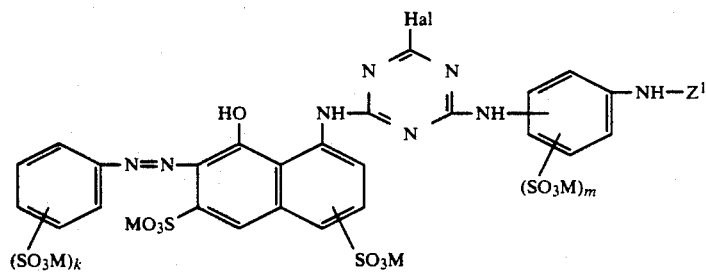
(25)
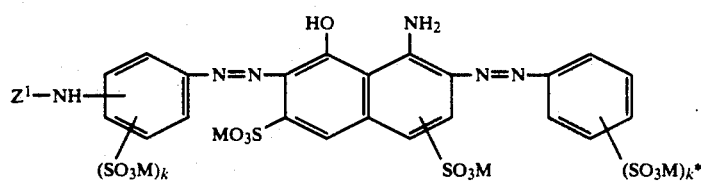
(26)
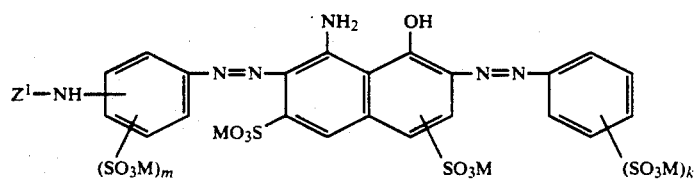
(27)

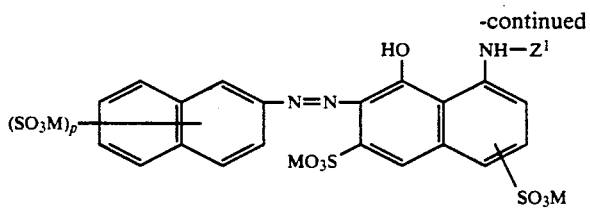
(28)
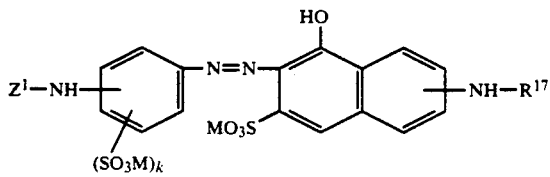
(29)
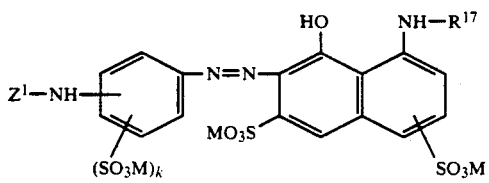
(30)
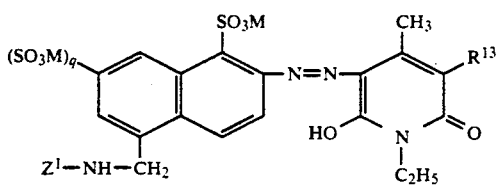
(31)
and furthermore the metal complex dyestuffs, such as the 1:2 chromium and 1:2 cobalt and in particular the 1:1 copper complex dyestuffs, of the compounds of the formulae (32) to (37):
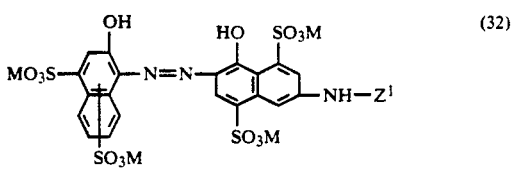
(32)
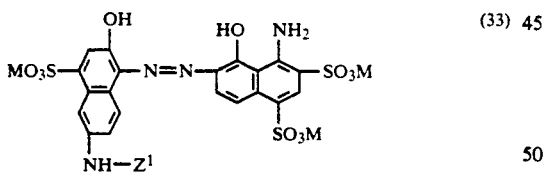
(33)
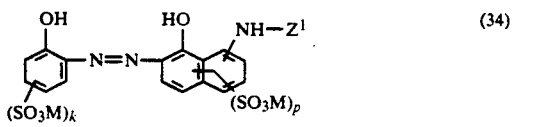
(34)
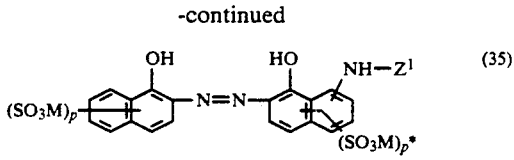
(35)
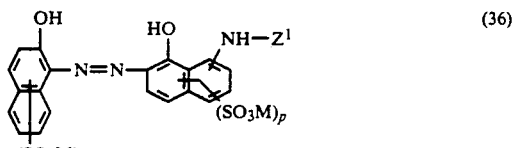
(36)
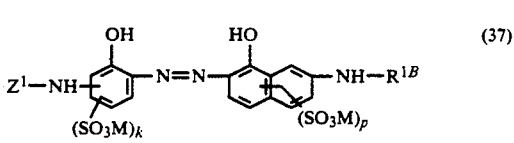
(37)
and furthermore the dyestuffs of the formulae (38) to (55)
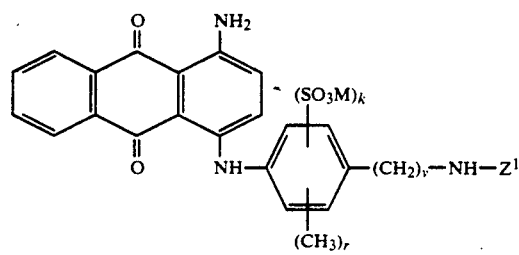
(38)

-continued
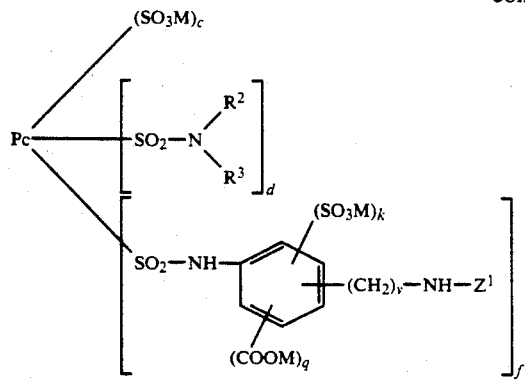 (39)
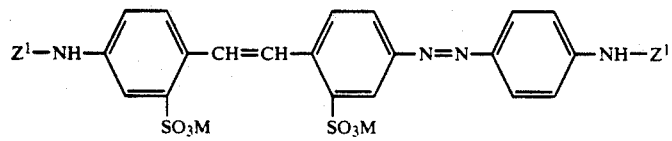 (40)
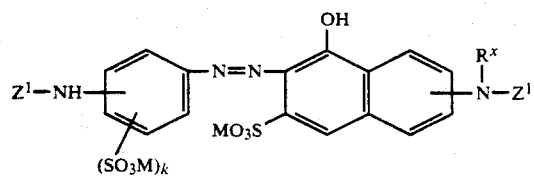 (41)
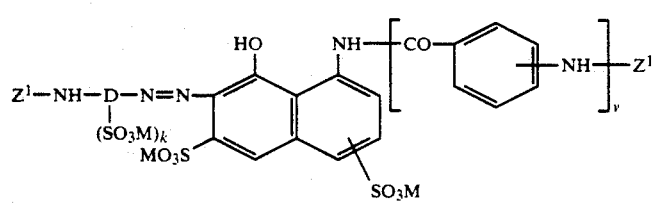 (42)
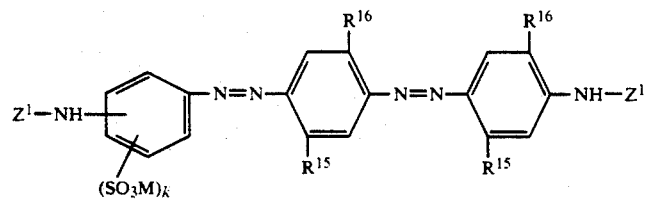 (43)
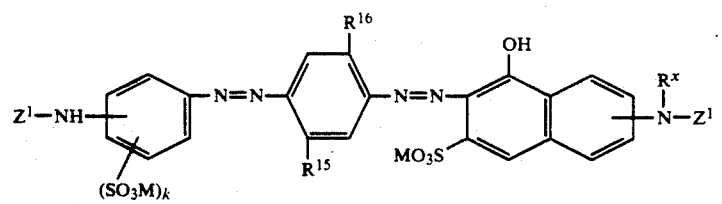 (44)
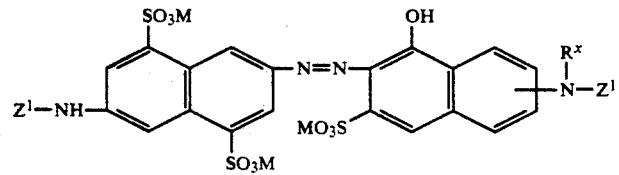 (45)
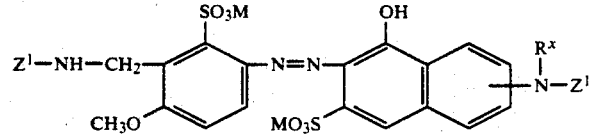 (46)

-continued
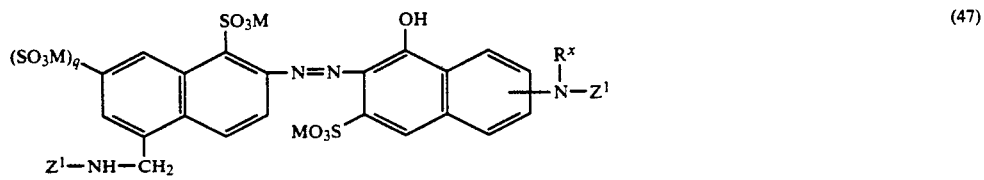
(47)
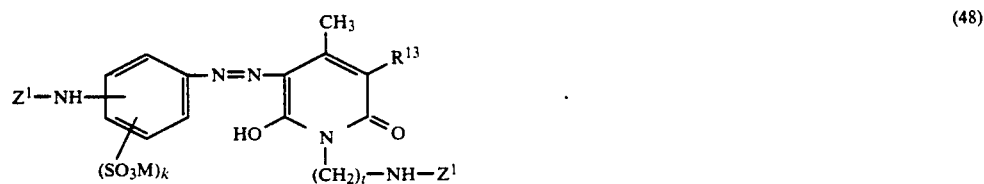
(48)
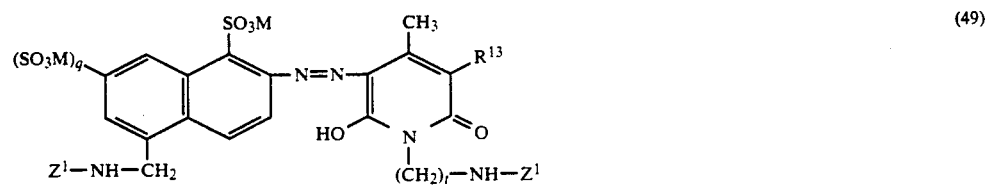
(49)
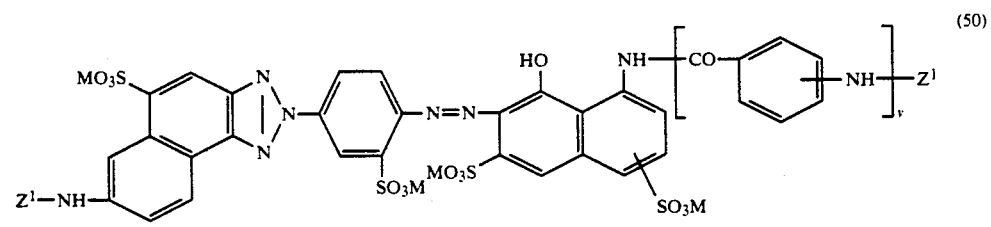
(50)
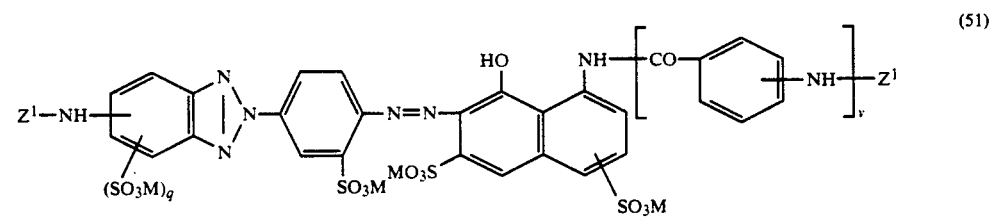
(51)
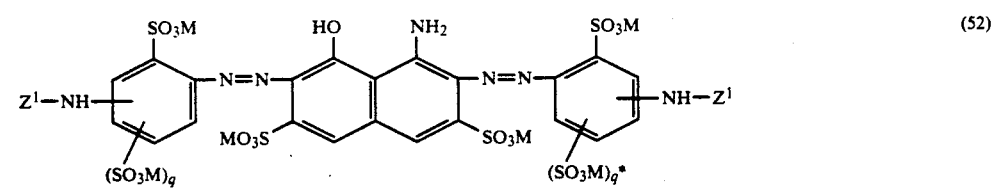
(52)
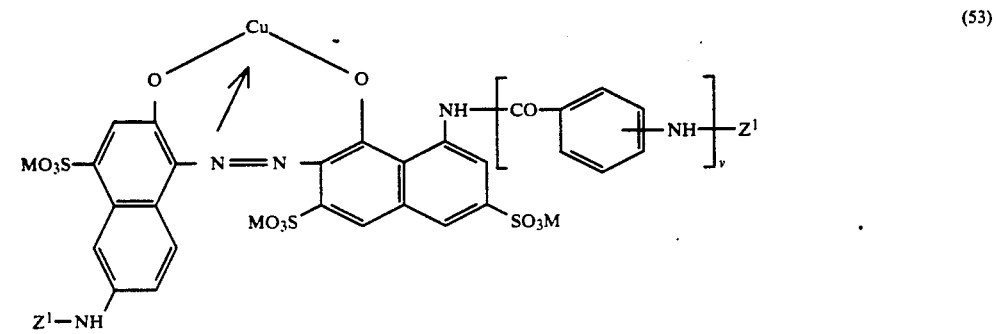
(53)

-continued

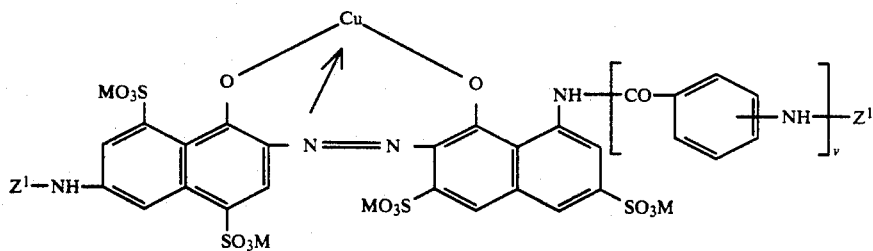 (54)

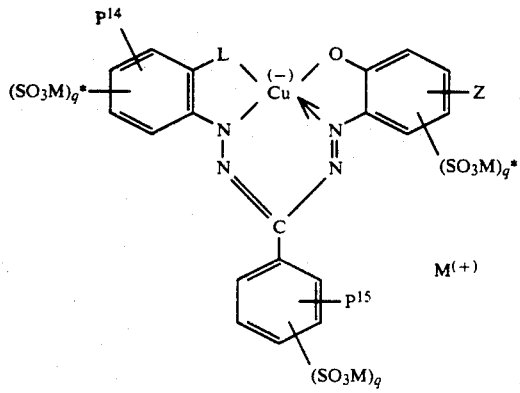 (55)

In these formulae:

M, m, $Z^1$ and $y$ have the abovementioned, particularly preferred, meanings;

k is the number 1 or 2;

k* is the number 1 or 2;

$R^{12}$ is hydroxy or amino;

$R^{13}$ is cyano, carbamoyl or sulfomethyl;

$R^{14}$ is methyl, acetylamino or ureido;

p is the number 1, 2 or 3;

p* is the number 1, 2 or 3;

$R^{15}$ is hydrogen or alkyl having 1 to 4 carbon atoms, such as methyl and ethyl, alkoxy having 1 to 4 carbon atoms, such as methoxy and ethoxy, alkanoylamino having 2 to 5 carbon atoms, such as acetylamino, ureido or halogen, such as bromine and in particular chlorine, but preferably hydrogen, methyl, ethyl, methoxy, ethoxy, acetylamino, ureido or chlorine;

$R^{16}$ is hydrogen, alkyl having 1 to 4 carbon atoms, such as methyl and ethyl, alkoxy having 1 to 4 carbon atoms, such as methoxy and ethoxy, or halogen, such as bromine and in particular chlorine, but preferably hydrogen, methyl, ethyl, methoxy, ethoxy or chlorine;

v is the number zero or 1;

Hal is chlorine or fluorine;

$R^{17}$ is acetyl or benzoyl;

$R^{18}$ is hydrogen or acetyl;

r is the number zero or 1, 2 or 3 (this group being hydrogen in the case where r is zero);

$R^2$ is hydrogen or alkyl having 1 to 4 carbon atoms, such as methyl or ethyl, and $R^3$ is hydrogen or alkyl having 1 to 4 carbon atoms, such as methyl or ethyl, or $R^2$ and $R^3$, together with the N atom, from a heterocyclic radical which contains an alkylene group having 3 to 7 carbon atoms or one or two alkylene groups having 1 to 5 carbon atoms and a further hetero group, such as an N or O atom or a group —NH— or —N(CH$_3$)— or —N(C$_2$H$_5$)—, such as, for example, the N-piperidino or N-morpholino radical;

q is the number zero or 1 (this group being hydrogen in the case where q is zero);

q* is the number zero or 1 (this group being hydrogen in the case where q* is zero);

Pc is the radical of copper phthalocyanine or nickel phthalocyanine;

c is a number from 1 to 3, d is a number from 0.5 to 1.5 and f is a number from 1 to 2, the sum of (c+d+f) being a number from 3 to 4;

$R^x$ is hydrogen or alkyl having 1 to 4 carbon atoms, such as methyl; and t is the number 2 or 3;

$p^{14}$ is hydrogen, alkyl of 1 to 4 carbon atoms, such as methyl or ethyl, alkoxy of 1 to 4 carbon atoms, such as methoxy or ethoxy, or carboxy;

$p^{15}$ is hydrogen, chlorine, alkyl of 1 to 4 carbon atoms, such as methyl or ethyl, or alkoxy of 1 to 4 carbon atoms, such as methoxy or ethoxy;

L is carbonyloxy or preferably an oxygen atom;

Z is a group of the formula (3) or preferably of the formula (3a) or (3b);

the benzene rings indicated in the above dyestuff formulae can be additionally substituted, for example by 1 or 2 substituents selected from the group consisting of methyl, ethyl, methoxy, ethoxy, methylsulfonyl, ethylsulfonyl, carboxyl, acetylamino and chlorine, and the naphthalene rings by a substituent selected from the group consisting of methoxy, carboxy, acetylamino, nitro and chlorine.

Preferred compounds are furthermore those of the general formulae (17B), (20), (21) and (42), in which Z is a radical of the abovementioned general formula (3C), in which $W^1$ is an alkylene group having 2 to 4 carbon atoms, preferably 3 carbon atoms, or is a phenylene radical, which can be substituted by 1 or 2 substituents from the group comprising methyl, ethyl, methoxy, ethoxy and chlorine, Y has one of the abovementioned meanings and is preferably the β-sulfatoethyl group, and R" is hydrogen, methyl or ethyl, in which furthermore, preferably, in formula (17B) D is a naphthalene ring or preferably a benzene ring, $R^4$ is vinylsulfonyl or preferably β-sulfatoethylsulfonyl and $R^5$ and $R^6$ have the abovementioned meanings, M is a hydrogen atom or an alkali metal and $Z^1$ is a radical of the formula (3C), and wherein furthermore preferably, in formula (21) p is the number 2, the two groups —$SO_3M$ being bonded to the naphth-2-yl radical in the 4- and 8-position and the group —$SO_3M$ in the naphthylene central component being bonded in the 6-position, and in which furthermore, preferably, in formula (42) one group —$SO_3M$ in the aminonaphthol radical is in the meta-position relative to the group NH and v is the number zero.

According to the invention, phthalocyanine dyestuffs according to the invention can also be prepared, for example, by using a phthalocyaninesulfonyl chloride or a phthalocyaninesulfonyl chloride containing sulfo groups as the starting substance and reacting this with an amine of the general formula H-Q, where Q has the above-mentioned meaning, and if appropriate with another amine, such as, for example, an amine of the general formula —$NR^2R^3$, where $R^2$ and $R^3$ have the abovementioned meaning. Several such procedures for the reaction of phthalocyaninesulfonyl chlorides with amines are described in the literature, such as, for example, in U.S. Pat. No. 4,745,178 and the literature additionally cited in this respect therein.

The starting sulfonamides of the formula H-Q° are generally well-known and have been extensively described in the literature or can be prepared analogously to known procedures forming part of the general expertise of a chemist.

Numerous starting amines of the general formula H-Q are likewise described in the literature, thus, for example, in German Patents Nos. 887,505 and 965,902, in German Offenlegungsschriften Nos. 2,040,620 and 2,614,550 and in European Patent Application publications Nos. 0,107,614, 0,144,766, 0,159,292 and 0,278,904.

According to the invention, the dyestuffs according to the invention can also be prepared starting from one or more starting substances containing a β-hydroxyethylsulfonyl group, such as from an amine of the general formula H-Q, where Q has the abovementioned meaning, but with the difference that the group(s) of the formula —$SO_2$—Y are β-hydroxyethylsulfonyl groups, by first preparing, analogously to the abovementioned procedures according to the invention, a starting compound which corresponds to the general formula (1) with the meaning given, but with the difference that the group(s) —$SO_2$—Y are β-hydroxyethylsulfonyl groups, and converting the β-hydroxyethylsulfonyl groups in this compound into other groups —$SO_2$—Y corresponding to the compound (1) according to the invention analogously to known procedures, thus, for example, into ester derivatives thereof, such as, for example, of polybasic inorganic acids or of aliphatic and aromatic carboxylic or sulfonic acids, thus, for example, into compounds in which Y is the β-chloroethyl, β-sulfatoethyl, β-phosphatoethyl, thiosulfatoethyl, acetoxyethyl or β-toluylsulfonyloxyethyl group. Examples of esterifying and acylating agents which are suitable for this are the corresponding inorganic or organic acids or anhydrides or halides or amides thereof, such as, for example, sulfuric acid, sulfuric acid containing sulfur trioxide, chlorosulfonic acid, sulfamic acid, phosphoric acid, polyphosphoric acid, phosphorus oxychloride, mixtures of phosphoric acid and phosphorus pentoxide, acetic anhydride, toluenesulfonyl chloride and thionyl chloride.

The sulfation is carried out, for example, by reaction with concentrated sulfuric acid at a temperature between 0° and 20° C. or by reaction with chlorosulfonic acid in a polar organic solvent, such as, for example, N-methylpyrrolidone, at a temperature between 10° and 80° C. The sulfation is preferably carried out by introduction of the starting dyestuff containing β-hydroxyethylsulfonyl groups into sulfuric acid monohydrate at a temperature between 5° and 15° C.

Those compounds in which Y is the vinyl group can be prepared from analogous ester derivatives thereof by means of alkali, thus in an aqueous medium at a pH of 10 to 12 and a temperature between 30° and 50° C. in the course of 10 to 20 minutes. The synthesis of, for example, β-(dialkylamino)-ethylsulfonyl and β-thiosulfatoethylsulfonyl derivatives is carried out by reaction of vinylsulfonyl compounds thereof with the corresponding dialkylamine or with an alkali metal salt of thiosulfuric acid, such as sodium thiosulfate. All of these procedures of conversion of one group —$SO_2$—Y into another are familiar to the expert in this fiber-reactive field and are described in numerous instances in the literature.

The dyestuffs of the formula (1) according to the invention are suitable for dyeing and printing the most diverse materials, such as silk, leather, wool, polyamide fibers and polyurethanes, and in particular all types of fiber materials containing cellulose. Examples of such fiber materials are the natural cellulose fibers, such as cotton, linen and hemp, as well as cellulose and regenerated cellulose. The dyestuffs of the formula (1) are also suitable for dyeing or printing fibers which contain hydroxyl groups and are contained in blended fabrics, for example mixtures of cotton with polyester fibers or polyamide fibers.

The dyestuffs according to the invention can be applied to the fiber and fixed on the fiber in various ways, in particular in the form of aqueous dyestuff solutions and printing pastes. They are suitable both for the exhaustion process and for dyeing by the pad-dyeing process, in which the goods are impregnated with aqueous dyestuff solutions, if appropriate containing salts, and the dyestuff is fixed, after an alkaline treatment or in the presence of alkali, if appropriate under the action of heat. The dyestuffs according to the invention are particularly suitable for the so-called cold pad-batch process, in which the dyestuff is applied to the padder together with the alkali and is then fixed by storage at room temperature for several hours. After fixing, the dyeings or prints are rinsed thoroughly with cold and hot water, if appropriate with addition of a dispersing agent which promotes diffusion of the non-fixed portions.

The present invention therefore also relates to the use of the compounds of the general formula (1) according to the invention for dyeing (including printing) these materials and to processes for dyeing (and printing) such materials by a procedure which is customary per se, in which a compound of the general formula (1) is employed as the coloring agent, by applying the compound of the general formula (1) to the material in an aqueous medium and fixing it on the material by means of heat or by means of an alkaline compound or by means of both.

If anthraquinone dyestuffs according to the invention have an inadequate solubility in the alkaline dye liquor, this deficiency can be overcome in the manner which is known from the literature by addition of dispersing agents or other non-coloring compounds, for example a naphthalenesulfonic acid-formaldehyde condensate or in particular anthraquinone-2-sulfonic acid.

The dyestuffs of the formula (1) are distinguished by a high reactivity, good fixing capacity and very good build-up capacity. They can therefore be employed by the exhaustion dyeing process at low dyeing temperatures and require only short steaming times in the pad-steam process. The degrees of fixing are high and the non-fixed portions can easily be washed out, the difference between the degree of exhaustion and the degree of fixing being remarkably small, i.e. the soaping loss is very low. The dyestuffs of the formula (1) are also particularly suitable for printing, above all on cotton, and similarly also for printing nitrogen containing fibers, for example wool or silk or blended fabrics which contain wool or silk.

The dyeings and prints produced on cellulose fiber materials with the dyestuffs according to the invention have a good depth of color and a high fiber-dyestuff bonding stability both in the acid and in the alkaline range, and furthermore good light-fastness and very good wet-fastness properties, such as fastnesses to washing, water, seawater, overdyeing and perspiration, as well as a good fastness to pleating, fastness to ironing and fastness to rubbing.

The following Examples serve to illustrate the invention. The parts are parts by weight and the percentage data are percentages by weight, unless noted otherwise. Parts by weight bear the same relationship to parts by volume as the kilogram to the liter.

The compounds described by way of their formula in these Examples are shown in the form of the free acids; they are in general prepared and isolated in the form of their alkali metal salts, such as lithium, sodium or potassium salts, and are used for dyeing in the form of their salts.

The starting compounds and components mentioned in the form of the free acid in the following Examples, in particular the Tabular Examples, can likewise be employed in the synthesis as such or in the form of their salts, preferably alkali metal salts.

The absorption maxima ($\lambda_{max}$) in the visible range quoted for the compounds according to the invention have been determined with the aid of alkali metal salts thereof in aqueous solution. In the Tabular Examples, the $\lambda_{max}$ values are placed in parentheses where the color shade is stated; the wavelengths are stated in nm.

EXAMPLE 1

45.3 parts of 3-(2,-sulfo-4,-methoxy-phenylazo)-4-hydroxy-7-amino-naphthalene-2-sulfonic acid are reacted in aqueous solution with 19 parts of cyanuric chloride at a temperature of 0° to 5° C. and a pH of 4. 9.7 parts of methanesulfonamide are then added, the pH is brought to 11 by means of sodium hydroxide solution and the reaction is carried out at a temperature of 40° C. and at a pH between 10 and 11 for about four hours. The monochlorotriazine-azo compound thus prepared is reacted in the synthesis solution with 29.5 parts of 3-($\beta$-sulfatoethylsulfonyl)-aniline at a pH of 4 and a temperature of 85° C. When this condensation reaction has ended, the dyestuff according to the invention formed, which, written in the form of the free acid, corresponds to the formula

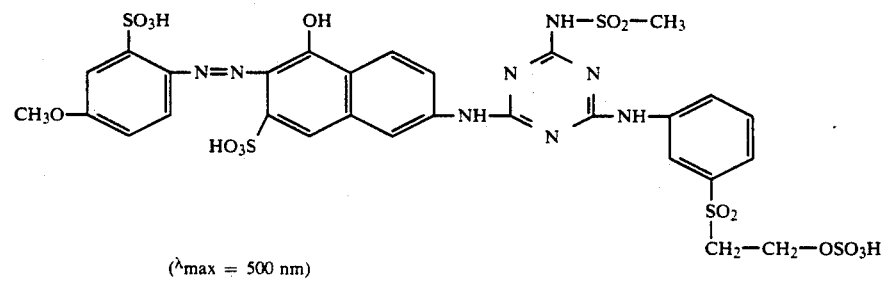

($\lambda_{max}$ = 500 nm)

is isolated as the alkali metal salt (sodium salt) by evaporation under reduced pressure or by spray drying. It has very good fiber-reactive dyestuff properties and, when used by the processes customary for fiber-reactive dyestuffs, gives deep, brilliant scarlet red dyeings and prints having good fastness properties, of which the fastness to water and fastness to perspiration may be emphasized out in particular. It is particularly distinguished by a high degree of fixing both in the exhaustion process at temperatures between 40° and 80° C. and in the cold pad-batch dyeing process. In discharge printing, pure white patterns are obtained on the scarlet-red ground.

EXAMPLE 2

9.7 parts of methanesulfonamide are added to a finely divided suspension of 19 parts of cyanuric chloride in 200 parts of ice-water, the pH is then brought to 10 to 11 with sodium hydroxide solution and the reaction is brought to completion at 0° to 3° C. and at a pH of 11 in the course of one hour, with further stirring. The solution formed is then brought to a pH of 5 with aqueous hydrochloric acid; 24.3 parts of 4-hydroxy-7-methylaminonaphthalene-2-sulfonic acid are added and the condensation reaction is carried out at 20° C. and at a pH of 3 to 3.5 for 2 hours. The sulfuric acid suspension of the diazonium salt, prepared in the customary manner, of 28.8 parts of 2-aminonaphthalene-1,5-disulfonic acid is then added to the solution of the coupling component thus obtained and the coupling reaction is carried out at 10° to 20° C. and at a pH of 6 to 6.5. 29.5 parts of 3-($\beta$-sulfatoethylsulfonyl)aniline are then added and the condensation reaction is carried out at 85° C., a pH of 3.5 to 4 being maintained.

The resulting fiber-reactive dyestuff, which, written in the form of the free acid, has the formula

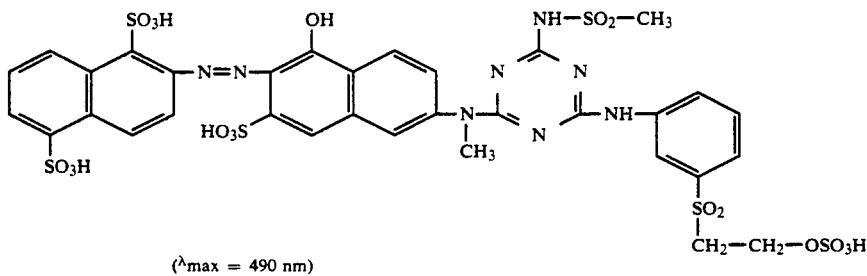

($\lambda_{max}$ = 490 nm)

is isolated as an alkali metal salt (sodium salt), for example after clarification of the synthesis solution by means of kieselguhr and filtration, by evaporation of the filtrate under reduced pressure or by spray drying. The dyestuff according to the invention produces, by the application and fixing processes customary in the art for fiber-reactive dyestuffs, deep orange dyeings having good fastness properties, of which good fastness to water and overdyeing may be emphasized in particular, on the materials mentioned in the description, such as, in particular, cellulose fiber materials, for example cotton. It is furthermore distinguished by a high degree of fixing on cotton.

EXAMPLE 3

To a finely divided suspension of 19 parts of cyanuric chloride in 200 parts of ice-water are added 9.7 parts of methanesulfonamide, a pH of 10 to 11 is set by means of sodium hydroxide solution, and the reaction is completed at 0° to 3° C. with further stirring for one hour while the specified pH range is maintained. The resulting solution is adjusted to pH 4.5 with aqueous hydrochloric acid. 29.5 parts of 4-($\beta$-sulfatoethylsulfonyl)aniline are added, and the condensation reaction is initially carried out for three hours at 20° C., then for about a further two hours at 40° C., and at a pH of 4 to 5. To this batch is then added a solution of 54.5 parts of 3-ureido-4-3',6',8'-trisulfonaphth-2'-yl)azoaniline, and the third condensation reaction is carried out at pH 3.5 and at 85° C. The dyestuff according to the invention formed is isolated as an alkali metal salt (predominantly the potassium salt) by salting out by means of potassium chloride.

It has, written in the form of the free acid, the formula

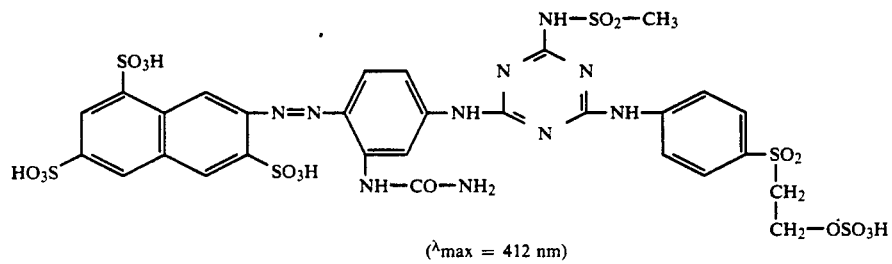

($\lambda_{max}$ = 412 nm)

and dyes the materials mentioned in the description, such as, in particular, cellulose fiber materials, for example cotton, in deep, reddish-tinged yellow fast shades.

EXAMPLE 4

45.3 parts of 3-(2'-sulfo-4'-methoxy-phenyl-azo)4-hydroxy-7-amino-naphthalene-2-sulfonic acid are reacted in aqueous solution with 19 parts of cyanuric chloride at a temperature of 0° to 3° C. and at a pH of 3.5 to 4. When the condensation reaction has ended, 11 parts of ethanesulfonamide are added at a pH of 10 to 11, and the second condensation reaction is completed within this pH range at 40° C. during about three hours. Then 29.5 parts of 3-($\beta$-sulfatoethylsulfonyl)aniline are added to this batch, and the third condensation reaction is carried out at a pH of 3 to 3.5 and a temperature of 85° C.

The azo dyestuff according to the invention obtained as an alkali metal salt (sodium salt) salted out with sodium chloride from the as-synthesized solution adjusted to pH 7 and isolated has written in the form of the free acid the formula

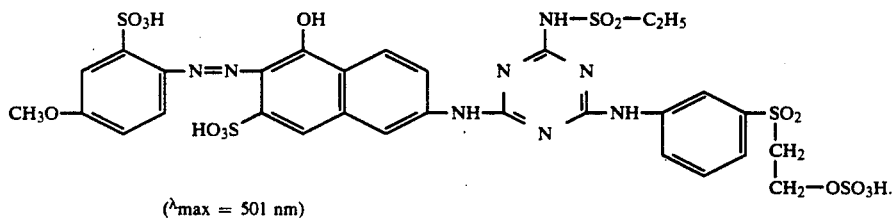

($\lambda_{max}$ = 501 nm)

It exhibits very good fiber-reactive dyestuff properties and dyes the materials mentioned in the description, such as, in particular, cellulose fiber materials, such as cotton, in deep, bright scarlet-red shades with a high degree of fixing.

EXAMPLE 5

To a finely divided suspension of 19 parts of cyanuric chloride is added a suspension of 16 parts of benzenesulfonamide in 200 parts of ice-water, the batch is adjusted to pH 10 to 11 with sodium hydroxide solution and the reaction is completed within this pH range at 0° to 3° C. with further stirring in the course of an hour. The resulting solution is then adjusted to pH 4 with hydrochloric acid and mixed with a solution of 31.9 parts of 8-hydroxy-1-amino-3,6-disulfonic acid in 800 parts of water; the second condensation reaction is carried out at 20° C. and at a pH of 2.5 to 3.

The coupling component thus prepared is admixed in the as-synthesized solution with the conventionally prepared aqueous, hydrochloric acid solution of the diazonium salt of 51.1 parts of 2-amino-6-($\beta$-sulfatoethylsulfonyl)-naphthalene-1-sulfonic acid, and the coupling reaction is carried out at 15° to 30° C. and at a pH of 6. Then a pH of 3 to 3.5 is set, 29.5 parts of 3-($\beta$-sulfatoethylsulfonyl)aniline are added, and the third condensation reaction is carried out within this pH range and at 85° C.

After clarification of the synthesis solution at a pH of 5.5, the resulting dyestuff according to the invention is isolated as an alkali metal salt (sodium salt) by spray drying. It has, written in the form of the free acid, the formula duces, for example, deep, bluish-tinged red fast dyeings and prints at a high degree of fixing on cellulose fiber materials, such as cotton.

EXAMPLES 6 TO 123

Further azo dyestuffs according to the invention are described in the following tabular examples with the aid of the components corresponding to the general formula (A)

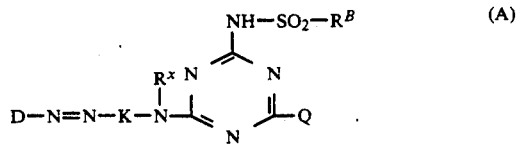

They can be prepared in the manner according to the invention, for example analogously to one of the above Examples, using the components which can be seen from the particular Tabular Example in association with the general formula (A) (such as the diazo component D—$NH_2$, the coupling component H—K—$NR^xH$, a halogenotriazine, the amide of the formula $H_2N$—$SO_2$—$R^B$ and the amine of the formula H-Q). They have very good fiber-reactive dyestuff properties and dye the materials mentioned in the description, in particular cellulose fiber materials, such as cotton, in the shades

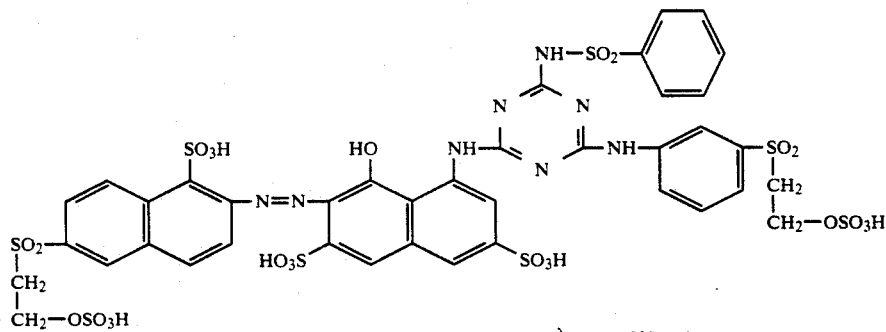

($\lambda_{max}$ = 538 nm)

and exhibits very good fiber-reactive dyestuff properties. When used by the application and fixing processes customary in the art for fiber-reactive dyestuffs, it prostated in the particular Tabular Example (cotton for this purpose) with a good depth of color and with good fastness properties.

| Example | Radical D | Radical —K—N($R^x$)— | Radical $R^B$ | Radical —Q | Hue |
|---|---|---|---|---|---|
| 6 | 3,6,8-trisulfo-naphth-2-yl | 3-ureido-4,1-phenylene-1-amino | ethyl | 3-($\beta$-sulfato-ethylsulfonyl)phenylamino | reddish yellow (412) |
| 7 | 3,6,8-trisulfo-naphth-2-yl | 3-ureido-4,1-phenylene-1-amino | phenyl | 3-($\beta$-sulfato-ethylsulfonyl)phenylamino | reddish yellow (415) |
| 8 | 3,6,8-trisulfo-naphth-2-yl | 3-ureido-4,1-phenylene-1-amino | ethyl | $\gamma$-($\beta$-sulfato-ethylsulfonyl)propylamino | reddish yellow (412) |
| 9 | 3,6,8-trisulfo-naphth-2-yl | 3-ureido-4,1-phenylene-1-amino | methyl | $\gamma$-($\beta$-sulfato-ethylsulfonyl)propylamino | reddish yellow (412) |
| 10 | 3,6,8-trisulfo-naphth-2-yl | 3-ureido-4,1-phenylene-1-amino | phenyl | $\gamma$-($\beta$-sulfato-ethylsulfonyl)propylamino | reddish yellow (415) |
| 11 | 3,6,8-trisulfo-naphth-2-yl | 3-ureido-4,1-phenylene-1-amino | ethyl | 3-(vinylsulfonyl-phenylamino | reddish yellow (412) |
| 12 | 3,6,8-trisulfo-naphth-2-yl | 3-ureido-4,1-phenylene-1-amino | methyl | 3-(vinylsulfonyl)phenylamino | reddish yellow (412) |
| 13 | 3,6,8-trisulfo-naphth-2-yl | 3-ureido-4,1-phenylene-1-amino | phenyl | 3-(vinylsulfonyl)phenylamino | reddish yellow (415) |
| 14 | 4,8-disulfo- | 3-acetylamino-4,1- | ethyl | 3-($\beta$-sulfatoethyl- | reddish yellow (410) |

-continued

| Example | Radical D | Radical —K—N(R$^x$)— | Radical R$^B$ | Radical —Q | Hue |
|---|---|---|---|---|---|
| | naphth-2-yl | phenylene-1-amino | | sulfonyl)-phenyl amino | |
| 15 | 4,8-disulfo-naphth-2-yl | 3-acetylamino-4,1-phenylene-1-amino | methyl | 3-(β-sulfatoethylsulfonyl)-phenyl amino | reddish yellow (410) |
| 16 | 4,8-disulfo-naphth-2-yl | 3-acetylamino-4,1-phenylene-1-amino | phenyl | 3-(β-sulfatoethylsulfonyl)-phenyl amino | reddish yellow (408) |
| 17 | 4,8-disulfo-naphth-2-yl | 3-acetylamino-4,1-phenylene-1-amino | ethyl | 4-(β-sulfatoethylsulfonyl)-phenylamino | reddish yellow (410) |
| 18 | 4,8-disulfo-naphth-2-yl | 3-acetylamino-4,1-phenylene-1-amino | methyl | 4-(β-sulfatoethylsulfonyl)-phenylamino | reddish yellow (410) |
| 19 | 4,8-disulfo-naphth-2-yl | 3-acetylamino-4,1-phenylene-1-amino | phenyl | 4-(β-sulfatoethylsulfonyl)-phenylamino | reddish yellow (408) |
| 20 | 4,8-disulfo-naphth-2-yl | 3-acetylamino-4,1-phenylene-1-amino | ethyl | β-[4-(β'-sulfatoethylsulfonyl)-phen]-ethylamino | reddish yellow (411) |
| 21 | 4,8-disulfo-naphth-2-yl | 3-acetylamino-4,1-phenylene-1-amino | methyl | β-[4-(β'-sulfatoethylsulfonyl)-phen]-ethylamino | " |
| 22 | 4,8-disulfo-naphth-2-yl | 3-acetylamino-4,1-phenylene-1-amino | phenyl | β-[4-(β'-sulfatoethylsulfonyl)-phen]-ethylamino | reddish yellow (410) |
| 23 | 4,8-disulfo-naphth-2-yl | 3-acetylamino-4,1-phenylene-1-amino | ethyl | γ-(β-sulfatoethylsulfonyl)-propylamino | reddish yellow (411) |
| 24 | 4,8-disulfo-naphth-2-yl | 3-acetylamino-4,1-phenylene-1-amino | phenyl | γ-(β-sulfatoethylsulfonyl)-propylamino | " |
| 25 | 4,8-disulfo-naphth-2-yl | 3-acetylamino-4,1-phenylene-1-amino | methyl | γ-(β-sulfatoethylsulfonyl)-propylamino | " |
| 26 | 4,8-disulfo-naphth-2-yl | 3-acetylamino-4,1-phenylene-1-amino | ethyl | bis-[β-(β'-chloroethylsulfonyl)-ethyl]-amino | " |
| 27 | 4,8-disulfo-naphth-2-yl | 3-acetylamino-4,1-phenylene-1-amino | methyl | bis-[β-(β'-chloroethylsulfonyl)-ethyl]-amino | " |
| 28 | 4,8-disulfo-naphth-2-yl | 3-acetylamino-4,1-phenylene-1-amino | phenyl | bis-[β-(β'-chloroethylsulfonyl)-ethyl]-amino | " |
| 29 | 4,8-disulfo-naphth-2-yl | 3-acetylamino-4,1-phenylene-1-amino | ethyl | 2-methoxy-5-(β-sulfatoethylsulfonyl)-phenylamino | reddish yellow (412) |
| 30 | 4,8-disulfo-naphth-2-yl | 3-acetylamino-4,1-phenylene-1-amino | methyl | 2-methoxy-5-(β-sulfatoethylsulfonyl)-phenylamino | " |
| 31 | 4,8-disulfo-naphth-2-yl | 3-acetylamino-4,1-phenylene-1-amino | phenyl | 2-methoxy-5-(β-sulfatoethylsulfonyl)-phenylamino | " |
| 32 | 4,6,8-trisulfo-naphth-2-yl | 3-methyl-4,1-phenylene-1-amino | ethyl | 3-(vinylsulfonyl)-phenylamino | reddish yellow |
| 33 | 4,6,8-trisulfo-naphth-2-yl | 3-methyl-4,1-phenylene-1-amino | methyl | 3-(vinylsulfonyl)-phenylamino | " |
| 34 | 4,6,8-trisulfo-naphth-2-yl | 3-methyl-4,1-phenylene-1-amino | phenyl | 3-(vinylsulfonyl)-phenylamino | " |
| 35 | 4,6,8-trisulfo-naphth-2-yl | 3-methyl-4,1-phenylene-1-amino | ethyl | 4-(β-sulfatoethylsulfonyl)-phenylamino | " |
| 36 | 4,6,8-trisulfo-naphth-2-yl | 3-methyl-4,1-phenylene-1-amino | methyl | 4-(β-sulfatoethylsulfonyl)-phenylamino | " |
| 37 | 4,6,8-trisulfo-naphth-2-yl | 3-methyl-4,1-phenylene-1-amino | phenyl | 4-(β-sulfatoethylsulfonyl)-phenylamino | " |
| 38 | 4,6,8-trisulfo-naphth-2-yl | 3-methyl-4,1-phenylene-1-amino | ethyl | γ-(β'-sulfatoethylsulfonyl)-propylamino | " |
| 39 | 4,6,8-trisulfo-naphth-2-yl | 3-methyl-4,1-phenylene-1-amino | methyl | γ-(β'-sulfatoethylsulfonyl)-propylamino | " |
| 40 | 4,6,8-trisulfo-naphth-2-yl | 3-methyl-4,1-phenylene-1-amino | phenyl | γ-(β'-sulfatoethylsulfonyl)-propylamino | " |
| 41 | 6-(β-sulfatoethylsulfonyl)-1-sulfo-naphth-2-yl | 3-acetylamino-4,1-phenylene-1-amino | ethyl | 3-(β-sulfatoethylsulfonyl)-phenylamino | " |
| 42 | 6-(β-sulfatoethyl- | 3-acetylamino-4,1-phenylene-1-amino | methyl | 3-(β-sulfatoethyl- | " |

-continued

| Example | Radical D | Radical —K—N(R$^x$)— | Radical R$^B$ | Radical —Q | Hue |
|---|---|---|---|---|---|
| | sulfonyl)-1-sulfo-naphth-2-yl | phenylene-1-amino | | sulfonyl)-phenyl-amino | |
| 43 | 6-(β-sulfatoethyl-sulfonyl)-1-sulfo-naphth-2-yl | 3-acetylamino-4,1-phenylene-1-amino | phenyl | 3-(β-sulfatoethyl-sulfonyl)-phenyl-amino | " |
| 44 | 6-(β-sulfatoethyl-sulfonyl)-1-sulfo-naphth-2-yl | 3-acetylamino-4,1-phenylene-1-amino | ethyl | 4-(β-sulfato-ethylsulfonyl)-phenylamino | " |
| 45 | 6-(β-sulfatoethyl-sulfonyl)-1-sulfo-naphth-2-yl | 3-acetylamino-4,1-phenylene-1-amino | methyl | 4-(β-sulfato-ethylsulfonyl)-phenylamino | " |
| 46 | 6-(β-sulfatoethyl-sulfonyl)-1-sulfo-naphth-2-yl | 3-acetylamino-4,1-phenylene-1-amino | phenyl | 4-(β-sulfato-ethylsulfonyl)-phenylamino | " |
| 47 | 6-(β-sulfatoethyl-sulfonyl)-1-sulfo-naphth-2-yl | 3-ureido-4,1-phenylene-1-amino | ethyl | 4-(β-sulfato-ethylsulfonyl)-phenylamino | " |
| 48 | 6-(β-sulfatoethyl-sulfonyl)-1-sulfo-naphth-2-yl | 3-ureido-4,1-phenylene-1-amino | methyl | 4-(β-sulfato-ethylsulfonyl)-phenylamino | " |
| 49 | 6-(β-sulfatoethyl-sulfonyl)-1-sulfo-naphth-2-yl | 3-ureido-4,1-phenylene-1-amino | phenyl | 4-(β-sulfato-ethylsulfonyl)-phenylamino | " |
| 50 | 6-(β-sulfatoethyl-sulfonyl)-1-sulfo-naphth-2-yl | 3-ureido-4,1-phenylene-1-amino | ethyl | 3-(β-sulfato-ethylsulfonyl)-phenylamino | " |
| 51 | 6-(β-sulfatoethyl-sulfonyl)-1-sulfo-naphth-2-yl | 3-ureido-4,1-phenylene-1-amino | methyl | 3-(β-sulfato-ethylsulfonyl)-phenylamino | " |
| 52 | 6-(β-sulfatoethyl-sulfonyl)-1-sulfo-naphth-2-yl | 3-ureido-4,1-phenylene-1-amino | phenyl | 3-(β-sulfato-ethylsulfonyl)-phenylamino | " |
| 53 | 4-(β-sulfatoethyl-sulfonyl)phenyl | 3-amino-4-sulfo-6,1-phenylene-1-amino | ethyl | 4-(β-sulfato-ethylsulfonyl)-phenylamino | golden yellow |
| 54 | 4-(β-sulfatoethyl-sulfonyl)phenyl | 3-amino-4-sulfo-6,1-phenylene-1-amino | methyl | 4-(β-sulfato-ethylsulfonyl)-phenylamino | " |
| 55 | 4-(β-sulfatoethyl-sulfonyl)phenyl | 3-amino-4-sulfo-6,1-phenylene-1-amino | phenyl | 4-(β-sulfato-ethylsulfonyl)-phenylamino | " |
| 56 | 4-(β-sulfatoethyl-sulfonyl)phenyl | 3-amino-4-sulfo-6,1-phenylene-1-amino | ethyl | 3-(β-sulfato-ethylsulfonyl)-phenylamino | golden yellow |
| 57 | 4-(β-sulfatoethyl-sulfonyl)phenyl | 3-amino-4-sulfo-6,1-phenylene-1-amino | methyl | 3-(β-sulfato-ethylsulfonyl)-phenylamino | " |
| 58 | 4-(β-sulfatoethyl-sulfonyl)phenyl | 3-amino-4-sulfo-6,1-phenylene-1-amino | phenyl | 3-(β-sulfato-ethylsulfonyl)-phenylamino | " |
| 59 | 4-(β-sulfatoethyl-sulfonyl)phenyl | 3-amino-4-sulfo-6,1-phenylene-1-amino | ethyl | γ-(β'-sulfato-ethylsulfonyl)-propylamino | golden yellow |
| 60 | 4-(β-sulfatoethyl-sulfonyl)phenyl | 3-amino-4-sulfo-6,1-phenylene-1-amino | methyl | γ-(β'-sulfato-ethylsulfonyl)-propylamino | " |
| 61 | 4-(β-sulfatoethyl-sulfonyl)phenyl | 3-amino-4-sulfo-6,1-phenylene-1-amino | phenyl | γ-(β'-sulfato-ethylsulfonyl)-propylamino | " |
| 62 | 4-(β-sulfatoethyl-sulfonyl)phenyl | 3-amino-4-sulfo-6,1-phenylene-1-amino | ethyl | β-[4-(β'-sulfato-ethylsulfonyl)-phen]-ethylamino | golden yellow |
| 63 | 4-(β-sulfatoethyl-sulfonyl)phenyl | 3-amino-4-sulfo-6,1-phenylene-1-amino | methyl | β-[4-(β'-sulfato-ethylsulfonyl)-phen]-ethylamino | " |
| 64 | 4-(β-sulfatoethyl-sulfonyl)phenyl | 3-amino-4-sulfo-6,1-phenylene-1-amino | phenyl | β-[4-(β'-sulfato-ethylsulfonyl)-phen]-ethylamino | " |
| 65 | 2-sulfo-4-(β-sulfatoethyl sulfonyl)-phenyl | 3-amino-4-sulfo-6,1-phenylene-1-amino | ethyl | 3-(β-sulfato-ethylsulfonyl)-phenylamino | golden yellow |
| 66 | 2-sulfo-4-(β-sulfatoethyl sulfonyl)-phenyl | 3-amino-4-sulfo-6,1-phenylene-1-amino | methyl | 3-(β-sulfato-ethylsulfonyl)-phenylamino | " |
| 67 | 2-sulfo-4-(β-sulfatoethyl sulfonyl)-phenyl | 3-amino-4-sulfo-6,1-phenylene-1-amino | phenyl | 3-(β-sulfato-ethylsulfonyl)-phenylamino | " |
| 68 | 2-sulfo-4-(β-sulfatoethyl sulfonyl)-phenyl | 3-amino-4-sulfo-6,1-phenylene-1-amino | ethyl | 4-(β-sulfato-ethylsulfonyl)-phenylamino | golden yellow |
| 69 | 2-sulfo-4-(β- | 3-amino-4-sulfo- | methyl | 4-(β-sulfato- | " |

-continued

| Example | Radical D | Radical —K—N(R^x)— | Radical R^B | Radical —Q | Hue |
|---|---|---|---|---|---|
|  | sulfatoethyl sulfonyl)-phenyl | 6,1-phenylene-1-amino |  | ethylsulfonyl)-phenylamino |  |
| 70 | 2-sulfo-4-(β-sulfatoethyl sulfonyl)-phenyl | 3-amino-4-sulfo-6,1-phenylene-1-amino | phenyl | 4-(β-sulfato-ethylsulfonyl)-phenylamino | " |
| 71 | 4-sulfophenyl | 3-amino-4-sulfo-6,1-phenylene-1-amino | ethyl | 4-(β-sulfato-ethylsulfonyl)-phenylamino | golden yellow |
| 72 | " | 3-amino-4-sulfo-6,1-phenylene-1-amino | methyl | 4-(β-sulfato-ethylsulfonyl)-phenylamino | " |
| 73 | " | 3-amino-4-sulfo-6,1-phenylene-1-amino | phenyl | 4-(β-sulfato-ethylsulfonyl)-phenylamino | " |
| 74 | " | 3-amino-4-sulfo-6,1-phenylene-1-amino | ethyl | 3-(β-sulfato-ethylsulfonyl)-phenylamino | golden yellow |
| 75 | " | 3-amino-4-sulfo-6,1-phenylene-1-amino | ethyl | γ-(β'-sulfato-ethylsulfonyl)-propylamino | golden yellow |
| 76 | " | 3-amino-4-sulfo-6,1-phenylene-1-amino | methyl | γ-(β'-sulfato-ethylsulfonyl)-propylamino | " |
| 77 | " | 3-amino-4-sulfo-6,1-phenylene-1-amino | phenyl | γ-(β'-sulfato-ethylsulfonyl)-propylamino | " |
| 78 | " | 3-carboxypyrazole-5-on-4-yl-1-(2'-sulfophenyl-4'-amino) | ethyl | 4-(β-sulfato-ethylsulfonyl)-phenylamino | yellow |
| 79 | " | 3-carboxypyrazole-5-on-4-yl-1-(2'-sulfophenyl-4'-amino) | methyl | 4-(β-sulfato-ethylsulfonyl)-phenylamino | yellow |
| 80 | " | 3-carboxypyrazole-5-on-4-yl-1-(2'-sulfophenyl-4'-amino) | phenyl | 4-(β-sulfato-ethylsulfonyl)-phenylamino | yellow |
| 81 | " | 3-carboxypyrazole-5-on-4-yl-1-(2'-sulfophenyl-4'-amino) | ethyl | 3-(β-sulfato-ethylsulfonyl)-phenylamino | yellow |
| 82 | " | 3-carboxypyrazole-5-on-4-yl-1-(2'-sulfophenyl-4'-amino) | methyl | 3-(β-sulfato-ethylsulfonyl)-phenylamino | yellow |
| 83 | " | 3-carboxypyrazole-5-on-4-yl-1-(2'-sulfophenyl-4'-amino) | phenyl | 3-(β-sulfato-ethylsulfonyl)-phenylamino | yellow |
| 84 | 4-(β-sulfato-ethylsulfonyl)-phenyl | 3-carboxypyrazole-5-on-4-yl-1-(2'-sulfophenyl-4'-amino) | ethyl | 3-(β-sulfato-ethylsulfonyl)-phenylamino | yellow |
| 85 | 4-(β-sulfato-ethylsulfonyl)-phenyl | 3-carboxypyrazole-5-on-4-yl-1-(2'-sulfophenyl-4'-amino) | methyl | 3-(β-sulfato-ethylsulfonyl)-phenylamino | yellow |
| 86 | 4-(β-sulfato-ethylsulfonyl)-phenyl | 3-carboxypyrazole-5-on-4-yl-1-(2'-sulfophenyl-4'-amino) | phenyl | 3-(β-sulfato-ethylsulfonyl)-phenylamino | yellow |
| 87 | 4-(β-sulfato-ethylsulfonyl)-phenyl | 3-carboxypyrazole-5-on-4-yl-1-(2'-sulfophenyl-4'-amino) | ethyl | 4-(β-sulfato-ethylsulfonyl)-phenylamino | yellow |
| 88 | 4-(β-sulfato-ethylsulfonyl)-phenyl | 3-carboxypyrazole-5-on-4-yl-1-(2'-sulfophenyl-4'-amino) | methyl | 4-(β-sulfato-ethylsulfonyl)-phenylamino | yellow |
| 89 | 4-(β-sulfato-ethylsulfonyl)-phenyl | 3-carboxypyrazole-5-on-4-yl-1-(2'-sulfophenyl-4'-amino) | phenyl | 4-(β-sulfato-ethylsulfonyl)-phenylamino | yellow |
| 90 | 2-sulfophenyl | 3-carboxypyrazole-5-on-4-yl-1-(2'-sulfophenyl-4'-amino) | ethyl | 4-(β-sulfato-ethylsulfonyl)-phenylamino | yellow |
| 91 | " | 3-carboxypyrazole-5-on-4-yl-1-(2'-sulfophenyl-4'- | methyl | 4-(β-sulfato-ethylsulfonyl)-phenylamino | yellow |

-continued

| Example | Radical D | Radical —K—N(R$^x$)— | Radical R$^B$ | Radical —Q | Hue |
|---|---|---|---|---|---|
| 92 | " | 3-carboxypyrazole-5-on-4-yl-1-(2'-sulfophenyl-4'-amino) | phenyl | 4-(β-sulfato-ethylsulfonyl)-phenylamino | yellow |
| 93 | " | 3-carboxypyrazole-5-on-4-yl-1-(2'-sulfophenyl-4'-amino) | methyl | 3-(β-sulfato-ethylsulfonyl)-phenylamino | yellow |
| 94 | " | 3-carboxypyrazole-5-on-4-yl-1-(2'-sulfophenyl-4'-amino) | ethyl | 3-(β-sulfato-ethylsulfonyl)-phenylamino | yellow |
| 95 | " | 3-carboxypyrazole-5-on-4-yl-1-(2'-sulfophenyl-4'-amino) | phenyl | 3-(β-sulfato-ethylsulfonyl)-phenylamino | yellow |
| 96 | 2,5-disulfophenyl | 4-hydroxy-2-sulfo-3,7-naphthylene-7-amino | methyl | 3-(β-sulfato-ethylsulfonyl)-phenylamino | orange (492) |
| 97 | " | 4-hydroxy-2-sulfo-3,7-naphthylene-7-amino | ethyl | 3-(β-sulfato-ethylsulfonyl)-phenylamino | orange (492) |
| 98 | " | 4-hydroxy-2-sulfo-3,7-naphthylene-7-amino | phenyl | 3-(β-sulfato-ethylsulfonyl)-phenylamino | orange (492) |
| 99 | " | 4-hydroxy-2-sulfo-3,7-naphthylene-7-amino | methyl | 4-(β-sulfato-ethylsulfonyl)-phenylamino | orange (492) |
| 100 | " | 4-hydroxy-2-sulfo-3,7-naphthylene-7-amino | ethyl | 4-(β-sulfato-ethylsulfonyl)-phenylamino | orange (492) |
| 101 | " | 4-hydroxy-2-sulfo-3,7-naphthylene-7-amino | phenyl | 4-(β-sulfato-ethylsulfonyl)-phenylamino | orange (492) |
| 102 | 1,5-disulfo-naphth-2-yl | 4-hydroxy-2-sulfo-3,7-naphthylene-7-amino | methyl | 4-(β-sulfato-ethylsulfonyl)-phenylamino | orange (494) |
| 103 | 1,5-disulfo-naphth-2-yl | 4-hydroxy-2-sulfo-3,7-naphthylene-7-amino | ethyl | 4-(β-sulfato-ethylsulfonyl)-phenylamino | orange (494) |
| 104 | 1,5-disulfo-naphth-2-yl | 4-hydroxy-2-sulfo-3,7-naphthylene-7-amino | phenyl | 4-(β-sulfato-ethylsulfonyl)-phenylamino | orange (494) |
| 105 | 1,5-disulfo-naphth-2-yl | 4-hydroxy-2-sulfo-3,7-naphthylene-7-amino | methyl | 3-(β-sulfato-ethylsulfonyl)-phenylamino | orange (494) |
| 106 | 1,5-disulfo-naphth-2-yl | 4-hydroxy-2-sulfo-3,7-naphthylene-7-amino | ethyl | 4-(β-sulfato-ethylsulfonyl)-phenylamino | orange (494) |
| 107 | 1,5-disulfo-naphth-2-yl | 4-hydroxy-2-sulfo-3,7-naphthylene-7-amino | phenyl | 4-(β-sulfato-ethylsulfonyl)-phenylamino | orange (494) |
| 108 | 1,5-disulfo-naphth-2-yl | 4-hydroxy-2-sulfo-3,7-naphthylene-7-amino | methyl | γ-(β'-sulfato-ethylsulfonyl)-propylamino | orange (495) |
| 109 | 1,5-disulfo-naphth-2-yl | 4-hydroxy-2-sulfo-3,7-naphthylene-7-amino | ethyl | γ-(β'-sulfato-ethylsulfonyl)-propylamino | orange (495) |
| 110 | 1,5-disulfo-naphth-2-yl | 4-hydroxy-2-sulfo-3,7-naphthylene-7-amino | phenyl | γ-(β'-sulfato-ethylsulfonyl)-propylamino | orange (495) |
| 111 | 1,5-disulfo-naphth-2-yl | 4-hydroxy-2-sulfo-3,7-naphthylene-7-amino | ethyl | β-[4-(β'-sulfato-ethylsulfonyl)-phen]-ethylamino | orange (493) |
| 112 | 1,5-disulfo-naphth-2-yl | 4-hydroxy-2-sulfo-3,7-naphthylene-7-amino | methyl | β-[4-(β'-sulfato-ethylsulfonyl)-phen]-ethylamino | orange (493) |
| 113 | 1,5-disulfo-naphth-2-yl | 4-hydroxy-2-sulfo-3,7-naphthylene-7-amino | phenyl | β-[4-(β'-sulfato-ethylsulfonyl)-phen]-ethylamino | orange (493) |
| 114 | 1,5-disulfo-naphth-2-yl | 4-hydroxy-2-sulfo-3,7-naphthylene-7-methylamino | ethyl | 4-(β-sulfatoethyl-sulfonyl)-phenyl-amino | orange |
| 115 | 1,5-disulfo-naphth-2-yl | 4-hydroxy-2-sulfo-3,7-naphthylene-7-methylamino | methyl | 4-(β-sulfatoethyl-sulfonyl)-phenyl-amino | orange (493) |
| 116 | 1,5-disulfo-naphth-2-yl | 4-hydroxy-2-sulfo-3,7-naphthylene-7-methylamino | phenyl | 4-(β-sulfatoethyl-sulfonyl)-phenyl-amino | orange (493) |
| 117 | 6-(β-sulfato- | 4-hydroxy-2-sulfo- | ethyl | 4-(β-sulfatoethyl- | orange |

5,231,172

-continued

| Example | Radical D | Radical —K—N(R$^x$)— | Radical R$^B$ | Radical —Q | Hue |
|---|---|---|---|---|---|
| | ethylsulfonyl)-1-sulfo-naphth-2-yl | 3,7-naphthylene-7-amino | | sulfonyl)-phenyl-amino | |
| 118 | 6-(β-sulfato-ethylsulfonyl)-1-sulfo-naphth-2-yl | 4-hydroxy-2-sulfo-3,7-naphthylene-7-amino | methyl | 4-(β-sulfatoethyl-sulfonyl)-phenyl-amino | orange |
| 119 | 6-(β-sulfato-ethylsulfonyl)-1-sulfo-naphth-2-yl | 4-hydroxy-2-sulfo-3,7-naphthylene-7-amino | phenyl | 4-(β-sulfatoethyl-sulfonyl)-phenyl-amino | orange |
| 120 | 6-(β-sulfato-ethylsulfonyl)-1-sulfo-naphth-2-yl | 4-hydroxy-2-sulfo-3,7-naphthylene-7-amino | ethyl | 3-(β-sulfato-ethylsulfonyl)-phenylamino | orange |
| 121 | 6-(β-sulfato-ethylsulfonyl)-1-sulfo-naphth-2-yl | 4-hydroxy-2-sulfo-3,7-naphthylene-7-amino | methyl | 3-(β-sulfato-ethylsulfonyl)-phenylamino | orange |
| 122 | 6-(β-sulfato-ethylsulfonyl)-1-sulfo-naphth-2-yl | 4-hydroxy-2-sulfo-3,7-naphthylene-7-amino | phenyl | 3-(β-sulfato-ethylsulfonyl)-phenylamino | orange |
| 123 | 4-methoxy-2-sulfophenyl | 4-hydroxy-2-sulfo-3,7-naphthylene-7-amino | phenyl | 3-(β-sulfato-ethylsulfonyl)-phenylamino | scarlet |
| 124 | 4-methoxy-2-sulfophenyl | 4-hydroxy-2-sulfo-3,7-naphthylene-7-amino | ethyl | 4-(β-sulfatoethyl-sulfonyl)-phenyl-amino | scarlet (500) |
| 125 | 4-methoxy-2-sulfophenyl | 4-hydroxy-2-sulfo-3,7-naphthylene-7-amino | phenyl | 4-(β-sulfatoethyl-sulfonyl)-phenyl-amino | scarlet (500) |
| 126 | 4-methoxy-2-sulfophenyl | 4-hydroxy-2-sulfo-3,7-naphthylene-7-amino | methyl | 4-(β-sulfatoethyl-sulfonyl)-phenyl-amino | scarlet (500) |
| 127 | 4-methoxy-2-sulfophenyl | 4-hydroxy-2-sulfo-3,7-naphthylene-7-amino | ethyl | N-ethyl-N-[4-(β-sulfatoethyl-sulfonyl)-phenyl]-amino | scarlet (500) |
| 128 | 4-methoxy-2-sulfophenyl | 4-hydroxy-2-sulfo-3,7-naphthylene-7-amino | phenyl | N-ethyl-N-[4-(β-sulfatoethyl-sulfonyl)-phenyl]-amino | " |
| 129 | 4-methoxy-2-sulfophenyl | 4-hydroxy-2-sulfo-3,7-naphthylene-7-amino | methyl | N-ethyl-N-[4-(β-sulfatoethyl-sulfonyl)-phenyl]-amino | " |
| 130 | 4-methoxy-2-sulfophenyl | 4-hydroxy-2-sulfo-3,7-naphthylene-7-amino | ethyl | 3,4-di-(β-sulfato-ethylsulfonyl)-phenylamino | scarlet (500) |
| 131 | 4-methoxy-2-sulfophenyl | 4-hydroxy-2-sulfo-3,7-naphthylene-7-amino | phenyl | 3,4-di-(β-sulfato-ethylsulfonyl)-phenylamino | " |
| 132 | 4-methoxy-2-sulfophenyl | 4-hydroxy-2-sulfo-3,7-naphthylene-7-amino | methyl | 3,4-di-(β-sulfato-ethylsulfonyl)-phenylamino | " |
| 133 | 4-methoxy-2-sulfophenyl | 4-hydroxy-2-sulfo-3,7-naphthylene-7-amino | ethyl | 2-methoxy-5-(β-sulfatoethyl-sulfonyl)-phenyl-amino | scarlet (500) |
| 134 | 4-methoxy-2-sulfophenyl | 4-hydroxy-2-sulfo-3,7-naphthylene-7-amino | phenyl | 2-methoxy-5-(β-sulfatoethyl-sulfonyl)-phenyl-amino | " |
| 135 | 4-methoxy-2-sulfophenyl | 4-hydroxy-2-sulfo-3,7-naphthylene-7-amino | methyl | 2-methoxy-5-(β-sulfatoethyl-sulfonyl)-phenyl-amino | " |
| 136 | 4-methoxy-2-sulfophenyl | 4-hydroxy-2-sulfo-3,7-naphthylene-7-amino | ethyl | 6-(β-sulfatoethyl-sulfonyl)-naphth-2-yl-amino | scarlet (500) |
| 137 | 4-methoxy-2-sulfophenyl | 4-hydroxy-2-sulfo-3,7-naphthylene-7-amino | phenyl | 6-(β-sulfatoethyl-sulfonyl)-naphth-2-yl-amino | " |
| 138 | 4-methoxy-2-sulfophenyl | 4-hydroxy-2-sulfo-3,7-naphthylene-7-amino | methyl | 6-(β-sulfatoethyl-sulfonyl)-naphth-2-yl-amino | " |
| 139 | 4-methoxy-2-sulfophenyl | 4-hydroxy-2-sulfo-3,7-naphthylene-7-amino | ethyl | 2,5-di-(β-sulfato-ethylsulfonyl-methyl)-phenylamino | scarlet (500) |
| 140 | 4-methoxy-2- | 4-hydroxy-2-sulfo- | phenyl | 2,5-di-(β-sulfato- | " |

-continued

| Example | Radical —D | Radical —K—N(R$^x$)— | Radical R$^B$ | Radical —Q | Hue |
|---|---|---|---|---|---|
| | sulfophenyl | 3,7-naphthylene-7-amino | | ethylsulfonyl-methyl)-phenylamino | |
| 141 | 4-methoxy-2-sulfophenyl | 4-hydroxy-2-sulfo-3,7-naphthylene-7-amino | methyl | 2,5-di-(β-sulfato-ethylsulfonyl-methyl)-phenylamino | " |
| 142 | 4-methoxy-2-sulfophenyl | 4-hydroxy-2-sulfo-3,7-naphthylene-7-amino | ethyl | 3,5-di-{N-[γ-(β'-sulfatoethylsulfonyl)-propyl]-amidocarbonyl}-phenylamino | scarlet (500) |
| 143 | 4-methoxy-2-sulfophenyl | 4-hydroxy-2-sulfo-3,7-naphthylene-7-amino | phenyl | 3,5-di-(N-[γ-(β'-sulfatoethylsulfonyl)-propyl]-amidocarbonyl)-phenylamino | " |
| 144 | 4-methoxy-2-sulfophenyl | 4-hydroxy-2-sulfo-3,7-naphthylene-7-amino | methyl | 3,5-di-(N-[γ-(β'-sulfatoethylsulfonyl)-propyl]-amidocarbonyl)-phenylamino | " |
| 145 | 4-methoxy-3-(β-sulfatoethyl-sulfonyl)-phenyl | 4-hydroxy-2-sulfo-3,7-naphthylene-7-amino | ethyl | 3-(β-sulfato-ethylsulfonyl)-phenylamino | scarlet |
| 146 | 4-methoxy-3-(β-sulfatoethyl-sulfonyl)-phenyl | 4-hydroxy-2-sulfo-3,7-naphthylene-7-amino | phenyl | 3-(β-sulfato-ethylsulfonyl)-phenylamino | " |
| 147 | 4-methoxy-3-(β-sulfatoethyl-sulfonyl)-phenyl | 4-hydroxy-2-sulfo-3,7-naphthylene-7-amino | methyl | 3-(β-sulfato-ethylsulfonyl)-phenylamino | " |
| 148 | 4-methoxy-3-(β-sulfatoethyl-sulfonyl)-phenyl | 4-hydroxy-2-sulfo-3,7-naphthylene-7-amino | ethyl | 4-(β-sulfato-ethylsulfonyl)-phenylamino | scarlet |
| 149 | 4-methoxy-3-(β-sulfatoethyl-sulfonyl)-phenyl | 4-hydroxy-2-sulfo-3,7-naphthylene-7-amino | phenyl | 4-(β-sulfato-ethylsulfonyl)-phenylamino | " |
| 150 | 4-methoxy-3-(β-sulfatoethyl-sulfonyl)-phenyl | 4-hydroxy-2-sulfo-3,7-naphthylene-7-amino | methyl | 4-(β-sulfato-ethylsulfonyl)-phenylamino | " |
| 151 | 4-(β-sulfato-ethylsulfonyl)-phenyl | 4-hydroxy-2-sulfo-3,6-naphthylene-6-amino | ethyl | 4-(β-sulfato-ethylsulfonyl)-phenylamino | " |
| 152 | 4-(β-sulfato-ethylsulfonyl)-phenyl | 4-hydroxy-2-sulfo-3,6-naphthylene-6-amino | phenyl | 4-(β-sulfato-ethylsulfonyl)-phenylamino | " |
| 153 | 4-(β-sulfato-ethylsulfonyl)-phenyl | 4-hydroxy-2-sulfo-3,6-naphthylene-6-amino | methyl | 4-(β-sulfato-ethylsulfonyl)-phenylamino | " |
| 154 | 4-(β-sulfato-ethylsulfonyl)-phenyl | 4-hydroxy-2-sulfo-3,6-naphthylene-6-amino | ethyl | 3-(β-sulfato-ethylsulfonyl)-phenylamino | yellowish red |
| 155 | 4-(β-sulfato-ethylsulfonyl)-phenyl | 4-hydroxy-2-sulfo-3,6-naphthylene-6-amino | phenyl | 3-(β-sulfato-ethylsulfonyl)-phenylamino | " |
| 156 | 4-(β-sulfato-ethylsulfonyl)-phenyl | 4-hydroxy-2-sulfo-3,6-naphthylene-6-amino | methyl | 3-(β-sulfato-ethylsulfonyl)-phenylamino | " |
| 157 | 4-(β-sulfato-ethylsulfonyl)-phenyl | 4-hydroxy-2,8-disulfo-3,5-naphthylene-5-amino | ethyl | 3-(β-sulfato-ethylsulfonyl)-phenylamino | yellowish red (517) |
| 158 | 4-(β-sulfato-ethylsulfonyl)-phenyl | 4-hydroxy-2,8-disulfo-3,5-naphthylene-5-amino | phenyl | 3-(β-sulfato-ethylsulfonyl)-phenylamino | " |
| 159 | 4-(β-sulfato-ethylsulfonyl)-phenyl | 4-hydroxy-2,8-disulfo-3,5-naphthylene-5-amino | methyl | 3-(β-sulfato-ethylsulfonyl)-phenylamino | " |
| 160 | 4-(β-sulfato-ethylsulfonyl)-phenyl | 4-hydroxy-2,8-disulfo-3,5-naphthylene-5-amino | ethyl | 4-(β-sulfato-ethylsulfonyl)-phenylamino | " |
| 161 | 4-(β-sulfato-ethylsulfonyl)-phenyl | 4-hydroxy-2,8-disulfo-3,5-naphthylene-5-amino | phenyl | 3-(β-sulfato-ethylsulfonyl)-phenylamino | " |
| 162 | 4-(β-sulfato-ethylsulfonyl)-phenyl | 4-hydroxy-2,8-disulfo-3,5-naphthylene-5-amino | methyl | 3-(β-sulfato-ethylsulfonyl)-phenylamino | " |
| 163 | 4-methoxy-2- | 4-hydroxy-2-sulfo- | ethyl | 3-(β-sulfato- | " |

5,231,172

-continued

| Example | Radical D | Radical —K—N(R$^x$)— | Radical R$^B$ | Radical —Q | Hue |
|---|---|---|---|---|---|
| | sulfophenyl | 3,6-naphthylene-6-amino | | ethylsulfonyl)-phenylamino | |
| 164 | 4-methoxy-2-sulfophenyl | 4-hydroxy-2-sulfo-3,6-naphthylene-6-amino | phenyl | 3-(β-sulfatoethylsulfonyl)-phenylamino | " |
| 165 | 4-methoxy-2-sulfophenyl | 4-hydroxy-2-sulfo-3,6-naphthylene-6-amino | methyl | 3-(β-sulfatoethylsulfonyl)-phenylamino | " |
| 166 | 4-methoxy-2-sulfophenyl | 4-hydroxy-2-sulfo-3,6-naphthylene-6-amino | ethyl | 3-(β-sulfatoethylsulfonyl)-phenyl-amino | " |
| 167 | 4-methoxy-2-sulfophenyl | 4-hydroxy-2-sulfo-3,6-naphthylene-6-amino | phenyl | 3-(β-sulfatoethylsulfonyl)-phenyl-amino | " |
| 168 | 4-methoxy-2-sulfophenyl | 4-hydroxy-2-sulfo-3,6-naphthylene-6-amino | methyl | 3-(β-sulfatoethylsulfonyl)-phenyl-amino | " |
| 169 | 2-sulfophenyl | 4-hydroxy-2,7-disulfo-3,5-naphthylene-5-amino | ethyl | 3-(β-sulfatoethylsulfonyl)-phenyl-amino | red (530) |
| 170 | " | 4-hydroxy-2,7-disulfo-3,5-naphthylene-5-amino | phenyl | 3-(β-sulfatoethylsulfonyl)-phenyl-amino | red (530) |
| 171 | " | 4-hydroxy-2,7-disulfo-3,5-naphthylene-5-amino | methyl | 3-(β-sulfatoethylsulfonyl)-phenyl-amino | red (530) |
| 172 | " | 4-hydroxy-2,7-disulfo-3,5-naphthylene-5-amino | ethyl | 4-(β-sulfatoethylsulfonyl)-phenylamino | red (530) |
| 175 | " | 4-hydroxy-2,8-disulfo-3,5-naphthylene-5-amino | ethyl | 3-(β-sulfatoethylsulfonyl)-phenylamino | yellowish red |
| 176 | " | 4-hydroxy-2,8-disulfo-3,5-naphthylene-5-amino | phenyl | 3-(β-sulfatoethylsulfonyl)-phenylamino | yellowish red |
| 177 | " | 4-hydroxy-2,8-disulfo-3,5-naphthylene-5-amino | methyl | 3-(β-sulfatoethylsulfonyl)-phenylamino | " |
| 178 | " | 4-hydroxy-2,8-disulfo-3,5-naphthylene-5-amino | ethyl | 4-(β-sulfatoethylsulfonyl)-phenylamino | " |
| 179 | " | 4-hydroxy-2,8-disulfo-3,5-naphthylene-5-amino | phenyl | 4-(β-sulfatoethylsulfonyl)-phenylamino | " |
| 180 | " | 4-hydroxy-2,8-disulfo-3,5-naphthylene-5-amino | methyl | 4-(β-sulfatoethylsulfonyl)-phenylamino | " |
| 181 | 2,5-dicarboxyphenyl | 4-hydroxy-2,8-disulfo-3,5-naphthylene-5-amino | ethyl | 4-(β-sulfatoethylsulfonyl)-phenylamino | " |
| 182 | 2,5-dicarboxyphenyl | 4-hydroxy-2,8-disulfo-3,5-naphthylene-5-amino | phenyl | 4-(β-sulfatoethylsulfonyl)-phenylamino | " |
| 183 | 2,5-dicarboxyphenyl | 4-hydroxy-2,8-disulfo-3,5-naphthylene-5-amino | methyl | 4-(β-sulfatoethylsulfonyl)-phenylamino | " |
| 184 | 2,5-dicarboxyphenyl | 4-hydroxy-2,8-disulfo-3,5-naphthylene-5-amino | ethyl | 3-(β-sulfatoethylsulfonyl)-phenylamino | " |
| 185 | 2,5-dicarboxyphenyl | 4-hydroxy-2,8-disulfo-3,5-naphthylene-5-amino | phenyl | 3-(β-sulfatoethylsulfonyl)-phenylamino | " |
| 186 | 2,5-dicarboxyphenyl | 4-hydroxy-2,8-disulfo-3,5-naphthylene-5-amino | methyl | 3-(β-sulfatoethylsulfonyl)-phenylamino | " |
| 187 | 2,5-dicarboxyphenyl | 4-hydroxy-2,7-disulfo-3,5-naphthylene-5-amino | ethyl | 3-(β-sulfatoethylsulfonyl)-phenylamino | red (538) |
| 188 | 2,5-dicarboxyphenyl | 4-hydroxy-2,7-disulfo-3,5-naphthylene-5-amino | phenyl | 3-(β-sulfatoethylsulfonyl)-phenylamino | red (538) |
| 189 | 2,5-dicarboxyphenyl | 4-hydroxy-2,7-disulfo-3,5-naphthylene-5-amino | methyl | 3-(β-sulfatoethylsulfonyl)-phenylamino | red (538) |
| 190 | 2,5-dicarboxyphenyl | 4-hydroxy-2,7-disulfo-3,5-naphthylene-5-amino | ethyl | 4-(β-sulfatoethylsulfonyl)-phenylamino | red (538) |
| 191 | 2,5-dicarboxyphenyl | 4-hydroxy-2,7-disulfo-3,5-naphthylene-5-amino | phenyl | 4-(β-sulfatoethylsulfonyl)-phenylamino | red (538) |

| Example | Radical D | Radical —K—N(R$^x$)— | Radical R$^B$ | Radical —Q | Hue |
|---|---|---|---|---|---|
| 192 | 2,5-dicarboxy-phenyl | 4-hydroxy-2,7-di-sulfo-3,5-naphthy-lene-5-amino | methyl | 4-(β-sulfatoethyl-sulfonyl)-phenylamino | red (538) |
| 193 | 2,5-dicarboxy-phenyl | 4-hydroxy-2,7-di-sulfo-3,5-naphthy-lene-5-amino | ethyl | γ-(β'-sulfato-ethylsulfonyl)-propylamino | red (538) |
| 194 | 2,5-dicarboxy-phenyl | 4-hydroxy-2,7-di-sulfo-3,5-naphthy-lene-5-amino | phenyl | γ-(β'-sulfato-ethylsulfonyl)-propylamino | red (538) |
| 195 | 2,5-dicarboxy-phenyl | 4-hydroxy-2,7-di-sulfo-3,5-naphthy-lene-5-amino | methyl | γ-(β'-sulfato-ethylsulfonyl)-propylamino | red (538) |
| 196 | 2,5-dicarboxy-phenyl | 4-hydroxy-2,7-di-sulfo-3,5-naphthy-lene-5-amino | ethyl | β-[4-(β'-sulfato-ethylsulfonyl)-phen]-ethylamino | red (538) |
| 197 | 2,5-dicarboxy-phenyl | 4-hydroxy-2,7-di-sulfo-3,5-naphthy-lene-5-amino | methyl | β-[4-(β'-sulfato-ethylsulfonyl)-phen]-ethylamino | red (538) |
| 198 | 2,5-dicarboxy-phenyl | 4-hydroxy-2,7-di-sulfo-3,5-naphthy-lene-5-amino | phenyl | β-[4-(β'-sulfato-ethylsulfonyl)-phen]-ethylamino | red (538) |
| 199 | 1,5-disulfo-naphth-2-yl | 4-hydroxy-2,7-di-sulfo-3,5-naphthy-lene-5-amino | ethyl | β-[4-(β'-sulfato-ethylsulfonyl)-phen]-ethylamino | bluish red (546) |
| 200 | 1,5-disulfo-naphth-2-yl | 4-hydroxy-2,7-di-sulfo-3,5-naphthy-lene-5-amino | methyl | β-[4-(β'-sulfato-ethylsulfonyl)-phen]-ethylamino | " |
| 201 | 1,5-disulfo-naphth-2-yl | 4-hydroxy-2,7-di-sulfo-3,5-naphthy-lene-5-amino | phenyl | β-[4-(β'-sulfato-ethylsulfonyl)-phen]-ethylamino | " |
| 202 | 1,5-disulfo-naphth-2-yl | 4-hydroxy-2,7-di-sulfo-3,5-naphthy-lene-5-amino | ethyl | 4-(β-sulfato-ethylsulfonyl)-phenylamino | " |
| 203 | 1,5-disulfo-naphth-2-yl | 4-hydroxy-2,7-di-sulfo-3,5-naphthy-lene-5-amino | methyl | 4-(β-sulfato-ethylsulfonyl)-phenylamino | " |
| 204 | 1,5-disulfo-naphth-2-yl | 4-hydroxy-2,7-di-sulfo-3,5-naphthy-lene-5-amino | phenyl | 4-(β-sulfato-ethylsulfonyl)-phenylamino | " |
| 205 | 1,5-disulfo-naphth-2-yl | 4-hydroxy-2,7-di-sulfo-3,5-naphthy-lene-5-amino | ethyl | 3-(β-sulfato-ethylsulfonyl)-phenylamino | " |
| 206 | 1,5-disulfo-naphth-2-yl | 4-hydroxy-2,7-di-sulfo-3,5-naphthy-lene-5-amino | methyl | 3-(β-sulfato-ethylsulfonyl)-phenylamino | " |
| 207 | 1,5-disulfo-naphth-2-yl | 4-hydroxy-2,7-di-sulfo-3,5-naphthy-lene-5-amino | phenyl | 3-(β-sulfato-ethylsulfonyl)-phenylamino | " |
| 208 | 1,5-disulfo-naphth-2-yl | 4-hydroxy-2,7-di-sulfo-3,5-naphthy-lene-5-amino | ethyl | N-ethyl-N-[4-(β-sulfatoethyl-sulfonyl)-phenyl]-amino | " |
| 209 | 1,5-disulfo-naphth-2-yl | 4-hydroxy-2,7-di-sulfo-3,5-naphthy-lene-5-amino | phenyl | N-ethyl-N-[4-(β-sulfatoethyl-sulfonyl)-phenyl]-amino | " |
| 210 | 1,5-disulfo-naphth-2-yl | 4-hydroxy-2,7-di-sulfo-3,5-naphthy-lene-5-amino | methyl | N-ethyl-N-[4-(β-sulfatoethyl-sulfonyl)-phenyl]-amino | " |
| 211 | 1,5-disulfo-naphth-2-yl | 4-hydroxy-2,7-di-sulfo-3,5-naphthy-lene-5-amino | ethyl | γ-(β'-sulfato-ethylsulfonyl)-propylamino | " |
| 212 | 1,5-disulfo-naphth-2-yl | 4-hydroxy-2,7-di-sulfo-3,5-naphthy-lene-5-amino | phenyl | γ-(β'-sulfato-ethylsulfonyl)-propylamino | " |
| 213 | 1,5-disulfo-naphth-2-yl | 4-hydroxy-2,7-di-sulfo-3,5-naphthy-lene-5-amino | methyl | γ-(β'-sulfato-ethylsulfonyl)-propylamino | " |
| 214 | 1,5-disulfo-naphth-2-yl | 4-hydroxy-2,8-disulfo-3,5-naphthy-lene-5-amino | ethyl | 4-(β-sulfato-ethylsulfonyl)-phenylamino | red |
| 215 | 1,5-disulfo-naphth-2-yl | 4-hydroxy-2,8-disulfo-3,5-naphthy-lene-5-amino | phenyl | 4-(β-sulfato-ethylsulfonyl)-phenylamino | red |
| 216 | 1,5-disulfo-naphth-2-yl | 4-hydroxy-2,8-disulfo-3,5-naphthy-lene-5-amino | methyl | 4-(β-sulfato-ethylsulfonyl)-phenylamino | red |
| 217 | 4-(β-sulfatoethyl- | 4-hydroxy-2,8- | ethyl | 4-(β-sulfato- | red |

-continued

| Example | Radical D | Radical —K—N(R$^x$)— | Radical R$^B$ | Radical —Q | Hue |
|---|---|---|---|---|---|
| | sulfonyl)-phenyl | disulfo-3,5-naphthylene-5-amino | | ethylsulfonyl)-phenylamino | |
| 218 | 4-(β-sulfatoethylsulfonyl)-phenyl | 4-hydroxy-2,8-disulfo-3,5-naphthylene-5-amino | phenyl | 4-(β-sulfatoethylsulfonyl)-phenylamino | red |
| 219 | 4-(β-sulfatoethylsulfonyl)-phenyl | 4-hydroxy-2,8-disulfo-3,5-naphthylene-5-amino | methyl | 4-(β-sulfatoethylsulfonyl)-phenylamino | red |
| 220 | 4-(β-sulfatoethylsulfonyl)-phenyl | 4-hydroxy-2,8-disulfo-3,5-naphthylene-5-amino | ethyl | 3-(β-sulfatoethylsulfonyl)-phenylamino | red |
| 221 | 4-(β-sulfatoethylsulfonyl)-phenyl | 4-hydroxy-2,8-disulfo-3,5-naphthylene-5-amino | phenyl | 3-(β-sulfatoethylsulfonyl)-phenylamino | red |
| 222 | 4-(β-sulfatoethylsulfonyl)-phenyl | 4-hydroxy-2,8-disulfo-3,5-naphthylene-5-amino | methyl | 3-(β-sulfatoethylsulfonyl)-phenylamino | red |
| 223 | 1:1 nickel complex of: 2-hydroxy-6-(β-sulfatoethylsulfonyl)phenyl | 4-hydroxy-2,7-disulfo-3,5-naphthylene-5-amino | methyl | 3-(β-sulfatoethylsulfonyl)-phenylamino | violet |
| 224 | 4-(β-sulfatoethylsulfonyl)-phenyl | 4-hydroxy-2,7-disulfo-3,5-naphthylene-5-amino | ethyl | 3-(β-sulfatoethylsulfonyl)-phenylamino | red (543) |
| 225 | 4-(β-sulfatoethylsulfonyl)-phenyl | 4-hydroxy-2,7-disulfo-3,5-naphthylene-5-amino | phenyl | 3-(β-sulfatoethylsulfonyl)-phenylamino | red (543) |
| 226 | 4-(β-sulfatoethylsulfonyl)-phenyl | 4-hydroxy-2,7-disulfo-3,5-naphthylene-5-amino | methyl | 3-(β-sulfatoethylsulfonyl)-phenylamino | red (543) |
| 227 | 4-(β-sulfatoethylsulfonyl)-phenyl | 4-hydroxy-2,7-disulfo-3,5-naphthylene-5-amino | ethyl | 4-(β-sulfatoethylsulfonyl)-phenylamino | red (542) |
| 228 | 4-(β-sulfatoethylsulfonyl)-phenyl | 4-hydroxy-2,7-disulfo-3,5-naphthylene-5-amino | phenyl | 4-(β-sulfatoethylsulfonyl)-phenylamino | red (542) |
| 229 | 4-(β-sulfatoethylsulfonyl)-phenyl | 4-hydroxy-2,7-disulfo-3,5-naphthylene-5-amino | methyl | 4-(β-sulfatoethylsulfonyl)-phenylamino | red (542) |
| 230 | 4-(β-sulfatoethylsulfonyl)-phenyl | 4-hydroxy-2,7-disulfo-3,5-naphthylene-5-amino | ethyl | γ-(β'-sulfatoethylsulfonyl)-propylamino | red (542) |
| 231 | 4-(β-sulfatoethylsulfonyl)-phenyl | 4-hydroxy-2,7-disulfo-3,5-naphthylene-5-amino | phenyl | γ-(β'-sulfatoethylsulfonyl)-propylamino | red (542) |
| 232 | 4-(β-sulfatoethylsulfonyl)-phenyl | 4-hydroxy-2,7-disulfo-3,5-naphthylene-5-amino | methyl | γ-(β'-sulfatoethylsulfonyl)-propylamino | red (542) |
| 233 | 4-(β-sulfatoethylsulfonyl)-phenyl | 4-hydroxy-2,7-disulfo-3,5-naphthylene-5-amino | ethyl | β-[4-(β'-sulfatoethylsulfonyl)-phen]-ethylamino | red |
| 234 | 4-(β-sulfatoethylsulfonyl)-phenyl | 4-hydroxy-2,7-disulfo-3,5-naphthylene-5-amino | phenyl | β-[4-(β'-sulfatoethylsulfonyl)-phen]-ethylamino | red |
| 235 | 4-(β-sulfatoethylsulfonyl)-phenyl | 4-hydroxy-2,7-disulfo-3,5-naphthylene-5-amino | methyl | β-[4-(β'-sulfatoethylsulfonyl)-phen]-ethylamino | red |
| 236 | 4-(β-sulfatoethylsulfonyl)-phenyl | 4-hydroxy-2,7-disulfo-3,5-naphthylene-5-amino | ethyl | 2-methoxy-5-(β-sulfatoethylsulfonyl)-phenylamino | red |
| 237 | 4-(β-sulfatoethylsulfonyl)-phenyl | 4-hydroxy-2,7-disulfo-3,5-naphthylene-5-amino | phenyl | 2-methoxy-5-(β-sulfatoethylsulfonyl)-phenylamino | red |
| 238 | 4-(β-sulfatoethylsulfonyl)-phenyl | 4-hydroxy-2,7-disulfo-3,5-naphthylene-5-amino | methyl | 2-methoxy-5-(β-sulfatoethylsulfonyl)-phenylamino | red |

-continued

| Example | Radical D | Radical —K—N(R$^x$)— | Radical R$^B$ | Radical —Q | Hue |
|---|---|---|---|---|---|
| 239 | 3-(β-sulfato-ethylsulfonyl)-phenyl | 4-hydroxy-2,7-disulfo-3,5-naphthylene-5-amino | ethyl | 4-(β-sulfatoethyl-sulfonyl)-phenyl-amino | red |
| 240 | 3-(β-sulfato-ethylsulfonyl)-phenyl | 4-hydroxy-2,7-disulfo-3,5-naphthylene-5-amino | phenyl | 4-(β-sulfatoethyl-sulfonyl)-phenyl-amino | red |
| 241 | 3-(β-sulfato-ethylsulfonyl)-phenyl | 4-hydroxy-2,7-disulfo-3,5-naphthylene-5-amino | methyl | 4-(β-sulfatoethyl-sulfonyl)-phenyl-amino | red |
| 242 | 2-sulfo-4-(β-sulfatoethyl-sulfonyl)-phenyl | 4-hydroxy-2,7-disulfo-3,5-naphthylene-5-amino | ethyl | 4-(β-sulfatoethyl-sulfonyl)-phenyl-amino | yellowish red |
| 243 | 2-sulfo-4-(β-sulfatoethyl-sulfonyl)-phenyl | 4-hydroxy-2,7-disulfo-3,5-naphthylene-5-amino | phenyl | 4-(β-sulfatoethyl-sulfonyl)-phenyl-amino | " |
| 244 | 2-sulfo-4-(β-sulfatoethyl-sulfonyl)-phenyl | 4-hydroxy-2,7-disulfo-3,5-naphthylene-5-amino | methyl | 4-(β-sulfatoethyl-sulfonyl)-phenyl-amino | " |
| 245 | 6-β-sulfato-ethylsulfonyl)-1-sulfo-naphth-2-yl | 4-hydroxy-2,7-disulfo-3,5-naphthylene-5-amino | ethyl | | bluish red |
| 246 | 6-β-sulfato-ethylsulfonyl)-1-sulfo-naphth-2-yl | 4-hydroxy-2,7-disulfo-3,5-naphthylene-5-amino | phenyl | 4-(β-sulfatoethyl-sulfonyl)-phenyl-amino | " |
| 247 | 6-β-sulfato-ethylsulfonyl)-1-sulfo-naphth-2-yl | 4-hydroxy-2,7-disulfo-3,5-naphthylene-5-amino | methyl | 4-(β-sulfatoethyl-sulfonyl)-phenyl-amino | " |
| 248 | 6-β-sulfato-ethylsulfonyl)-1-sulfo-naphth-2-yl | 4-hydroxy-2,7-disulfo-3,5-naphthylene-5-amino | ethyl | 3-(β-sulfatoethyl-sulfonyl)-phenyl-amino | " |
| 249 | 6-β-sulfato-ethylsulfonyl)-1-sulfo-naphth-2-yl | 4-hydroxy-2,7-disulfo-3,5-naphthylene-5-amino | phenyl | 3-(β-sulfatoethyl-sulfonyl)-phenyl-amino | red |
| 250 | 6-β-sulfato-ethylsulfonyl)-1-sulfo-naphth-2-yl | 4-hydroxy-2,7-disulfo-3,5-naphthylene-5-amino | methyl | 3-(β-sulfatoethyl-sulfonyl)-phenyl-amino | red |
| 251 | 6-β-sulfato-ethylsulfonyl)-1-sulfo-naphth-2-yl | 4-hydroxy-2,7-disulfo-3,5-naphthylene-5-amino | ethyl | γ-(β'-sulfatoethyl-sulfonyl)-propyl-amino | red |
| 252 | 6-β-sulfato-ethylsulfonyl)-1-sulfo-naphth-2-yl | 4-hydroxy-2,7-disulfo-3,5-naphthylene-5-amino | phenyl | γ-(β'-sulfatoethyl-sulfonyl)-propyl-amino | red |
| 253 | 6-β-sulfato-ethylsulfonyl)-1-sulfo-naphth-2-yl | 4-hydroxy-2,7-disulfo-3,5-naphthylene-5-amino | methyl | γ-(β'-sulfatoethyl-sulfonyl)-propyl-amino | red |
| 254 | 6-β-sulfato-ethylsulfonyl)-1-sulfo-naphth-2-yl | 4-hydroxy-2,8-di-sulfo-3,5-naph-thylene-5-amino | ethyl | 4-(β-sulfatoethyl-sulfonyl)-phenyl-amino | red |
| 255 | 6-β-sulfato-ethylsulfonyl)-1-sulfo-naphth-2-yl | 4-hydroxy-2,8-di-sulfo-3,5-naph-thylene-5-amino | phenyl | 4-(β-sulfatoethyl-sulfonyl)-phenyl-amino | red |
| 256 | 6-β-sulfato-ethylsulfonyl)-1-sulfo-naphth-2-yl | 4-hydroxy-2,8-di-sulfo-3,5-naph-thylene-5-amino | methyl | 4-(β-sulfatoethyl-sulfonyl)-phenyl-amino | red |
| 257 | 6-β-sulfato-ethylsulfonyl)-1-sulfo-naphth-2-yl | 4-hydroxy-2,8-di-sulfo-3,5-naph-thylene-5-amino | ethyl | 3-(β-sulfatoethyl-sulfonyl)-phenyl-amino | red |
| 258 | 6-β-sulfato-ethylsulfonyl)-1-sulfo-naphth-2-yl | 4-hydroxy-2,8-di-sulfo-3,5-naph-thylene-5-amino | phenyl | 3-(β-sulfatoethyl-sulfonyl)-phenyl-amino | red |
| 259 | 6-β-sulfato-ethylsulfonyl)-1-sulfo-naphth-2-yl | 4-hydroxy-2,8-di-sulfo-3,5-naph-thylene-5-amino | methyl | 3-(β-sulfatoethyl-sulfonyl)-phenyl-amino | red |
| 260 | 3-sulfo-4-phenyl-aminophenyl | 4-hydroxy-2,7-di-sulfo-3,5-naph-thylene-5-amino | ethyl | 3-(β-sulfatoethyl-sulfonyl)-phenyl-amino | blue (590) |

-continued

| Example | Radical D | Radical —K—N(R$^x$)— | Radical R$^B$ | Radical —Q | Hue |
|---|---|---|---|---|---|
| 261 | 3-sulfo-4-phenyl-aminophenyl | 4-hydroxy-2,7-disulfo-3,5-naphthylene-5-amino | phenyl | 3-(β-sulfatoethyl-sulfonyl)-phenyl-amino | blue (590) |
| 262 | 3-sulfo-4-phenyl-aminophenyl | 4-hydroxy-2,7-disulfo-3,5-naphthylene-5-amino | methyl | 3-(β-sulfatoethyl-sulfonyl)-phenyl-amino | blue (590) |
| 263 | 3-sulfo-4-phenyl-aminophenyl | 4-hydroxy-2,7-disulfo-3,5-naphthylene-5-amino | ethyl | 4-(β-sulfatoethyl-sulfonyl)-phenyl-amino | blue (590) |
| 264 | 3-sulfo-4-phenyl-aminophenyl | 4-hydroxy-2,7-disulfo-3,5-naphthylene-5-amino | phenyl | 4-(β-sulfatoethyl-sulfonyl)-phenyl-amino | blue (590) |
| 265 | 3-sulfo-4-phenyl-aminophenyl | 4-hydroxy-2,7-disulfo-3,5-naphthylene-5-amino | methyl | 4-(β-sulfatoethyl-sulfonyl)-phenyl-amino | blue (590) |
| 266 | 3-sulfo-4-(2'-methoxy-phenyl-amino)-phenyl | 4-hydroxy-2,7-disulfo-3,5-naphthylene-5-amino | ethyl | 4-(β-sulfatoethyl-sulfonyl)-phenyl-amino | blue |
| 267 | 3-sulfo-4-(2'-methoxy-phenyl-amino)-phenyl | 4-hydroxy-2,7-disulfo-3,5-naphthylene-5-amino | phenyl | 4-(β-sulfatoethyl-sulfonyl)-phenyl-amino | blue |
| 268 | 3-sulfo-4-(2'-methoxy-phenyl-amino)-phenyl | 4-hydroxy-2,7-disulfo-3,5-naphthylene-5-amino | methyl | 4-(β-sulfatoethyl-sulfonyl)-phenyl-amino | blue |
| 269 | 3-sulfo-4-(2'-methoxy-phenyl-amino)-phenyl | 4-hydroxy-2,7-disulfo-3,5-naphthylene-5-amino | ethyl | 3-(β-sulfatoethyl-sulfonyl)-phenyl-amino | blue |
| 270 | 3-sulfo-4-(2'-methoxy-phenyl-amino)-phenyl | 4-hydroxy-2,7-disulfo-3,5-naphthylene-5-amino | phenyl | 3-(β-sulfatoethyl-sulfonyl)-phenyl-amino | blue |
| 271 | 3-sulfo-4-(2'-methoxy-phenyl-amino)-phenyl | 4-hydroxy-2,7-disulfo-3,5-naphthylene-5-amino | methyl | 3-(β-sulfatoethyl-sulfonyl)-phenyl-amino | blue |
| 272 | 4-(3',6',8'-trisulfo-naphth-2'-yl-azo)-2-methoxy-5-methylphenyl | 4-hydroxy-2,7-disulfo-3,5-naphthylene-5-amino | ethyl | 3-(β-sulfatoethyl-sulfonyl)-phenyl-amino | blue |
| 273 | 4-(3',6',8'-trisulfo-naphth-2'-yl-azo)-2-methoxy-5-methylphenyl | 4-hydroxy-2,7-disulfo-3,5-naphthylene-5-amino | phenyl | 3-(β-sulfatoethyl-sulfonyl)-phenyl-amino | blue |
| 274 | 4-(3',6',8'-trisulfo-naphth-2'-yl-azo)-2-methoxy-5-methylphenyl | 4-hydroxy-2,7-disulfo-3,5-naphthylene-5-amino | methyl | 3-(β-sulfatoethyl-sulfonyl)-phenyl-amino | blue |
| 275 | 4-(3',6',8'-trisulfo-naphth-2'-yl-azo)-2-methoxy-5-methylphenyl | 4-hydroxy-2,7-disulfo-3,5-naphthylene-5-amino | ethyl | 4-(β-sulfatoethyl-sulfonyl)-phenyl-amino | blue |
| 276 | 4-(3',6',8'-trisulfo-naphth-2'-yl-azo)-2-methoxy-5-methylphenyl | 4-hydroxy-2,7-disulfo-3,5-naphthylene-5-amino | phenyl | 4-(β-sulfatoethyl-sulfonyl)-phenyl-amino | blue |
| 277 | 4-(3',6',8'-trisulfo-naphth-2'-yl-azo)-2-methoxy-5-methylphenyl | 4-hydroxy-2,7-disulfo-3,5-naphthylene-5-amino | methyl | 4-(β-sulfatoethyl-sulfonyl)-phenyl-amino | blue |
| 278 | 4-(3',6',8'-trisulfo-naphth-2'-yl-azo)-2-methoxy-5-methylphenyl | 4-hydroxy-2,7-disulfo-3,5-naphthylene-5-amino | ethyl | γ-(β'-sulfatoethyl-sulfonyl)-phenyl-amino | blue |
| 279 | 4-(3',6',8'-trisulfo-naphth-2'-yl-azo)-2-methoxy-5-methylphenyl | 4-hydroxy-2,7-disulfo-3,5-naphthylene-5-amino | methyl | γ-(β'-sulfatoethyl-sulfonyl)-phenyl-amino | blue |
| 280 | 4-(3',6',8'-trisulfo-naphth-2'-yl-azo)-2-methoxy-5-methylphenyl | 4-hydroxy-2,7-disulfo-3,5-naphthylene-5-amino | phenyl | γ-(β'-sulfatoethyl-sulfonyl)-phenyl-amino | blue |
| 281 | 4-(4'-methoxy 2'-sulfo-phenyl azo)-6-sulfo-naphth-1-yl | 6-sulfo-4,1-naphthylene-1-amino | ethyl | 4-(β-sulfatoethyl-sulfonyl)-phenyl-amino | brown (454) |
| 282 | 4-(4'-methoxy 2'-sulfo-phenyl azo)-6-sulfo-naphth-1-yl | 6-sulfo-4,1-naphthylene-1-amino | methyl | 4-(β-sulfatoethyl-sulfonyl)-phenyl-amino | " |
| 283 | 4-(4'-methoxy 2'-sulfo-phenyl azo)-6-sulfo-naphth-1-yl | 6-sulfo-4,1-naphthylene-1-amino | phenyl | 4-(β-sulfatoethyl-sulfonyl)-phenyl-amino | " |

-continued

| Example | Radical D | Radical —K—N(R$^x$)— | Radical R$^B$ | Radical —Q | Hue |
|---|---|---|---|---|---|
| 284 | 4-(4'-methoxy 2'-sulfo-phenyl azo)-6-sulfo-naphth-1-yl | 6-sulfo-4,1-naph-thylene-1-amino | ethyl | 3-(β-sulfatoethyl-sulfonyl)-phenyl-amino | " |
| 285 | 4-(4'-methoxy 2'-sulfo-phenyl azo)-6-sulfo-naphth-1-yl | 6-sulfo-4,1-naph-thylene-1-amino | methyl | 3-(β-sulfatoethyl-sulfonyl)-phenyl-amino | " |
| 286 | 4-(4'-methoxy 2'-sulfo-phenyl azo)-6-sulfo-naphth-1-yl | 6-sulfo-4,1-naph-thylene-1-amino | ethyl | 3-(β-sulfatoethyl-sulfonyl)-phenyl-amino | " |
| 287 | 4-(4'-methoxy 2'-sulfo-phenyl azo)-6-sulfo-naphth-1-yl | 6-sulfo-4,1-naph-thylene-1-amino | ethyl | γ-(β'-sulfatoethyl-sulfonyl)-propyl-amino | " |
| 288 | 4-(4'-methoxy 2'-sulfo-phenyl azo)-6-sulfo-naphth-1-yl | 6-sulfo-4,1-naph-thylene-1-amino | methyl | γ-(β'-sulfatoethyl-sulfonyl)-propyl-amino | brown (454) |
| 289 | 4-(4'-methoxy 2'-sulfo-phenyl azo)-6-sulfo-naphth-1-yl | 6-sulfo-4,1-naph-thylene-1-amino | phenyl | γ-(β'-sulfatoethyl-sulfonyl)-propyl-amino | brown (454) |
| 290 | 4-(4'-methoxy-2'-sulfo-phenyl azo)-7-sulfo-naphth-1-yl | 7-sulfo-4,1-naph-thylene-1-amino | ethyl | 3-(β-sulfatoethyl-sulfonyl)-phenyl-amino | brown (458) |
| 291 | 4-(4'-methoxy-2'-sulfo-phenyl azo)-7-sulfo-naphth-1-yl | 7-sulfo-4,1-naph-thylene-1-amino | methyl | 3-(β-sulfatoethyl-sulfonyl)-phenyl-amino | brown (458) |
| 292 | 4-(4'-methoxy-2'-sulfo-phenyl azo)-7-sulfo-naphth-1-yl | 7-sulfo-4,1-naph-thylene-1-amino | phenyl | 3-(β-sulfatoethyl-sulfonyl)-phenyl-amino | brown (458) |
| 293 | 4-(4',6',8'-trisulfo-naphth-2-ylazo)-6-sulfo-naphth-1-yl | 3-methyl-4,1-phenylene-1-amino | ethyl | 3-(β-sulfatoethyl-sulfonyl)-phenyl-amino | brown (450) |
| 294 | 4-(4',6',8'-trisulfo-naphth-2-ylazo)-6-sulfo-naphth-1-yl | 3-methyl-4,1-phenylene-1-amino | methyl | 3-(β-sulfatoethyl-sulfonyl)-phenyl-amino | brown (450) |
| 295 | 4-(4',6',8'-trisulfo-naphth-2-ylazo)-6-sulfo-naphth-1-yl | 3-methyl-4,1-phenylene-1-amino | phenyl | 3-(β-sulfatoethyl-sulfonyl)-phenyl-amino | brown (450) |
| 296 | 4-(4',6',8'-trisulfo-naphth-2-ylazo)-6-sulfo-naphth-1-yl | 3-methyl-4,1-phenylene-1-amino | ethyl | 4-(β-sulfatoethyl-sulfonyl)-phenyl-amino | brown (450) |
| 297 | 4-(4',6',8'-trisulfo-naphth-2-ylazo)-6-sulfo-naphth-1-yl | 3-methyl-4,1-phenylene-1-amino | methyl | 4-(β-sulfatoethyl-sulfonyl)-phenyl-amino | brown (450) |
| 298 | 4-(4',6',8'-trisulfo-naphth-2-ylazo)-6-sulfo-naphth-1-yl | 3-methyl-4,1-phenylene-1-amino | phenyl | 4-(β-sulfatoethyl-sulfonyl)-phenyl-amino | brown (450) |
| 299 | 4-(4',6',8'-trisulfo-naphth-2-ylazo)-6-sulfo-naphth-1-yl | 3-methyl-4,1-phenylene-1-amino | ethyl | γ-(β'-sulfatoethyl-sulfonyl)propyl-amino | brown (450) |
| 300 | 4-(4',6',8'-trisulfo-naphth-2-ylazo)-6-sulfo-naphth-1-yl | 3-methyl-4,1-phenylene-1-amino | methyl | γ-(β'-sulfatoethyl-sulfonyl)propyl-amino | brown (450) |
| 301 | 4-(4',6',8'-trisulfo-naphth-2-ylazo)-6-sulfo-naphth-1-yl | 3-methyl-4,1-phenylene-1-amino | phenyl | γ-(β'-sulfatoethyl-sulfonyl)propyl-amino | brown (450) |
| 302 | 4-(2',5',7'-tri-sulfo-naphth-1'-ylazo)-2,5-di-methylphenyl | 6-sulfo-4,1-naph-thylene-1-amino | ethyl | γ-(β'-sulfatoethyl-sulfonyl)propyl-amino | brown (452) |
| 303 | 4-(2',5',7'-tri-sulfo-naphth-1'-ylazo)-2,5-di-methylphenyl | 6-sulfo-4,1-naph-thylene-1-amino | methyl | γ-(β'-sulfatoethyl-sulfonyl)propyl-amino | " |
| 304 | 4-(2',5',7'-tri-sulfo- | 6-sulfo-4,1-naph-thylene-1-amino | phenyl | γ-(β'-sulfatoethyl- | " |

-continued

| Example | Radical D | Radical —K—N(R$^x$)— | Radical R$^B$ | Radical —Q | Hue |
|---|---|---|---|---|---|
| | sulfo-naphth-1'-ylazo)-2,5-dimethylphenyl | thylene-1-amino | | sulfonyl)propyl-amino | |
| 305 | 4-(2',5',7'-tri-sulfo-naphth-1'-ylazo)-2,5-dimethylphenyl | 6-sulfo-4,1-naphthylene-1-amino | ethyl | 4-(β-sulfatoethyl-sulfonyl)-phenyl-amino | brown (452) |
| 306 | 4-(2',5',7'-tri-sulfo-naphth-1'-ylazo)-2,5-dimethylphenyl | 6-sulfo-4,1-naphthylene-1-amino | methyl | 4-(β-sulfatoethyl-sulfonyl)-phenyl-amino | " |
| 307 | 4-(2',5',7'-tri-sulfo-naphth-1'-ylazo)-2,5-dimethylphenyl | 6-sulfo-4,1-naphthylene-1-amino | phenyl | 4-(β-sulfatoethyl-sulfonyl)-phenyl-amino | " |
| 308 | 4-(2',5',7'-tri-sulfo-naphth-1'-ylazo)-2,5-dimethylphenyl | 6-sulfo-4,1-naphthylene-1-amino | ethyl | 3-(β-sulfatoethyl-sulfonyl)-phenyl-amino | brown (452) |
| 309 | 4-(2',5',7'-tri-sulfo-naphth-1'-ylazo)-2,5-dimethylphenyl | 6-sulfo-4,1-naphthylene-1-amino | methyl | 3-(β-sulfatoethyl-sulfonyl)-phenyl-amino | " |
| 310 | 4-(2',5',7'-tri-sulfo-naphth-1'-ylazo)-2,5-dimethylphenyl | 6-sulfo-4,1-naphthylene-1-amino | phenyl | 3-(β-sulfatoethyl-sulfonyl)-phenyl-amino | " |
| 311 | 1:2 chromium complex of: 2-hydroxy-6-(β-sulfatoethylsulfonyl)-phenyl | 4-hydroxy-2,7-disulfo-3,5-naphthylene-5-amino | ethyl | 3-(β-sulfatoethyl-sulfonyl)-phenyl-amino | navy blue |
| 312 | 1:2 chromium complex of: 2-hydroxy-6-(β-sulfatoethylsulfonyl)-phenyl | 4-hydroxy-2,7-disulfo-3,5-naphthylene-5-amino | methyl | 3-(β-sulfatoethyl-sulfonyl)-phenyl-amino | " |
| 313 | 1:2 chromium complex of: 2-hydroxy-6-(β-sulfatoethylsulfonyl)-phenyl | 4-hydroxy-2,7-disulfo-3,5-naphthylene-5-amino | phenyl | 3-(β-sulfatoethyl-sulfonyl)-phenyl-amino | " |
| 314 | 1:2 chromium complex of: 2-hydroxy-6-(β-sulfatoethylsulfonyl)-phenyl | 4-hydroxy-2,7-disulfo-3,5-naphthylene-5-amino | ethyl | 4-(β-sulfatoethyl-sulfonyl)-phenyl-amino | navy blue |
| 315 | 1:2 chromium complex of: 2-hydroxy-6-(β-sulfatoethylsulfonyl)-phenyl | 4-hydroxy-2,7-disulfo-3,5-naphthylene-5-amino | methyl | 4-(β-sulfatoethyl-sulfonyl)-phenyl-amino | " |
| 316 | 1:2 chromium complex of: 2-hydroxy-6-(β-sulfatoethylsulfonyl)-phenyl | 4-hydroxy-2,7-disulfo-3,5-naphthylene-5-amino | phenyl | 4-(β-sulfatoethyl-sulfonyl)-phenyl-amino | " |
| 317 | 1:2 cobalt complex of: 2-hydroxy-6-(β-sulfatoethylsulfonyl)-phenyl | 4-hydroxy-2,7-disulfo-3,5-naphthylene-5-amino | ethyl | 4-(β-sulfatoethyl-sulfonyl)-phenyl-amino | violet |
| 318 | 1:2 cobalt complex of: 2-hydroxy-6-(β-sulfatoethylsulfonyl)-phenyl | 4-hydroxy-2,7-disulfo-3,5-naphthylene-5-amino | methyl | 4-(β-sulfatoethyl-sulfonyl)-phenyl-amino | violet |
| 319 | 1:2 cobalt complex of: 2-hydroxy-6-(β-sulfatoethylsulfonyl)-phenyl | 4-hydroxy-2,7-disulfo-3,5-naphthylene-5-amino | phenyl | 4-(β-sulfatoethyl-sulfonyl)-phenyl-amino | violet |
| 320 | 1:2 cobalt complex of: 2-hydroxy-6-(β-sulfatoethylsulfonyl)-phenyl | 4-hydroxy-2,7-disulfo-3,5-naphthylene-5-amino | " | 3-(β-sulfatoethyl-sulfonyl)-phenyl-amino | violet |
| 321 | 1:2 cobalt complex of: 2-hydroxy-6-(β-sulfatoethylsul- | 4-hydroxy-2,7-disulfo-3,5-naphthylene-5-amino | methyl | 3-(β-sulfatoethyl-sulfonyl)-phenyl-amino | violet |

-continued

| Example | Radical D | Radical —K—N(R$^x$)— | Radical R$^B$ | Radical —Q | Hue |
|---|---|---|---|---|---|
| | fonyl)-phenyl | | | | |
| 322 | 1:2 cobalt complex of: 2-hydroxy-6-($\beta$-sulfatoethylsulfonyl)-phenyl | 4-hydroxy-2,7-disulfo-3,5-naphthylene-5-amino | phenyl | 3-($\beta$-sulfatoethylsulfonyl)-phenylamino | violet |
| 323 | 1:1 nickel complex of: 2-hydroxy-6-($\beta$-sulfatoethylsulfonyl)-phenyl | 4-hydroxy-2,7-disulfo-3,5-naphthylene-5-amino | ethyl phenyl | 3-($\beta$-sulfatoethylsulfonyl)-phenylamino | bordeaux |
| 324 | 1:1 nickel complex of: 2-hydroxy-6-($\beta$-sulfatoethylsulfonyl)-phenyl | | | | |
| 325 | 1:1 nickel complex of: 2-hydroxy-6-($\beta$-sulfatoethylsulfonyl)-phenyl | 4-hydroxy-2,7-disulfo-3,5-naphthylene-5-amino | ethyl | 4-($\beta$-sulfatoethylsulfonyl)-phenylamino | bordeaux |
| 326 | 1:1 nickel complex of: 2-hydroxy-6-($\beta$-sulfatoethylsulfonyl)-phenyl | 4-hydroxy-2,7-disulfo-3,5-naphthylene-5-amino | methyl | 4-($\beta$-sulfatoethylsulfonyl)-phenylamino | bordeaux |
| 327 | 1:1 nickel complex of: 2-hydroxy-6-($\beta$-sulfatoethylsulfonyl)-phenyl | 4-hydroxy-2,7-disulfo-3,5-naphthylene-5-amino | phenyl | 4-($\beta$-sulfatoethylsulfonyl)-phenylamino | bordeaux |
| 328 | 1:1 copper complex of: 4,8-disulfo-1-hydroxy-naphth-2-yl | 4-hydroxy-2,7-disulfo-3,5-naphthylene-5-amino | ethyl | 4-($\beta$-sulfatoethylsulfonyl)-phenylamino | blue |
| 329 | 1:1 copper complex of: 4,8-disulfo-1-hydroxy-naphth-2-yl | 4-hydroxy-2,7-disulfo-3,5-naphthylene-5-amino | methyl | 4-($\beta$-sulfatoethylsulfonyl)-phenylamino | blue |
| 330 | 1:1 copper complex of: 4,8-disulfo-1-hydroxy-naphth-2-yl | 4-hydroxy-2,7-disulfo-3,5-naphthylene-5-amino | phenyl | 4-($\beta$-sulfatoethylsulfonyl)-phenylamino | blue |
| 331 | 1:1 copper complex of: 4,8-disulfo-1-hydroxy-naphth-2-yl | 4-hydroxy-2,7-disulfo-3,5-naphthylene-5-amino | ethyl | 3-($\beta$-sulfatoethylsulfonyl)-phenylamino | blue |
| 332 | 1:1 copper complex of: 4,8-disulfo-1-hydroxy-naphth-2-yl | 4-hydroxy-2,7-disulfo-3,5-naphthylene-5-amino | methyl | 3-($\beta$-sulfatoethylsulfonyl)-phenylamino | blue |
| 333 | 1:1 copper complex of: 4,8-disulfo-1-hydroxy-naphth-2-yl | 4-hydroxy-2,7-disulfo-3,5-naphthylene-5-amino | phenyl | 3-($\beta$-sulfatoethylsulfonyl)-phenylamino | blue |
| 334 | 1:1 copper complex of: 4,8-disulfo-1-hydroxy-naphth-2-yl | 4-hydroxy-2,7-disulfo-3,5-naphthylene-5-amino | | 3-($\beta$-sulfatoethylsulfonyl)-phenylamino | blue |
| 335 | 1:2 chromium complex of: 2-carboxy phenyl | 4-hydroxy-2-sulfo-3,7-naphthylene-7-amino | ethyl | 3-($\beta$-sulfatoethylsulfonyl)-phenylamino | reddish brown |
| 336 | 1:2 chromium complex of: 2-carboxy phenyl | 4-hydroxy-2-sulfo-3,7-naphthylene-7-amino | methyl | 3-($\beta$-sulfatoethylsulfonyl)-phenylamino | " |
| 337 | 1:2 chromium complex of: 2-carboxy phenyl | 4-hydroxy-2-sulfo-3,7-naphthylene-7-amino | phenyl | 3-($\beta$-sulfatoethylsulfonyl)-phenylamino | " |
| 338 | 1:2 chromium complex of: 2-carboxy | 4-hydroxy-2-sulfo-3,7-naphthylene-7- | ethyl | 4-($\beta$-sulfatoethylsulfonyl)-phenylamino | reddish brown |

-continued

| Example | Radical D | Radical —K—N(R$^x$)— | Radical R$^B$ | Radical —Q | Hue |
|---|---|---|---|---|---|
| 339 | 1:2 chromium complex of: 2-carboxy phenyl | phenyl amino 4-hydroxy-2-sulfo-3,7-naphthylene-7-amino | methyl | 4-(β-sulfatoethyl-sulfonyl)-phenyl-amino | " |
| 340 | 1:2 chromium complex of: 2-carboxy phenyl | 4-hydroxy-2-sulfo-3,7-naphthylene-7-amino | phenyl | 4-(β-sulfatoethyl-sulfonyl)-phenyl-amino | " |
| 341 | 1:2 cobalt complex of: 2-hydroxy-6-nitrophenyl | 4-hydroxy-2,7-disulfo-3,5-naphthylene-5-amino | ethyl | 4-(β-sulfatoethyl-sulfonyl)-phenyl-amino | gray |
| 342 | 1:2 cobalt complex of: 2-hydroxy-6-nitrophenyl | 4-hydroxy-2,7-disulfo-3,5-naphthylene-5-amino | methyl | 4-(β-sulfatoethyl-sulfonyl)-phenyl-amino | gray |
| 343 | 1:2 cobalt complex of: 2-hydroxy-6-nitrophenyl | 4-hydroxy-2,7-disulfo-3,5-naphthylene-5-amino | phenyl | 4-(β-sulfatoethyl-sulfonyl)-phenyl-amino | gray |
| 344 | 1:2 cobalt complex of: 2-hydroxy-6-nitrophenyl | 4-hydroxy-2,7-disulfo-3,5-naphthylene-5-amino | methyl | 4-(β-sulfatoethyl-sulfonyl)-phenyl-amino | gray |
| 345 | 1:2 cobalt complex of: 2-hydroxy-6-nitrophenyl | 4-hydroxy-2,7-disulfo-3,5-naphthylene-5-amino | ethyl | 3-(β-sulfatoethyl-sulfonyl)-phenyl-amino | gray |
| 346 | 1:2 cobalt complex of: 2-hydroxy-6-nitrophenyl | 4-hydroxy-2,7-disulfo-3,5-naphthylene-5-amino | methyl | 3-(β-sulfatoethyl-sulfonyl)-phenyl-amino | gray |
| 347 | 1:2 cobalt complex of: 2-hydroxy-6-nitrophenyl | 4-hydroxy-2,7-disulfo-3,5-naphthylene-5-amino | phenyl | 3-(β-sulfatoethyl-sulfonyl)-phenyl-amino | gray |
| 348 | 1:2 chromium complex of: 2-hydroxy-6-nitrophenyl | 4-hydroxy-2,7-disulfo-3,5-naphthylene-5-amino | ethyl | 3-(β-sulfatoethyl-sulfonyl)-phenyl-amino | black |
| 349 | 1:2 chromium complex of: 2-hydroxy-6-nitrophenyl | 4-hydroxy-2,7-disulfo-3,5-naphthylene-5-amino | methyl | 3-(β-sulfatoethyl-sulfonyl)-phenyl-amino | black |
| 350 | 1:2 chromium complex of: 2-hydroxy-6-nitrophenyl | 4-hydroxy-2,7-disulfo-3,5-naphthylene-5-amino | phenyl | 3-(β-sulfatoethyl-sulfonyl)-phenyl-amino | black |
| 351 | 4,8-disulfo-naphth-2-yl | 3-ureido-4,1-phenylene-1-amino | ethyl | 3-(β-sulfatoethyl-sulfonyl)-phenyl-amino | reddish yellow |
| 352 | 4,8-disulfo-naphth-2-yl | 3-ureido-4,1-phenylene-1-amino | phenyl | 3-(β-sulfatoethyl-sulfonyl)-phenyl-amino | " |
| 353 | 4,8-disulfo-naphth-2-yl | 3-ureido-4,1-phenylene-1-amino | methyl | 3-(β-sulfatoethyl-sulfonyl)-phenyl-amino | " |
| 354 | 4,8-disulfo-naphth-2-yl | 3-ureido-4,1-phenylene-1-amino | ethyl | 3-(β-sulfatoethyl-sulfonyl)-phenyl-amino | reddish yellow |
| 355 | 4,8-disulfo-naphth-2-yl | 3-ureido-4,1-phenylene-1-amino | phenyl | 3-(β-sulfatoethyl-sulfonyl)-phenyl-amino | " |
| 356 | 4,8-disulfo-naphth-2-yl | 3-ureido-4,1-phenylene-1-amino | methyl | 3-(β-sulfatoethyl-sulfonyl)-phenyl-amino | " |
| 357 | 2-sulfo-4-methoxy-phenyl | 4-hydroxy-2-sulfo-3,7-naphthylene-7-amino | ethyl | 4-(β-sulfatoethyl-sulfonyl)-phenyl-amino | scarlet red |
| 358 | 2-sulfo-4-methoxy-phenyl | 4-hydroxy-2-sulfo-3,7-naphthylene-7-amino | methyl | 4-(β-sulfatoethyl-sulfonyl)-phenyl-amino | " |
| 359 | 2-sulfo-4-methoxy-phenyl | 4-hydroxy-2-sulfo-3,7-naphthylene-7-amino | phenyl | 4-(β-sulfatoethyl-sulfonyl)-phenyl-amino | " |
| 360 | 4-methoxy-2,5-disulfo- | 4-hydroxy-2-sulfo-3,7- | ethyl | 3-(β-sulfatoethyl-sulfonyl)-phenyl- | orange (496) |

-continued

| Example | Radical D | Radical —K—N(R$^x$)— | Radical R$^B$ | Radical —Q | Hue |
|---|---|---|---|---|---|
| | phenyl | naphthylene-7-amino | | amino | |
| 361 | 4-methoxy-2,5-disulfo-phenyl | 4-hydroxy-2-sulfo-3,7-naphthylene-7-amino | methyl | 3-($\beta$-sulfatoethyl-sulfonyl)-phenyl-amino | orange |
| 362 | 4-methoxy-2,5-disulfo-phenyl | 4-hydroxy-2-sulfo-3,7-naphthylene-7-amino | phenyl | 3-($\beta$-sulfatoethyl-sulfonyl)-phenyl-amino | orange |
| 363 | 4-(4',8'-di-sulfo-naphth-2'-yl-azo)-6-sulfo-naphth-1-yl | 6-sulfo-4,1-naphthylene-1-amino | ethyl | 3-($\beta$-sulfatoethyl-sulfonyl)-phenyl-amino | brown (454) |
| 364 | 4-(4',8'-di-sulfo-naphth-2'-yl-azo)-6-sulfo-naphth-1-yl | 6-sulfo-4,1-naphthylene-1-amino | methyl | 3-($\beta$-sulfatoethyl-sulfonyl)-phenyl-amino | brown |
| 365 | 4-(4',8'-di-sulfo-naphth-2'-yl-azo)-6-sulfo-naphth-1-yl | 6-sulfo-4,1-naphthylene-1-amino | phenyl | 3-($\beta$-sulfatoethyl-sulfonyl)-phenyl-amino | brown |
| 366 | 3-($\beta$-sulfato-ethylsulfonyl)-phenylamino | 6-sulfo-3,1-phenylene-1-amino | ethyl | 5-amino-4-hydroxy-6-{2'-sulfo-5'-[2''-cyanamido-4''-(3''-$\beta$-sulfatoethyl-sulfonyl-phenyl)-amino 1'',3'',5''-triazin-6''-yl]-amino-phenylazo}-2,7-disulfo-naphth-3-yl | navy blue |
| 367 | 3-($\beta$-sulfato-ethylsulfonyl)-phenylamino | 6-sulfo-3,1-phenylene-1-amino | methyl | 5-amino-4-hydroxy-6-{2'-sulfo-5'-[2''-cyanamido-4''-(3''-$\beta$-sulfatoethyl-sulfonyl-phenyl)-amino 1'',3'',5''-triazin-6''-yl]-amino-phenylazo}-2,7-disulfo-naphth-3-yl | " |
| 368 | 3-($\beta$-sulfato-ethylsulfonyl)-phenylamino | 6-sulfo-3,1-phenylene-1-amino | phenyl | 5-amino-4-hydroxy-6-{2'-sulfo-5'-[2''-cyanamido-4''-(3''-$\beta$-sulfatoethyl-sulfonyl-phenyl)-amino 1'',3'',5''-triazin-6''-yl]-amino-phenylazo}-2,7-disulfo-naphth-3-yl | " |
| 369 | 3,6,8-tri-sulfonaphth-2-yl | 3-ureido-4,1-phenylene-1-amino | ethyl | 4-($\beta$-sulfatoethyl-sulfonyl)-phenyl-amino | reddish blue |
| 370 | 3,6,8-tri-sulfonaphth-2-yl | 3-ureido-4,1-phenylene-1-amino | methyl | 4-($\beta$-sulfatoethyl-sulfonyl)-phenyl-amino | " |
| 371 | 3,6,8-tri-sulfonaphth-2-yl | 3-ureido-4,1-phenylene-1-amino | phenyl | 4-($\beta$-sulfatoethyl-sulfonyl)-phenyl-amino | " |

EXAMPLE 372

48.3 parts of 1-(4'-sulfophenyl)-3-carboxy-4-(5''-amino-2''-sulfo-phenylazo)-5-pyrazolone are reacted in aqueous solution with 19 parts of cyanuric chloride at 0° to 3° C. and at a pH of 3.5 to 4. 9.7 parts of methanesulfonamide are then added, the pH is brought to 11 by means of aqueous sodium hydroxide solution and the mixture is heated to 50° to 60° C. It is subsequently stirred at 50° to 60° C. for a further 90 to 120 minutes, the pH being kept between 10 and 11, and when the condensation reaction has ended aqueous hydrochloric acid is added until the pH reaches 5 29.5 parts of 3-($\beta$-sulfatoethylsulfonyl)aniline are then added and the mixture is heated to 85° C. and further stirred until the condensation reaction is complete, a pH of 3.5 to 4 being maintained.

The azo dyestuff according to the invention formed is isolated in the form of its alkali metal salt (sodium salt) by evaporation of the synthesis solution under reduced pressure or by spray drying. It has, written in the form of the free acid, the formula

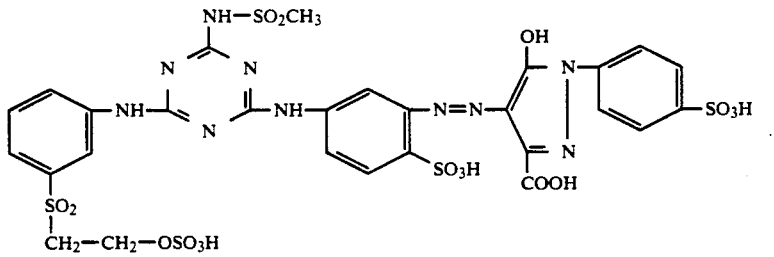

and has very good fiber-reactive dyestuff properties. When used by the known techniques, it dyes the materials mentioned in the description, such as, in particular, cellulose fiber materials, in deep, yellow shades with good fastness properties.

It is furthermore distinguished by a very high fixing yield both for dyeing by the exhaustion process between 40° and 80° C. and for dyeing by the cold-pad batch dyeing process.

EXAMPLE 373

18.8 parts of 1,3-diaminobenzene-4-sulfonic acid are added to a suspension of 19 parts of cyanuric chloride in 200 parts of ice-water. The mixture is stirred first at 0° to 5° C. and at a pH of 2.5 for about two hours and then at 0° to 5° C. and at a pH of 4 for about 30 minutes. 16 parts of ethanesulfonamide are then added, the pH is brought to 11 by means of sodium hydroxide solution, the temperature is slowly increased to 50° to 60° C. and the mixture is further stirred for about another 1.5 hours, a pH of 10.5 and a temperature of 50° to 60° C. being maintained. The pH is then brought to 7 by means of aqueous hydrochloric acid, 20 parts by volume of an aqueous 5N sodium nitrite solution are added and diazotization is carried out by slowly adding this mixture to a mixture of 50 parts by volume of concentrated hydrochloric acid and 600 parts of ice. The mixture is subsequently stirred for about a further 2 hours and any excess of nitrous acid is destroyed in the customary manner by means of sulfamic acid.

The resulting diazonium salt suspension is then added to an aqueous solution of the sodium salt of 60 parts of 4-hydroxy-5-amino-6-[4'-(β-sulfatoethylsulfonyl)-phenylazo]-naphthalene-2,7-disulfonic acid. The coupling reaction is carried out at 15° to 25° C. and at a pH of 4.5 to 5.5, 29.5 parts of 4-(β-sulfatoethylsulfonyl)-aniline are then added and the condensation reaction is carried out at 85° C. and at a pH of 3.5 to 4 for about 2 hours. The mixture is subsequently clarified with a little kieselguhr at about 40° C. and filtered and the filtrate is evaporated.

A black powder, containing electrolyte, of the alkali metal salt (sodium salt) of the disazo compound of the formula

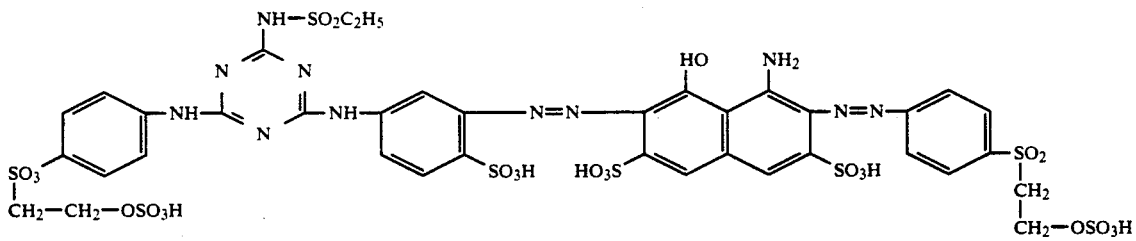

($\lambda_{max}$ = 595 nm)

is obtained. It has very good fiber-reactive dyestuff properties and dyes cotton, for example, in strong navy blue shades.

EXAMPLE 374

To prepare an azo dyestuff according to the invention, the procedure is in accordance with the procedure of Example 373, but instead of the 29.5 parts of 4-(β-sulfatoethylsulfonyl)-aniline in the reaction with the chlorotriazine compound, the same amount of 3-(β-sulfatoethylsulfonyl)-aniline is employed and instead of 11 parts of ethanesulfonamide 16 parts of benzenesulfonamide.

The alkali metal salt of the disazo compound of the formula

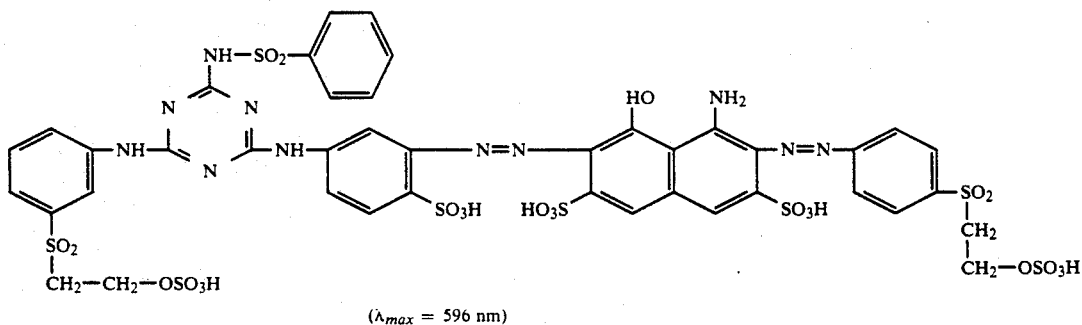

($\lambda_{max}$ = 596 nm)

which, for example, dyes cotton in strong navy blue shades, is obtained.

EXAMPLES 375 TO 483

Further azo dyestuffs according to the invention are described in the following Tabular Examples with the aid of the components corresponding to the general formula (B)

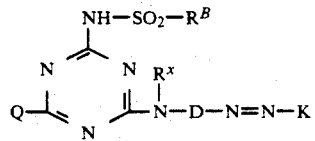
(B)

They can be prepared in the manner according to the invention, for example analogously to one of the above Embodiment Examples, using the components which can be seen from the particular Tabular Example in association with the general formula (B) (such as a diaminophenylene or -naphthylene of the formula $HR^xN-D-NH_2$, the coupling component H-K, a halogenotriazine, a compound of the formula $H_2N-SO_2-R^B$ and an amine of the formula H-Q). They have very good fiber-reactive dyestuff properties and dye the materials mentioned in the description, in particular cellulose fiber materials, such as cotton, in the shades stated in the particular Tabular Example (cotton for this purpose) with a good depth of color and with good fastness properties.

| Example | Radical Q | Radical —D— | Radical $R^B$ | Radical —K | Hue |
|---|---|---|---|---|---|
| 375 | 4-(β-sulfatoethyl-sulfonyl)-phenyl-amino | | methyl | 1-(β-sulfato-ethyl)-2-hydroxy-4-methyl-pyrid-6-on-3-yl | greenish yellow (424) |
| 376 | 4-(β-sulfatoethyl-sulfonyl)-phenyl-amino | " | propyl | 1-(β-sulfato-ethyl)-2-hydroxy-4-methyl-pyrid-6-on-3-yl | greenish yellow (424) |
| 377 | 4-(β-sulfatoethyl-sulfonyl)-phenyl-amino | " | phenyl | 1-(β-sulfato-ethyl)-2-hydroxy-4-methyl-pyrid-6-on-3-yl | greenish yellow (424) |
| 378 | 4-(β-sulfatoethyl-sulfonyl)-phenyl-amino | " | ethyl | 1-(β-sulfato-ethyl)-2-hydroxy-4-methyl-pyrid-6-on-3-yl | greenish yellow (424) |
| 379 | γ-(β'-sulfato-ethylsulfonyl)-propylamino | " | methyl | 1-(β-sulfato-ethyl)-2-hydroxy-4-methyl-pyrid-6-on-3-yl | greenish yellow (424) |
| 380 | γ-(β'-sulfato-ethylsulfonyl)-propylamino | " | ethyl | 1-(β-sulfato-ethyl)-2-hydroxy-4-methyl-pyrid-6-on-3-yl | greenish yellow (424) |
| 381 | γ-(β'-sulfato-ethylsulfonyl)-propylamino | " | phenyl | 1-(β-sulfato-ethyl)-2-hydroxy-4-methyl-pyrid-6-on-3-yl | greenish yellow (424) |
| 382 | 3-(β-sulfato-ethylsulfonyl)-phenylamino | | methyl | 1-(β-sulfato-ethyl)-2-hydroxy-4-methyl-pyrid-6-on-3-yl | greenish yellow (424) |
| 383 | 3-(β-sulfato-ethylsulfonyl)-phenylamino | " | ethyl | 1-(β-sulfato-ethyl)-2-hydroxy-4-methyl-pyrid-6-on-3-yl | greenish yellow (424) |
| 384 | 3-(β-sulfato- | " | phenyl | 1-(β-sulfato- | greenish |

-continued

| Example | Radical Q | Radical —D— | Radical R$^B$ | Radical —K | Hue |
|---|---|---|---|---|---|
| | ethylsulfonyl)-phenylamino | | | ethyl)-2-hydroxy-4-methyl-pyrid-6-on-3-yl | yellow (424) |
| 385 | 3-(β-sulfato-ethylsulfonyl)-phenylamino | ⟨phenyl-SO₃H⟩ | methyl | 1-ethyl-2-hydroxy-4-methyl-5-carbamoyl-pyrid-6-on-3-yl | greenish yellow (426) |
| 386 | 3-(β-sulfato-ethylsulfonyl)-phenylamino | " | ethyl | 1-ethyl-2-hydroxy-4-methyl-5-carbamoyl-pyrid-6-on-3-yl | greenish yellow (426) |
| 387 | 3-(β-sulfato-ethylsulfonyl)-phenylamino | " | phenyl | 1-ethyl-2-hydroxy-4-methyl-5-carbamoyl-pyrid-6-on-3-yl | greenish yellow (426) |
| 388 | 4-(β-sulfato-ethylsulfonyl)-phenylamino | " | methyl | 1-ethyl-2-hydroxy-4-methyl-5-carbamoyl-pyrid-6-on-3-yl | greenish yellow (426) |
| 389 | 3-(β-sulfato-ethylsulfonyl)-phenylamino | " | ethyl | 1-ethyl-2-hydroxy-4-methyl-5-carbamoyl-pyrid-6-on-3-yl | greenish yellow (426) |
| 390 | 3-(β-sulfato-ethylsulfonyl)-phenylamino | " | phenyl | 1-ethyl-2-hydroxy-4-methyl-5-carbamoyl-pyrid-6-on-3-yl | greenish yellow (426) |
| 391 | β-[4-(β'-sulfatoethylsulfonyl)-phen]-ethylamino | " | methyl | 1-ethyl-2-hydroxy-4-methyl-5-carbamoyl-pyrid-6-on-3-yl | greenish yellow (426) |
| 392 | β-[4-(β'-sulfatoethylsulfonyl)-phen]-ethylamino | " | ethyl | 1-ethyl-2-hydroxy-4-methyl-5-carbamoyl-pyrid-6-on-3-yl | greenish yellow (426) |
| 393 | β-[4-(β'-sulfatoethylsulfonyl)-phen]-ethylamino | " | phenyl | 1-ethyl-2-hydroxy-4-methyl-5-carbamoyl-pyrid-6-on-3-yl | greenish yellow (426) |
| 394 | 4-(β-sulfato-ethylsulfonyl)-phenylamino | 4,6-disulfo-1,3-phenylene | methyl | 1-ethyl-2-hydroxy-4-methyl-5-carbamoyl-pyrid-6-on-3-yl | greenish yellow (426) |
| 395 | 4-(β-sulfato-ethylsulfonyl)-phenylamino | 4,6-disulfo-1,3-phenylene | ethyl | 1-ethyl-2-hydroxy-4-methyl-5-carbamoyl-pyrid-6-on-3-yl | greenish yellow (426) |
| 396 | 4-(β-sulfato-ethylsulfonyl)-phenylamino | 4,6-disulfo-1,3-phenylene | phenyl | 1-ethyl-2-hydroxy-4-methyl-5-carbamoyl-pyrid-6-on-3-yl | greenish yellow (426) |
| 397 | 3-(β-sulfato-ethylsulfonyl)-phenylamino | 4,6-disulfo-1,3-phenylene | methyl | 1-ethyl-2-hydroxy-4-methyl-5-carbamoyl-pyrid-6-on-3-yl | greenish yellow (426) |
| 398 | 3-(β-sulfato-ethylsulfonyl)-phenylamino | 4,6-disulfo-1,3-phenylene | ethyl | 1-ethyl-2-hydroxy-4-methyl-5-carbamoyl-pyrid-6-on-3-yl | greenish yellow (426) |
| 399 | 3-(β-sulfato-ethylsulfonyl)-phenylamino | 4,6-disulfo-1,3-phenylene | phenyl | 1-ethyl-2-hydroxy-4-methyl-5-carbamoyl-pyrid-6-on-3-yl | greenish yellow (426) |
| 400 | γ-(β'-sulfato-ethylsulfonyl)-propylamino | ⟨phenyl-SO₃H⟩ | methyl | 5-amino-hydroxy-6-(4'-sulfophenyl-azo)-2,7-disulfo-naphth-3-yl | navy blue (598) |
| 401 | γ-(β'-sulfato-ethylsulfonyl)-propylamino | " | ethyl | 5-amino-hydroxy-6-(4'-sulfophenyl-azo)-2,7-disulfo-naphth-3-yl | navy blue (598) |
| 402 | γ-(β'-sulfato-ethylsulfonyl)-propylamino | " | phenyl | 5-amino-hydroxy-6-(4'-sulfophenyl-azo)-2,7-disulfo- | navy blue (598) |

-continued

| Example | Radical Q | Radical —D— | Radical $R^B$ | Radical —K | Hue |
|---|---|---|---|---|---|
| 403 | γ-(β'-sulfato-ethylsulfonyl)-propylamino | 4,6-disulfo-1,3-phenylene | methyl | naphth-3-yl 1,4-dimethyl-2-hydroxy-5-carbamoyl-pyrid-6-on-3-yl | greenish yellow |
| 404 | γ-(β'-sulfato-ethylsulfonyl)-propylamino | 4,6-disulfo-1,3-phenylene | ethyl | 1,4-dimethyl-2-hydroxy-5-carbamoyl-pyrid-6-on-3-yl | " |
| 405 | γ-(β'-sulfato-ethylsulfonyl)-propylamino | 4,6-disulfo-1,3-phenylene | phenyl | 1,4-dimethyl-2-hydroxy-5-carbamoyl-pyrid-6-on-3-yl | " |
| 406 | γ-(β'-sulfato-ethylsulfonyl)-propylamino | 4,6-disulfo-1,3-phenylene | propyl | 1,4-dimethyl-2-hydroxy-5-carbamoyl-pyrid-6-on-3-yl | " |
| 407 | γ-(β'-sulfato-ethylsulfonyl)-propylamino | phenylene-SO₃H | methyl | 1,4-dimethyl-2-hydroxy-5-sulfomethyl-pyrid-6-on-3-yl | " |
| 408 | γ-(β'-sulfato-ethylsulfonyl)-propylamino | " | ethyl | 1,4-dimethyl-2-hydroxy-5-sulfomethyl-pyrid-6-on-3-yl | " |
| 409 | γ-(β'-sulfato-ethylsulfonyl)-propylamino | " | phenyl | 1,4-dimethyl-2-hydroxy-5-sulfomethyl-pyrid-6-on-3-yl | " |
| 410 | 4-(β-sulfato-ethylsulfonyl)-phenylamino | " | methyl | 1,4-dimethyl-2-hydroxy-5-sulfomethyl-pyrid-6-on-3-yl | " |
| 411 | 4-(β-sulfato-ethylsulfonyl)-phenylamino | " | ethyl | 1,4-dimethyl-2-hydroxy-5-sulfomethyl-pyrid-6-on-3-yl | " |
| 412 | 4-(β-sulfato-ethylsulfonyl)-phenylamino | " | phenyl | 1,4-dimethyl-2-hydroxy-5-sulfomethyl-pyrid-6-on-3-yl | " |
| 413 | 4-(β-sulfato-ethylsulfonyl)-phenylamino | " | methyl | 1-(4'-sulfophenyl)-3-methyl-pyrazol-5-on-4-yl | yellow (410) |
| 414 | 4-(β-sulfato-ethylsulfonyl)-phenylamino | " | ethyl | 1-(4'-sulfophenyl)-3-methyl-pyrazol-5-on-4-yl | " |
| 415 | 4-(β-sulfato-ethylsulfonyl)-phenylamino | " | phenyl | 1-(4'-sulfophenyl)-3-methyl-pyrazol-5-on-4-yl | " |
| 416 | 3-(β-sulfato-ethylsulfonyl)-phenylamino | " | methyl | 1-(4'-sulfophenyl)-3-methyl-pyrazol-5-on-4-yl | yellow (410) |
| 417 | 3-(β-sulfato-ethylsulfonyl)-phenylamino | " | ethyl | 1-(4'-sulfophenyl)-3-methyl-pyrazol-5-on-4-yl | yellow (410) |
| 418 | 3-(β-sulfato-ethylsulfonyl)-phenylamino | " | phenyl | 1-(4'-sulfophenyl)-3-methyl-pyrazol-5-on-4-yl | yellow (415) |
| 419 | 4-(β-sulfato-ethylsulfonyl)-phenylamino | " | ethyl | 1-(4'-sulfophenyl)-3-carboxypyrazol-5-on-4-yl | yellow (415) |
| 420 | 4-(β-sulfato-ethylsulfonyl)-phenylamino | " | phenyl | 1-(4'-sulfophenyl)-3-carboxypyrazol-5-on-4-yl | yellow (415) |
| 421 | 4-(β-sulfato-ethylsulfonyl)-phenylamino | phenylene-SO₃H | methyl | 1-(4'-sulfophenyl)-3-methyl-pyrazol-5-on-4-yl | yellow (415) |
| 422 | 4-(β-sulfato-ethylsulfonyl)-phenylamino | " | ethyl | 1-(4'-sulfophenyl)-3-methyl-pyrazol-5-on-4-yl | yellow (415) |

-continued

| Example | Radical Q | Radical —D— | Radical $R^B$ | Radical —K— | Hue |
|---------|-----------|-------------|---------------|-------------|-----|
| 423 | 4-(β-sulfato-ethylsulfonyl)-phenylamino | " | phenyl | 1-(4'-sulfo-phenyl)-3-methyl-pyrazol-5-on-4-yl | yellow (415) |
| 424 | 3-(β-sulfato-ethylsulfonyl)-phenylamino | " | methyl | 1-(4'-sulfo-phenyl)-3-methyl-pyrazol-5-on-4-yl | yellow (415) |
| 425 | 3-(β-sulfato-ethylsulfonyl)-phenylamino | " | ethyl | 1-(4'-sulfo-phenyl)-3-methyl-pyrazol-5-on-4-yl | yellow (415) |
| 426 | 3-(β-sulfato-ethylsulfonyl)-phenylamino | " | phenyl | 1-(4'-sulfo-phenyl)-3-methyl-pyrazol-5-on-4-yl | yellow (415) |
| 427 | 4-(β-sulfato-ethylsulfonyl)-phenylamino | phenylene-SO₃H | methyl | 1-(4'-sulfo-phenyl)-3-carboxy-pyrazol-5-on-4-yl | yellow (415) |
| 428 | 4-(β-sulfato-ethylsulfonyl)-phenylamino | " | ethyl | 1-(4'-sulfo-phenyl)-3-carboxy-pyrazol-5-on-4-yl | yellow (415) |
| 429 | 4-(β-sulfato-ethylsulfonyl)-phenylamino | " | phenyl | 1-(4'-sulfo-phenyl)-3-carboxy-pyrazol-5-on-4-yl | yellow (415) |
| 430 | 3-(β-sulfato-ethylsulfonyl)-phenylamino | " | methyl | 5-amino-4-hydroxy-6-(4'-sulfophenylazo)-2,7-disulfo-naphth-3-yl | navy blue (598) |
| 431 | 3-(β-sulfato-ethylsulfonyl)-phenylamino | " | ethyl | 5-amino-4-hydroxy-6-(4'-sulfophenylazo)-2,7-disulfo-naphth-3-yl | " |
| 432 | 3-(β-sulfato-ethylsulfonyl)-phenylamino | " | phenyl | 5-amino-4-hydroxy-6-(4'-sulfophenylazo)-2,7-disulfo-naphth-3-yl | " |
| 433 | 4-(β-sulfato-ethylsulfonyl)-phenylamino | " | methyl | 5-amino-4-hydroxy-6-(4'-sulfophenylazo)-2,7-disulfo-naphth-3-yl | " |
| 434 | 4-(β-sulfato-ethylsulfonyl)-phenylamino | " | ethyl | 5-amino-4-hydroxy-6-(4'-sulfophenylazo)-2,7-disulfo-naphth-3-yl | " |
| 435 | 4-(β-sulfato-ethylsulfonyl)-phenylamino | " | phenyl | 5-amino-4-hydroxy-6-(4'-sulfophenylazo)-2,7-disulfo-naphth-3-yl | " |
| 436 | γ-(β'-sulfato-ethylsulfonyl)-propylamino | phenylene-SO₃H | methyl | 5-amino-4-hydroxy-6-(4'-sulfophenylazo)-2,7-disulfo-naphth-3-yl | navy blue |
| 437 | γ-(β'-sulfato-ethylsulfonyl)-propylamino | " | ethyl | 5-amino-4-hydroxy-6-(4'-sulfophenylazo)-2,7-disulfo-naphth-3-yl | " |
| 438 | γ-(β'-sulfato-ethylsulfonyl)-propylamino | " | phenyl | 5-amino-4-hydroxy-6-(4'-sulfophenylazo)-2,7-disulfo-naphth-3-yl | " |
| 439 | γ-(β'-sulfato-ethylsulfonyl)-propylamino | phenylene-SO₃H | methyl | 1-[4'-(β-sulfato-ethylsulfonyl)-phenyl]-3-methyl-pyrazol-5-on-4-yl | yellow (405) |
| 440 | γ-(β'-sulfato- | " | ethyl | 1-[4'-(β-sulfato- | yellow (405) |

-continued

| Example | Radical Q | Radical —D— | Radical $R^B$ | Radical —K | Hue |
|---|---|---|---|---|---|
| | ethylsulfonyl)-propylamino | | | ethylsulfonyl)-phenyl]-3-methyl-pyrazol-5-on-4-yl | |
| 441 | γ-(β'-sulfato-ethylsulfonyl)-propylamino | " | phenyl | 1-[4'-(β-sulfato-ethylsulfonyl)-phenyl]-3-methyl-pyrazol-5-on-4-yl | yellow (405) |
| 442 | 3-(β'-sulfato-ethylsulfonyl)-phenylamino | " | methyl | 1-[4'-(β-sulfato-ethylsulfonyl)-phenyl]-3-methyl-pyrazol-5-on-4-yl | yellow (405) |
| 443 | 3-(β'-sulfato-ethylsulfonyl)-phenylamino | " | ethyl | 1-[4'-(β-sulfato-ethylsulfonyl)-phenyl]-3-methyl-pyrazol-5-on-4-yl | yellow (405) |
| 444 | 3-(β'-sulfato-ethylsulfonyl)-phenylamino | " | phenyl | 1-[4'-(β-sulfato-ethylsulfonyl)-phenyl]-3-methyl-pyrazol-5-on-4-yl | yellow (405) |
| 445 | 4-(β-sulfato-ethylsulfonyl)-phenylamino | 4,6-disulfo-1,3-phenylene | methyl | 1-[4'-(β-sulfato-ethylsulfonyl)-phenyl]-3-methyl-pyrazol-5-on-4-yl | yellow |
| 446 | 4-(β-sulfato-ethylsulfonyl)-phenylamino | 4,6-disulfo-1,3-phenylene | ethyl | 1-[4'-(β-sulfato-ethylsulfonyl)-phenyl]-3-methyl-pyrazol-5-on-4-yl | yellow |
| 447 | 4-(β-sulfato-ethylsulfonyl)-phenylamino | 4,6-disulfo-1,3-phenylene | phenyl | 1-[4'-(β-sulfato-ethylsulfonyl)-phenyl]-3-methyl- | yellow |
| 448 | 4-(β-sulfato-ethylsulfonyl)-phenylamino | phenylene-SO₃H | methyl | 4-hydroxy-5-acetylamino-2,7-disulfo-naphth-3-yl | yellowish red |
| 449 | 4-(β-sulfato-ethylsulfonyl)-phenylamino | " | ethyl | 4-hydroxy-5-acetylamino-2,7-disulfo-naphth-3-yl | " |
| 450 | 4-(β-sulfato-ethylsulfonyl)-phenylamino | " | phenyl | 4-hydroxy-5-acetylamino-2,7-disulfo-naphth-3-yl | " |
| 451 | 3-(β-sulfato-ethylsulfonyl)-phenylamino | " | methyl | 4-hydroxy-5-acetylamino-2,7-disulfo-naphth-3-yl | " |
| 452 | 3-(β-sulfato-ethylsulfonyl)-phenylamino | " | ethyl | 4-hydroxy-5-acetylamino-2,7-disulfo-naphth-3-yl | " |
| 453 | 3-(β-sulfato-ethylsulfonyl)-phenylamino | " | phenyl | 4-hydroxy-5-acetylamino-2,7-disulfo-naphth-3-yl | " |
| 454 | 3-(β-sulfato-ethylsulfonyl)-phenylamino | " | methyl | 4-hydroxy-5-benzoylamino-2,7-disulfo-naphth-3-yl | " |
| 455 | 3-(β-sulfato-ethylsulfonyl)-phenylamino | " | ethyl | 4-hydroxy-5-benzoylamino-2,7-disulfo-naphth-3-yl | " |
| 456 | 3-(β-sulfato-ethylsulfonyl)-phenylamino | " | phenyl | 4-hydroxy-5-benzoylamino-2,7-disulfo-naphth-3-yl | " |
| 457 | 4-(β-sulfato-ethylsulfonyl)-phenylamino | " | methyl | 4-hydroxy-5-benzoylamino-2,7-disulfo-naphth-3-yl | " |
| 458 | 4-(β-sulfato-ethylsulfonyl)-phenylamino | " | ethyl | 4-hydroxy-5-benzoylamino-2,7-disulfo-naphth-3-yl | " |
| 459 | 4-(β-sulfato-ethylsulfonyl)-phenylamino | " | phenyl | 4-hydroxy-5-benzoylamino-2,7-disulfo-naphth-3-yl | " |
| 460 | 4-(β-sulfato-ethylsulfonyl)-phenylamino | " | methyl | 4-hydroxy-5-benzoylamino-2,8-disulfo-naphth-3-yl | " |
| 461 | 4-(β-sulfato- | " | ethyl | 4-hydroxy-5- | " |

-continued

| Example | Radical Q | Radical —D— | Radical R$^B$ | Radical —K | Hue |
|---|---|---|---|---|---|
| | ethylsulfonyl)-phenylamino | | | benzoylamino-2,8-disulfo-naphth-3-yl | |
| 462 | 4-(β-sulfato-ethylsulfonyl)-phenylamino | " | phenyl | 4-hydroxy-5-benzoylamino-2,8-disulfo-naphth-3-yl | " |
| 463 | 4-(β-sulfato-ethylsulfonyl)-phenylamino | " | methyl | 5-[4'-chloro-6'-(β-sulfoethyl-amino)-1',3',5'-triazin-2'-yl]-amino-4-hydroxy-2,7-disulfo-naphth-3-yl | " |
| 464 | 4-(β-sulfato-ethylsulfonyl)-phenylamino | " | ethyl | 5-[4'-chloro-6'-(β-sulfoethyl-amino)-1',3',5'-triazin-2'-yl]-amino-4-hydroxy-2,7-disulfo-naphth-3-yl | " |
| 465 | 4-(β-sulfato-ethylsulfonyl)-phenylamino | " | phenyl | 5-[4'-chloro-6'-(β-sulfoethyl-amino)-1',3',5'-triazin-2'-yl]-amino-4-hydroxy-2,7-disulfo-naphth-3-yl | " |
| 466 | 3-(β-sulfato-ethylsulfonyl)-phenylamino | " | methyl | 5-[4'-chloro-6'-(β-sulfoethyl-amino)-1',3',5'-triazin-2'-yl]-amino-4-hydroxy-2,7-disulfo-naphth-3-yl | " |
| 467 | 3-(β-sulfato-ethylsulfonyl)-phenylamino | " | ethyl | 5-[4'-chloro-6'-(β-sulfoethyl-amino)-1',3',5'-triazin-2'-yl]-amino-4-hydroxy-2,7-disulfo-naphth-3-yl | " |
| 468 | 3-(β-sulfato-ethylsulfonyl)-phenylamino | " | phenyl | 5-[4'-chloro-6'-(β-sulfoethyl-amino)-1',3',5'-triazin-2'-yl]-amino-4-hydroxy-2,7-disulfo- | " |
| 469 | 4-(β-sulfato-ethylsulfonyl)-phenylamino | " | methyl | 5-[4'-chloro-6'-amino-1',3',5'-triazin-2'-yl]-amino-4-hydroxy-2,7-disulfo-naphth-3-yl | " |
| 470 | 4-(β-sulfato-ethylsulfonyl)-phenylamino | " | ethyl | 5-[4'-chloro-6'-amino-1',3',5'-triazin-2'-yl]-amino-4-hydroxy-2,7-disulfo-naphth-3-yl | " |
| 471 | 4-(β-sulfato-ethylsulfonyl)-phenylamino | " | phenyl | 5-[4'-chloro-6'-amino-1',3',5'-triazin-2'-yl]-amino-4-hydroxy-2,7-disulfo-naphth-3-yl | " |
| 472 | γ'-(β-sulfato-ethylsulfonyl)-propylamino | " | methyl | 5-amino-4-hydroxy-6-[4'-(β-sulfato-ethylsulfonyl)-phenylazo]-2,7-disulfo-naphth-3-yl | navy blue (597) |
| 473 | γ'-(β-sulfato-ethylsulfonyl)-propylamino | " | ethyl | 5-amino-4-hydroxy-6-[4'-(β-sulfato-ethylsulfonyl)-phenylazo]-2,7-disulfo-naphth-3-yl | " |
| 474 | γ'-(β-sulfato-ethylsulfonyl)-propylamino | " | phenyl | 5-amino-4-hydroxy-6-[4'-(β-sulfato-ethylsulfonyl)- | " |

-continued

| Example | Radical Q | Radical —D— | Radical R$^B$ | Radical —K | Hue |
|---|---|---|---|---|---|
| | | | | phenylazo]-2,7-disulfo-naphth-3-yl | |
| 475 | β-[4-(β'-sulfatoethyl-sulfonyl)-phen]-ethylamino | " | methyl | 5-amino-4-hydroxy-6-[4'-(β-sulfato-ethylsulfonyl)-phenylazo]-2,7-disulfo-naphth-3-yl | navy blue (597) |
| 476 | β-[4-(β'-sulfatoethyl-sulfonyl)-phen]-ethylamino | " | phenyl | 5-amino-4-hydroxy-6-[4'-(β-sulfato-ethylsulfonyl)-phenylazo]-2,7-disulfo-naphth-3-yl | " |
| 477 | 2-methoxy-6-(β-sulfato-ethylsulfonyl)-phenylamino | " | methyl | 5-amino-4-hydroxy-6-[4'-(β-sulfato-ethylsulfonyl)-phenylazo]-2,7-disulfo-naphth-3-yl | navy blue (594) |
| 478 | 2-methoxy-6-(β-sulfato-ethylsulfonyl)-phenylamino | " | ethyl | 5-amino-4-hydroxy-6-[4'-(β-sulfato-ethylsulfonyl)-phenylazo]-2,7-disulfo-naphth-3-yl | " |
| 479 | 2-methoxy-6-(β-sulfato-ethylsulfonyl)-phenylamino | " | phenyl | 5-amino-4-hydroxy-6-[4'-(β-sulfato-ethylsulfonyl)-phenylazo]-2,7-disulfo-naphth-3-yl | " |
| 480 | 4-(β-sulfato-ethylsulfonyl)-phenylamino | " | ethyl | 5-amino-4-hydroxy-6-(4'-sulfo-phenyl)-azo-2,7-disulfo-naphth-3-yl | navy blue (598) |
| 481 | 4-(β-sulfato-ethylsulfonyl)-phenylamino | " | phenyl | 5-amino-4-hydroxy-6-(4'-sulfo-phenyl)-azo-2,7-disulfo-naphth-3-yl | " |
| 482 | 3-(β-sulfato-ethylsulfonyl)-phenylamino | " | methyl | 5-amino-4-hydroxy-6-[4'-(β-sulfato-ethylsulfonyl-phenyl]-azo-2,7-disulfo-naphth-3-yl | navy blue (598) |
| 483 | 3-(β-sulfato-ethylsulfonyl)-phenylamino | " | ethyl | 5-amino-4-hydroxy-6-[4'-(β-sulfato-ethylsulfonyl-phenyl]-azo-2,7-disulfo-naphth-3-yl | " |

EXAMPLE 484

49 parts of 1-amino-2-sulfo-4-(3'-amino-4'-sulfophenyl)amino-9,10-anthraquinone are reacted in aqueous solution with 19 parts of cyanuric chloride at 0° to 5° C. and at a pH of 3.5 to 4. 9.7 parts of methanesulfonamide are then added, the pH is brought to 11 by means of aqueous sodium hydroxide solution and the temperature of the mixture is slowly increased to 50° to 60° C. The mixture is further stirred in this temperature range for some time, and when the condensation reaction has ended the pH is brought to 5 with aqueous hydrochloric acid, 29.5 parts of 3-(β-sulfatoethylsulfonyl)-aniline are added and the third condensation reaction is carried out at 85° C. and a pH of 3.5 to 4.

After customary clarification of the synthesis solution, the dyestuff according to the invention of the formula (written in the form of the free acid)

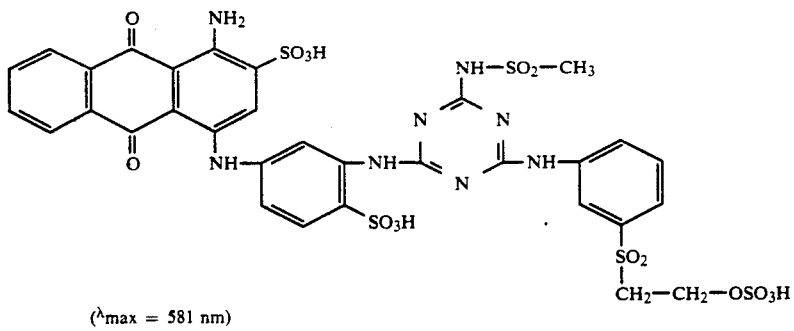

($\lambda_{max}$ = 581 nm)

is obtained as an alkali metal salt (sodium salt) by evaporation of the filtrate. It dyes the materials mentioned in the description, such as, in particular, cellulose fiber materials, for example cotton, in deep, brilliant blue shades by the application and fixing processes customary for fiber-reactive dyestuffs.

EXAMPLE 485

To prepare an anthraquinone dyestuff according to the invention, the procedure is in accordance with the procedure of Example 484, but instead of 3-($\beta$-sulfatoethylsulfonyl)-aniline, the same amount of 4-($\beta$-sulfatoethylsulfonyl)-aniline is employed. A blue dyestuff with equally good dyeing properties, which, for example, produces deep, brilliant blue dyeings and prints on cotton, is obtained.

EXAMPLE 486

To prepare an anthraquinone dyestuff according to the invention, the procedure is in accordance with the procedure of Example 484, but 49 parts of 1-amino-2-sulfo-4-(3'-amino-2',4',6'-trimethyl-5'-sulfo-phenyl-)amino-9,10-anthraquinone are employed as the starting anthraquinone compound. The dyestuff has, written in the form of the free acid, the formula It exhibits very good fiber-reactive dyestuff properties and produces, for example, prints and dyeings in deep, brilliant blue shades also cotton by the application and fixing processes customary in the art.

EXAMPLE 487

A fine suspension of 19 parts of cyanuric chloride in 100 parts of ice-water is added to about 3,000 parts of an aqueous solution, having a pH of 7 and a temperature of 0° to 5° C., of 31.6 parts of the triphendioxazine compound of the formula

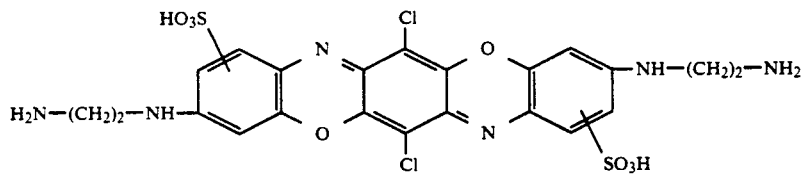

The mixture is further stirred at 0° to 5° C. and at a pH of 6.5 to 7 for about another 1.5 hours, and when the condensation reaction has ended, a solution of 11 parts of ethanesulfonamide in 30 parts of water is added, the pH is brought to 11 by means of sodium hydroxide solution, the mixture is slowly heated to 50° to 60° C. and is further stirred at this temperature and this pH for about another two hours, 29.5 parts of 3-($\beta$-sulfatoethylsulfonyl)aniline are then added and the third condensation reaction is carried out at a pH of 3.5 to 4 and a temperature of 80° to 90° C.

After the customary clarification of the synthesis solution, the anthraquinone dyestuff according to the invention is obtained from the filtrate—for example by spray drying—as an alkali metal salt (sodium salt). It has, written in the form of the free acid, the formula

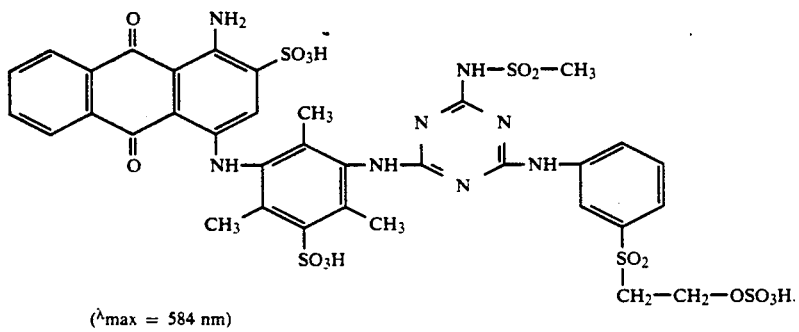

($\lambda_{max}$ = 584 nm)

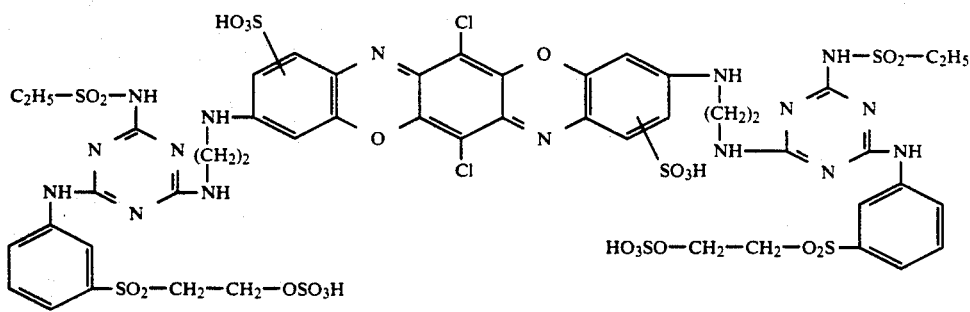

(λmax = 608 nm)

and produces deep, reddish-tinged blue dyeings and prints with good fastness properties by the application and fixing processes customary in the art for fiber-reactive dyestuffs.

EXAMPLES 488 TO 496

Further triphendioxazine dyestuffs according to the invention are described in the following Tabular Examples by means of the components of the general formula (C)

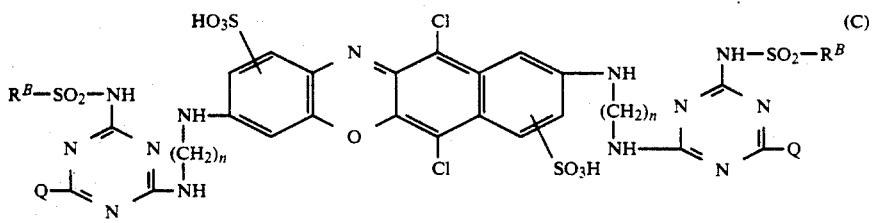

They can be prepared in a manner according to the invention, such as, for example, in accordance with the above Example 467, from their starting components, which can be seen from the general formula (C) in association with the information in the corresponding Tabular Examples (such as the corresponding dichloro-triphendioxazine starting diamine, cyanuric chloride, the sulfonamide corresponding to formula $H_2N-SO_2-R^B$ and the amine corresponding to the formula H-Q); they have very good fiber-reactive dyestuff properties and dye the materials mentioned in the description, such as, in particular, cellulose fiber materials, in the strong, clear blue, with good fastness properties, stated for cotton for the particular Tabular Example.

| Example | Index n | Radical Q | Color shade |
|---|---|---|---|
| 488 | 2 | β-[4-(β'-sulfatoethylsulfonyl)-phen]-ethylamino | blue (608) |
| 489 | 2 | γ-(β'-sulfatoethylsulfonyl)-propylamino | blue (608) |
| 490 | 2 | 2-methoxy-6-(β-sulfatoethylsulfonyl)-phenylamino | blue (608) |
| 491 | 3 | 3-(β-sulfatoethylsulfonyl)-phenylamino | blue (608) |
| 492 | 3 | 4-(β-sulfatoethylsulfonyl)-phenylamino | blue (608) |
| 493 | 3 | N-ethyl-N-[4-(β-sulfatoethylsulfonyl)-phenyl]-amino | blue (608) |
| 494 | 3 | γ-(vinylsulfonyl)-propylamino | blue (608) |
| 495 | 3 | β-[4-(β'-sulfatoethylsulfonyl)-phen]-ethylamino | blue (608) |
| 496 | 2 | 4-(β-sulfatoethylsulfonyl)-phenylamino | blue (608) |

EXAMPLE 497

58.5 parts of the copper phthalocyanine compound of the formula

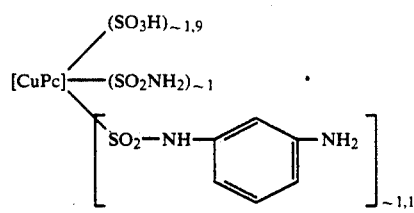

are homogeneously stirred into a mixture of 600 parts of ice and 600 parts of water, and this mixture is brought to a pH of 7 with sodium hydroxide solution. 19 parts of cyanuric chloride, dissolved in a little acetone, are added and the condensation reaction is carried out at 0° to 5° C. and at a pH of 3.5 to 4, with further stirring. 11 parts of methanesulfonamide are then added, the temperature is slowly increased to 50° to 60° C., the pH is brought to 11 by means of sodium hydroxide solution, and the mixture is further stirred until this second condensation reaction has ended and is then neutralized to a pH of 5 with aqueous hydrochloric acid. 29.5 parts of 3-(β-sulfatoethylsulfonyl)-aniline are added and the mixture is stirred at 80° to 90° C. and at a pH of 3.5 to 4 for about 2.5 hours. The synthesis solution is clarified with kieselguhr, while still hot, at a pH of 5.5 and the filtrate is evaporated under reduced pressure.

A blue powder, containing electrolyte, of the alkali metal salt (sodium salt) of the compound of the formula

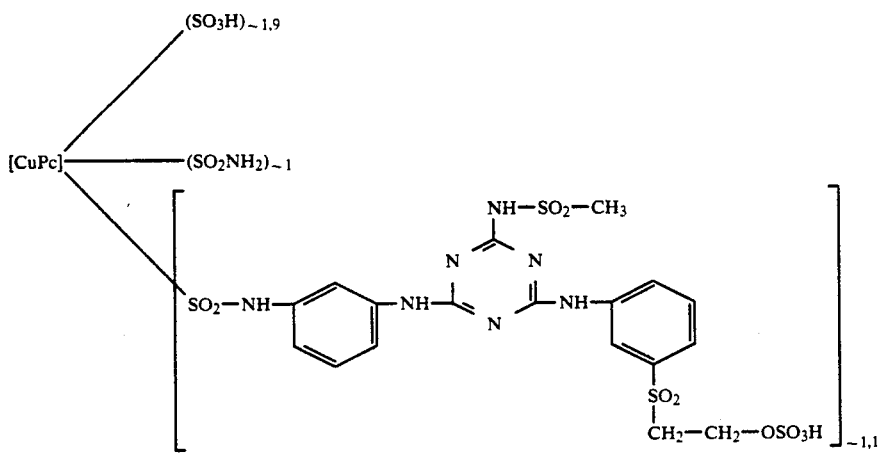

is obtained.

The copper phthalocyanine dyestuff according to the invention has very good fiber-reactive dyestuff properties and dyes the materials mentioned in the description, such as, in particular, cellulose fiber materials, in deep, fast turquoise blue shades by the customary application and fixing processes.

EXAMPLE 498

To prepare a copper phthalocyanine compound according to the invention, the procedure is in accordance with the procedure of Example 497, but instead of 3-($\beta$-sulfatoethylsulfonyl)-aniline, the same amount of 4-($\beta$-sulfatoethylsulfonyl)-aniline is employed. The dyestuff according to the invention exhibits the same good dyeing properties as that of Example 497 and likewise produces fast, turquoise blue dyeings and prints.

EXAMPLE 499

A homogeneously stirred mixture of 58 parts of the copper phthalocyanine compound corresponding to the formula

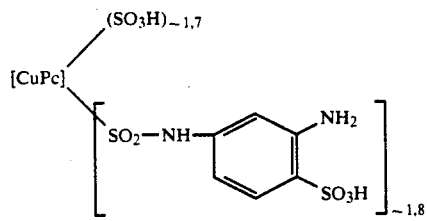

in 300 parts of water and 125 parts of ice is brought to a pH of 7 with sodium hydroxide solution. A fine suspension of 16.6 parts of cyanuric chloride in 170 parts of ice-water is added, the temperature is kept at 0° to 5° C. and a pH of 5 to 5.5 is maintained by means of sodium bicarbonate. When the condensation reaction has ended, 11 parts of methanesulfonamide are added, the pH is brought to 11 by means of aqueous sodium hydroxide solution, the mixture is slowly heated to 50° to 60° C. and is stirred at 60° C. and at a pH of 10 to 11 for about a further two hours, and when the reaction has ended the resulting monochlorotriazine compound is reacted with 25.8 parts of 4-($\beta$-sulfatoethylsulfonyl)-aniline at a pH of 3.5 to 4 and at 80° to 90° C. When the reaction has ended, the synthesis solution is clarified with kieselguhr in the customary manner.

A blue powder, containing electrolyte, of the alkali metal salt (sodium salt) of the copper phthalocyanine compound of the formula

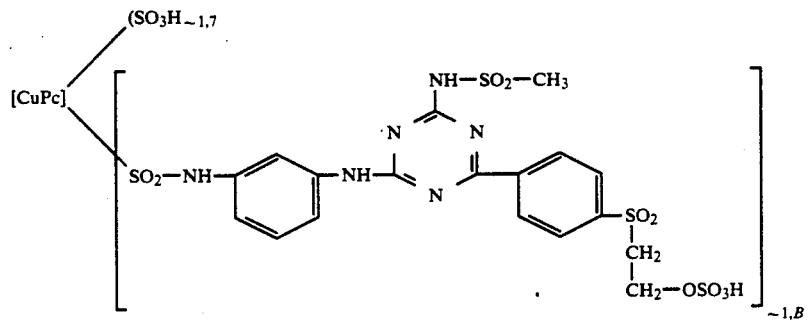

($\lambda_{max}$ = 670 nm).

is obtained by evaporating the filtrate.

The copper phthalocyanine dyestuff according to the invention dyes the materials mentioned in the description, such as, in particular, cellulose fiber materials, in deep, fast turquoise blue shades when used by the customary processes.

EXAMPLE 500

To prepare a copper phthalocyanine compound according to the invention, the procedure is in accordance with the procedure of Example 499, but instead of 4-(β-sulfatoethylsulfonyl)-aniline, the same amount of 3-(β-sulfatoethylsulfonyl)-aniline is employed. The dyestuff according to the invention exhibits the same good dyeing properties as that of Example 499 and likewise produces fast turquoise blue dyeings and prints.

EXAMPLE 501

A homogeneous mixture of 106.2 parts of the nickel phthalocyanine compound of the formula

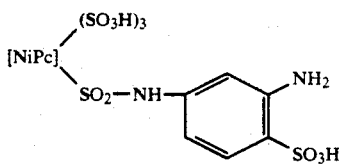

in 300 parts of ice and 600 parts of water is brought to a pH of 7 with sodium hydroxide solution. A fine suspension of 19 parts of cyanuric chloride in 200 parts of ice-water is added and the reaction is carried out at 0° to 5° C. and at a pH of 4.5. 9.7 parts of methanesulfonamide are then added, the pH is brought to 11 by means of sodium hydroxide solution, the mixture is slowly heated to 60° C. and stirred at 60° C. and at a pH of 10 to 11 for another two hours, and when this second condensation reaction has ended 29.5 parts of 3-(β-sulfatoethylsulfonyl)-aniline are added. The third condensation reaction is carried out at 80° to 90° C. at a pH of 3.5 to 4. The synthesis solution is then clarified in the customary manner at a pH of 5.5 and the dyestuff according to the invention of the formula (written in the form of the free acid)

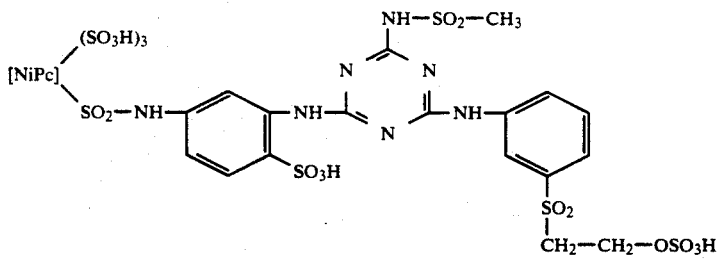

is isolated as the alkali metal salt (sodium salt) in the form of a powder containing electrolyte. When used by the customary application and fixing processes, for example, deep, bluish-tinged green dyeings and prints with good fastness properties are obtained on cellulose fiber materials, such as cotton.

EXAMPLE 502

To prepare a copper phthalocyanine compound according to the invention, the procedure is in accordance with the procedure of Example 501, but instead of 3-(β-sulfatoethylsulfonyl)-aniline, the same amount of 4-(β-sulfatoethylsulfonyl)-aniline is employed. The dyestuff according to the invention exhibits the same good dyeing properties as that of Example 501 and likewise produces fast bluish green dyeings and prints.

EXAMPLE 503 a) An aqueous, neutral solution of the sodium salt of 32.0 parts of the hydrazone of 2-carboxy-5-sulfophenylhydrazine and benzaldehyde in about 160 parts of water is added together with stirring at 5° to 15° C. to a conventionally prepared aqueous solution of the diazonium salt of 24.6 parts of 6-acetylamino-4-sulfo-2-aminophenol, then 25.0 parts of copper sulfate pentahydrate are added, and a pH of 5 is maintained by means of sodium carbonate. The reaction batch is subsequently stirred at 15° to 25° C. until diazonium compound is no longer detectable.

b) In the copper complex formazan compound synthesized under a) the acetylamino group is hydrolyzed to an amino group directly in the as-synthesized solution at a temperature between 90 and 100° C. in the course of 5 to 10 hours following addition of 6 to 10 times the molar amount of concentrated aqueous sodium hydroxide solution (the acetylamino copper formazan compound can also be salted out beforehand from the as-synthesized solution by means of sodium chloride and isolated and then be hydrolyzed in about 3% strength aqueous sodium hydroxide solution). The amino-containing copper complex formazan compound obtained can be isolated by salting out with sodium chloride after the pH has been brought back down to a value of about 4.

c) The formazan compound obtained under b) is reacted with cyanuric chloride. Advantageously this is done by starting from a solution of b) at pH 4 by reacting the solution with 16.6 parts of cyanuric chloride in the course of 3 to 4 hours at a temperature of 0° to 5° C. and a pH between 3 and 4 maintained with aqueous sodium carbonate solution, with thorough stirring to form the 2,4-dichloro-s-triazin-6-ylamino copper complex formazan compound.

d) To the as-synthesized solution of c) is added an aqueous solution of 16 parts of benzenesulfonamide in about 100 parts of water, the mixture is heated to 40° to 50° C. and a pH of 9 to 10 is maintained by means of an aqueous sodium hydroxide solution until the reaction has ended after 3 to 4 hours. The as-synthesized solution obtained is then clarified at 40° to 50° C., and the synthesized monochlorotriazine compound, either after intermediate isolation from the filtrate by addition of sodium chloride or potassium chloride or directly in this solution, is reacted with 28 parts of 3-(β-sulfatoethylsulfonyl)aniline at a pH between 3 and 4 and at a temperature between 60° and 80° C. in the course of 5 to 10 hours to form the copper complex formazan compound according to the invention.

After clarification the compound of the invention is salted out from the filtrate by means of sodium chloride or potassium chloride or isolated by evaporating to dryness or spray drying. This produces the alkali metal salt (sodium or potassium salt) of the compound of the formula

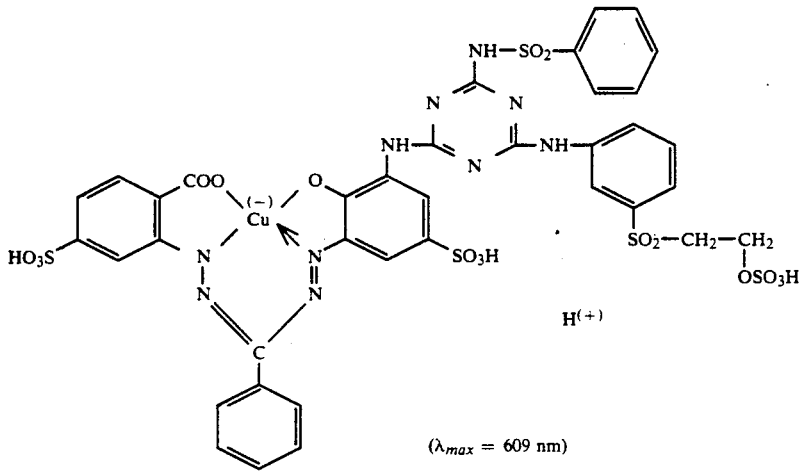

($\lambda_{max}$ = 609 nm)

as a dark powder containing electrolyte salt. The compound according to the invention has very good dyestuff properties and dyes the materials mentioned in the description in blue shades having a weakly reddish tinge. Especially cellulose fiber materials, such as cotton, and regenerated cellulose fiber materials are dyed by the application and fixing methods customary in the art for fiber-reactive dyestuffs in dark shades, for example from an aqueous, long liquor at 40° to 80° C. in the presence of an acid-binding agent. Similarly, very high color yields are obtained in the cold pad-batch processes. Following customary aftertreatment, for example 10 minutes' soaping and rinsing with water, the dyeings obtained according to the invention are notable for very good light fastness properties in the dry state and also when moistened with tap water or an alkaline or acid perspiration solution and for good wet fastness properties, such as wash, chlorinated water, chlorine bleach, alkali, perspiration and peroxide fastness properties. Furthermore, they show good acid fading resistance, and the dyeings are readily dischargeable. Of particular note are the very high buildup capacity and the high rates of fixation in the exhaust and pad process.

EXAMPLE 504 a) 18.4 parts of cyanuric chloride are suspended with or without a nonionic auxiliary in a mixture of 50 parts of water and 50 parts of ice, then an aqueous solution of 16 parts of benzenesulfonamide in 100 parts of water is added while a temperature of 0° to 5° C. and a pH of 10 to 11 are maintained, and the batch is subsequently stirred until free cyanuric chloride is no longer detectable.

b) To the optionally clarified solution of the mono-condensation product obtained according to a) is added an aqueous solution, prepared according to Example 503a to 503b and adjusted to pH 5, of the amino copper complex formazan compound, the batch is heated to 30° to 40° C. and maintained at that temperature at a pH of 5 to 7 by means of aqueous 10% strength sodium carbonate solution until the condensation reaction of the dichlorotriazinylamino compound with the amino group of the copper complex formazan compound has ended.

The monochlorotriazine compound obtained is identical to that of Example 503d and can be reacted analogously to the directions of the preceding example by further reaction with 3-(β-sulfatoethylsulfonyl)aniline to form the copper complex formazan compound of Example 503 according to the invention. The novel formazan compound thus obtained has similar dyestuff properties.

EXAMPLE 505 a) 18.4 parts of cyanuric chloride are suspended with or without a nonionic auxiliary in a mixture of 100 parts of water and 100 parts of ice, then 16 parts of benzenesulfonamide are added while a temperature of 0° to 5° C. and a pH of 10 to 11 are maintained, and the batch is subsequently stirred for about one hour until free cyanuric chloride is no longer detectable.

The batch is then adjusted to pH 6.

b) To the optionally clarified solution of the mono-condensation product obtained according to a) is added a solution of 28 parts of 3-(β-sulfatoethylsulfonyl)aniline in 200 parts of water and the batch is heated to a temperature of 40° to 60° C. while pH 5 is maintained. Then an aqueous solution, prepared according to the preceding Example 503a to 503b and adjusted to pH 5, of the amino copper complex formazan compound is added and the pH is maintained at 3.5 to 5 for 4 hours.

The novel formazan compound thus obtained has similar dyestuff properties to the copper complex formazan compound obtained according to Example 503d.

EXAMPLE 506

To prepare a copper complex formazan compound according to the invention the procedure of Example 503 is followed, except that the hydrazone used in Example 503a is replaced with the equivalent amount of the hydrazone of 2-hydroxy-5-sulfophenylhydrazine and benzaldehyde.

This gives the alkali metal salt (sodium or potassium salt) of the compound of the formula

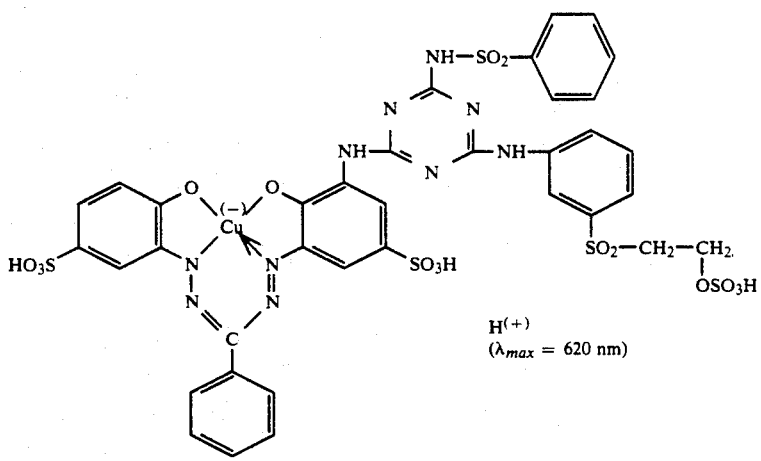

H(+)
(λ_max = 620 nm)

as a dark powder containing electrolyte salt. The compound according to the invention likewise has very good fiber-reactive dyestuff properties and dyes the materials mentioned in the description, in particular cellulose fiber materials, in strong blue shades having good fastness properties.

EXAMPLES 507 to 570

The Table Examples which follow describe further copper complex formazan compounds according to the invention with the aid of the formula (D)

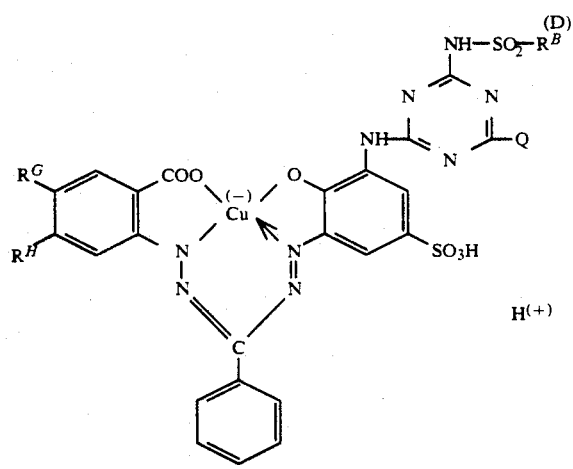

(D)

H(+)

They can be prepared according to the invention, for example analogously to the Embodiment Examples 503, 504 and 505, with the aid of the components discernible from the formula (D) and the particular Table Example (cyanuric chloride, 2-carboxy-5-sulfo- or -4-sulfo-phenylhydrazine, benzaldehyde, the diazonium salt of 6-acetylamino-4-sulfo-2-aminophenol, the amine conforming to the formula H-Q and the sulfonamide of the formula $H_2N-SO_2-R^B$ where the meanings are as specified in the particular Table Example). They likewise have very good fiber-reactive dyestuff properties and produce by the dyeing and printing methods customary for fiber-reactive dyestuffs, in particular on cellulose fiber materials, strong, fast dyeings and prints having the hue on cotton indicated in the particular Table Example.

| | | | Compounds conforming to formula (D) | | |
|---|---|---|---|---|---|
| Ex. | $R^G$ | $R^H$ | Radical $R^B$ | Radical Q | Hue |
| 507 | sulfo | hydrogen | methyl | 3-(β-sulfatoethylsulfonyl)-phenylamino | blue (610) |
| 508 | sulfo | hydrogen | ethyl | 3-(β-sulfatoethylsulfonyl)-phenylamino | blue (610) |
| 509 | sulfo | hydrogen | methyl | N-ethyl-4-(β-sulfatoethylsulfonyl)-phenylamino | blue (610) |
| 510 | sulfo | " | ethyl | N-ethyl-4-(β-sulfatoethylsulfonyl)-phenylamino | blue (610) |
| 511 | sulfo | " | phenyl | N-ethyl-4-(β-sulfatoethylsulfonyl)-phenylamino | blue (610) |
| 512 | sulfo | hydrogen | phenyl | 4-(β-sulfatoethylsulfonyl)-phenylamino | blue (610) |
| 513 | sulfo | hydrogen | methyl | 4-(β-sulfatoethylsulfonyl)-phenylamino | blue (610) |
| 514 | sulfo | hydrogen | ethyl | 4-(β-sulfatoethylsulfonyl)-phenylamino | blue (610) |

-continued

Compounds conforming to formula (D)

| Ex. | $R^G$ | $R^H$ | Radical $R^B$ | Radical Q | Hue |
|---|---|---|---|---|---|
| 515 | sulfo | hydrogen | methyl | 2-methoxy-5-($\beta$-sulfatoethyl-sulfonyl)-phenylamino | blue (610) |
| 516 | sulfo | " | ethyl | 2-methoxy-5-($\beta$-sulfatoethyl-sulfonyl)-phenylamino | blue (610) |
| 517 | sulfo | " | phenyl | 2-methoxy-5-($\beta$-sulfatoethyl-sulfonyl)-phenylamino | blue (610) |
| 518 | sulfo | " | butyl | 2-methoxy-5-($\beta$-sulfatoethyl-sulfonyl)-phenylamino | blue (610) |
| 519 | sulfo | hydrogen | methyl | 4-methoxy-3-($\beta$-sulfatoethyl-sulfonyl)-phenylamino | blue (610) |
| 520 | sulfo | " | ethyl | 4-methoxy-3-($\beta$-sulfatoethyl-sulfonyl)-phenylamino | " |
| 521 | sulfo | " | phenyl | 4-methoxy-3-($\beta$-sulfatoethyl-sulfonyl)-phenylamino | " |
| 522 | sulfo | hydrogen | methyl | 4-methyl-3-($\beta$-sulfatoethyl-sulfonyl)-phenylamino | blue (610) |
| 523 | sulfo | " | ethyl | 4-methyl-3-($\beta$-sulfatoethyl-sulfonyl)-phenylamino | " |
| 524 | sulfo | " | phenyl | 4-methyl-3-($\beta$-sulfatoethyl-sulfonyl)-phenylamino | " |
| 525 | sulfo | hydrogen | methyl | 2-($\beta$-sulfatoethylsulfonyl)-phenylamino | blue (610) |
| 526 | sulfo | " | ethyl | 2-($\beta$-sulfatoethylsulfonyl)-phenylamino | " |
| 527 | sulfo | " | phenyl | 2-($\beta$-sulfatoethylsulfonyl)-phenylamino | " |
| 528 | sulfo | hydrogen | methyl | N-ethyl-3-($\beta$-sulfato-ethylsulfonyl)-phenylamino | blue (610) |
| 529 | sulfo | " | ethyl | N-ethyl-3-($\beta$-sulfato-ethylsulfonyl)-phenylamino | " |
| 530 | sulfo | " | phenyl | N-ethyl-3-($\beta$-sulfato-ethylsulfonyl)-phenylamino | " |
| 531 | hydrogen | sulfo | methyl | 3-($\beta$-sulfatoethylsulfonyl)-phenylamino | blue (616) |
| 532 | " | sulfo | ethyl | 3-($\beta$-sulfatoethylsulfonyl)-phenylamino | " |
| 533 | " | sulfo | phenyl | 3-($\beta$-sulfatoethylsulfonyl)-phenylamino | " |
| 534 | hydrogen | sulfo | methyl | 2-methoxy-5-($\beta$-sulfatoethyl-sulfonyl)-phenylamino | blue (616) |
| 535 | " | sulfo | ethyl | 2-methoxy-5-($\beta$-sulfatoethyl-sulfonyl)-phenylamino | " |
| 536 | " | sulfo | phenyl | 2-methoxy-5-($\beta$-sulfatoethyl-sulfonyl)-phenylamino | " |
| 537 | sulfo | hydrogen | methyl | 3,4-di-($\beta$-sulfatoethylsulfonyl)-phenylamino | blue (610) |
| 538 | sulfo | " | ethyl | 3,4-di-($\beta$-sulfatoethylsulfonyl)-phenylamino | " |
| 539 | sulfo | " | phenyl | 3,4-di-($\beta$-sulfatoethylsulfonyl)-phenylamino | " |
| 540 | sulfo | hydrogen | methyl | 2-carboxy-5-($\beta$-sulfatoethyl-sulfonyl)-phenylamino | blue (610) |
| 541 | sulfo | " | ethyl | 2-carboxy-5-($\beta$-sulfatoethyl-sulfonyl)-phenylamino | " |
| 542 | sulfo | " | m-sulfo-phenyl | 2-carboxy-5-($\beta$-sulfatoethyl-sulfonyl)-phenylamino | " |
| 543 | sulfo | " | phenyl | 2-carboxy-5-($\beta$-sulfatoethyl-sulfonyl)-phenylamino | " |
| 544 | sulfo | hydrogen | methyl | 3-{bis-N,N-[$\beta$-($\beta'$-sulfatoethyl-sulfonyl)-ethyl]}-carbamoyl-phenylamino | blue (610) |
| 545 | sulfo | " | ethyl | 3-{bis-N,N-[$\beta$-($\beta'$-sulfatoethyl-sulfonyl)-ethyl]}-carbamoyl-phenylamino | " |
| 546 | sulfo | " | phenyl | 3-{bis-N,N-[$\beta$-($\beta'$-sulfatoethyl-sulfonyl)-ethyl]}-carbamoyl-phenylamino | " |
| 547 | sulfo | hydrogen | methyl | $\gamma$-($\beta'$-sulfatoethylsulfonyl)-propylamino | blue (608) |
| 548 | sulfo | " | ethyl | $\gamma$-($\beta'$-sulfatoethylsulfonyl)-propylamino | " |
| 549 | sulfo | " | phenyl | $\gamma$-($\beta'$-sulfatoethylsulfonyl)-propylamino | " |
| 550 | sulfo | hydrogen | methyl | $\gamma$-($\beta'$-chloroethylsulfonyl)-propyl | blue (608) |
| 551 | sulfo | " | ethyl | $\gamma$-($\beta'$-sulfatoethylsulfonyl)-propyl | " |
| 552 | sulfo | " | phenyl | $\gamma$-($\beta'$-sulfatoethylsulfonyl)-propyl | " |
| 553 | sulfo | hydrogen | methyl | $\gamma$-(vinylsulfonyl)-propylamino | blue (608) |

-continued

Compounds conforming to formula (D)

| Ex. | $R^G$ | $R^H$ | Radical $R^B$ | Radical Q | Hue |
|---|---|---|---|---|---|
| 554 | sulfo | " | ethyl | " | " |
| 555 | sulfo | " | phenyl | " | " |
| 556 | sulfo | hydrogen | methyl | β-(β'-sulfatoethylsulfonyl)-ethylamino | blue (608) |
| 557 | sulfo | " | ethyl | β-(β'-sulfatoethylsulfonyl)-ethylamino | " |
| 558 | sulfo | " | phenyl | β-(β'-sulfatoethylsulfonyl)-ethylamino | " |
| 559 | sulfo | hydrogen | methyl | β-(β'-chloroethylsulfonyl)-ethylamino | blue (608) |
| 560 | sulfo | " | ethyl | β-(β'-chloroethylsulfonyl)-ethylamino | " |
| 561 | sulfo | " | phenyl | β-(β'-chloroethylsulfonyl)-ethylamino | " |
| 562 | sulfo | hydrogen | methyl | β-(vinylsulfonyl)-ethylamino | blue (608) |
| 563 | sulfo | " | ethyl | " | " |
| 564 | sulfo | " | phenyl | " | " |
| 565 | sulfo | hydrogen | methyl | β-[β'-(vinylsulfonyl)-ethoxy]-ethylamino | blue (608) |
| 566 | sulfo | " | ethyl | β-[β'-(vinylsulfonyl)-ethoxy]-ethylamino | " |
| 567 | sulfo | " | phenyl | β-[β'-(vinylsulfonyl)-ethoxy]-ethylamino | " |
| 568 | sulfo | hydrogen | methyl | β-[4-(β'-sulfatoethylsulfonyl)-phenyl]-ethylamino | blue (608) |
| 569 | sulfo | " | ethyl | β-[4-(β'-sulfatoethylsulfonyl)-phenyl]-ethylamino | " |
| 570 | sulfo | " | phenyl | β-[4-(β'-sulfatoethylsulfonyl)-phenyl]-ethylamino | " |

EXAMPLE 571 a) 18.4 parts of cyanuric chloride are suspended with or without a nonionic auxiliary in a mixture of 100 parts of water and 100 parts of ice, then 16 parts of benzenesulfonamide are added while a temperature of 0° to 5° C. and a pH of 10 to 11 are maintained, and the batch is subsequently stirred for about one hour until free cyanuric chloride is no longer detectable.

The batch is then adjusted to pH 6.

b) To the optionally clarified solution of the monocondensation product obtained according to a) is added a solution of 28 parts of 3-(β-sulfatoethylsulfonyl)aniline in 200 parts of water and the batch is heated to a temperature of 40° to 60° C. while pH 5 is maintained. Then an aqueous solution, prepared according to the preceding Example 503a to 503b and adjusted to pH 5, of the amino copper complex formazan compound is added and the pH is maintained at 3.5 to 5 for 4 hours.

The novel formazan compound thus obtained has similar dyestuff properties to the copper complex formazan compound obtained according to Example 503d.

EXAMPLE 572

To prepare a copper complex formazan compound according to the invention the procedure of Example 503 is followed, except that the hydrazone used in Example 503a is replaced with the equivalent amount of the hydrazone of 2-hydroxy-5-sulfophenylhydrazine and benzaldehyde.

This gives the alkali metal salt (sodium or potassium salt) of the compound of the formula

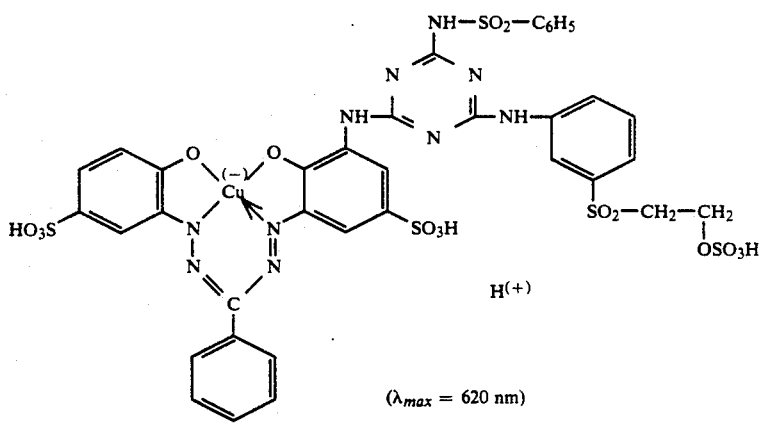

($\lambda_{max}$ = 620 nm)

as a dark powder containing electrolyte salt. The compound according to the invention likewise has very good fiber-reactive dyestuff properties and dyes the materials mentioned in the description, in particular cellulose fiber materials, in strong blue shades having good fastness properties.

What is claimed is:

1. A water-soluble dyestuff corresponding to the formula

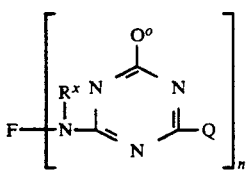

(1)

in which:

F is the radical of monoazo, disazo or polyazo dyestuff or of a heavy metal complex azo dyestuff or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbidimide dyestuff;

$R^x$ is hydrogen or alkyl having 1 to 4 carbon atoms unsubstituted or substituted by halogen, hydroxy, cyano, alkoxy having 1 to 4 carbon atoms, alkoxycarbonyl having 2 to 5 carbon atoms, carboxy, sulfamoyl, sulfo or sulfato;

n is the number 1 or 2;

Q is a group of the formula (2a) or (2b)

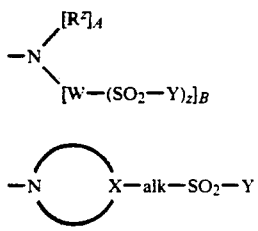

in which $R^z$ is hydrogen or alkyl group having 1 to 4 carbon atoms unsubstituted or substituted by halogen, hydroxy, cyano, alkoxy having 1 to 4 carbon atoms, carboxy, sulfamoyl, sulfo or sulfato or by phenyl unsubstituted or substituted by substituents from the group consisting of halogen, alkoxy having 1 to 4 carbon atoms, alkyl having 1 to 4 carbon atoms, sulfo and carboxy, or is cyclohexyl or is phenyl unsubstituted or substituted by substituents from the group consisting of halogen, alkoxy having 1 to 4 carbon atoms, alkyl having 1 to 4 carbon atoms, sulfo and carboxy, W is an optionally substituted arylene or an alkylene-arylene or arylene-alkylene or alkylene-arylene-alkylene or arylene-alkylene-arylene, in which the alkylenes are those having 1 to 8 carbon atoms and are unsubstituted or substituted and the arylenes are optionally substituted phenylenes or naphthylenes, and in which the alkylenes are not interrupted or are interrupted by one or more hetero groups selected from groups of the formula —NH—, —N(R)— with R being alkyl having 1 to 4 carbon atoms being unsubstituted or substituted by sulfo, sulfato, carboxy or phosphato, —SO$_2$—, —CO—, —NH—SO$_2$—, —NH—CO—, —SO$_2$—NH— and —CO—NH—, or the alkylene and arylene portions in the combined arylene/alkylene radicals are interrupted by such a hetero group, Y is vinyl, β-sulfatoethyl, β-thiosulfatoethyl, β-phosphatoethyl, β-alkanoyloxy-ethyl having 2 to 5 carbon atoms in the alkanoyl, β-benzoyloxyethyl, β-(sulfobenzoyloxy)-ethyl, β-(p-toluenesulfonyloxy)-ethyl or β-halogenoethyl, z is the number 1 or 2, A is the number zero or 1 and B is the number 1 or 2, in which the sum of (A+B) equals the number 2, and in which, in the case where B is 2, the groups of the formula —W—(SO$_2$—Y)$_z$ can have the same meaning as one another or a different meaning from one another, X together with the N atom forms the bivalent radical of a heterocyclic ring consisting of 1 or 2 alkylene groups having 1 to 5 carbon atoms and optionally 1 or 2 of the hetero groups mentioned above, and alk is an alkylene having 1 to 4 carbon atoms;

Q° is a group of the general formula (2A)

(2A)

in which $R^A$ is hydrogen or alkyl of 1 to 4 carbon atoms unsubstituted or substituted, or is an aryl unsubstituted or substituted, and $R^B$ is an optionally substituted ayrl, alkylene-aryl, arylene-alkyl, alkylene-arylene-alkyl or arylene-alkylene-aryl, wherein the optionally substituted alkylenes are those of 1 to 8 carbon atoms and the optionally substituted alkyls are those of 1 to 6 carbon atoms, and the arylenes and aryls are optionally substituted phenylenes or naphthylenes, respectively optionally substituted phenyls or naphthyls, and wherein the alkylenes or alkyls are not interrupted or are interrupted by one or more of the above-mentioned hetero groups or wherein the alkylene, alkyl, arylene and aryl moieties in the combined alkyl(ene)/aryl(ene) radicals are separated from one another by such a hetero group, or $R^B$ is an amino group of the formula —NR$^C$R$^D$, where $R^C$ and $R^D$ are each independently of one another hydrogen or alkyl of 1 to 4 carbon atoms unsubstituted or substituted by sulfo, carboxy, sulfato, phenyl, cyano, nitro, chlorine or bromine, or $R^B$ is an optionally methyl-monosubstituted, -disubstituted or -trisubstituted cycloalkyl of 5 to 8 carbon atoms or an optionally sulfo-monosubstituted, -disubstituted or -trisubstituted naphthyl or is a phenyl unsubstituted or substituted by 1 to 3 substituents selected from the group consisting of alkyl of 1 to 4 carbon atoms, alkoxy of 1 to 4 carbon atoms, halogen, carboxy, nitro and sulfo.

2. A dyestuff as claimed in claim 1, wherein $R^x$ is methyl, ethyl or hydrogen.

3. A dyestuff as claimed in claim 1, wherein Q is a group of the formula —W$^1$—SO$_2$—Y, in which W$^1$ is an alkylene of 2 or 4 carbon atoms or a phenylene unsubstituted or substituted by 1 or 2 substituents selected from the group consisting of methyl, methoxy, ethoxy and chlorine.

4. A dyestuff as claimed in claim 1, wherein Y is β-sulfatoethyl.

5. A dyestuff as claimed in claim 1, wherein n is 1.

6. A dyestuff as claimed in claim 1, wherein $R^x$ is hydrogen.

7. In a process for dyeing or printing a material, containing hydroxy and/or carboxyamide groups, in which a dyestuff is applied to the material or introduced into the material and is fixed by means of heat or by means of an acid-binding agent or by both measures, the improvement consisting of applying as the dyestuff a dyestuff as claimed in claim 1.

* * * * *

UNITED STATES PATENT AND TRADEMARK OFFICE
CERTIFICATE OF CORRECTION

PATENT NO. : 5,231,172
DATED : July 27, 1993
INVENTOR(S) : Thomas Beck, et al

It is certified that error appears in the above-indentified patent and that said Letters Patent is hereby corrected as shown below:

In column 1, formula 1, "O°" should read --Q°--.

In claim 1, column 119, line 5 (formula 1) "O°" should read --Q°--.

Signed and Sealed this

Fifth Day of July, 1994

BRUCE LEHMAN

*Attest:*

*Attesting Officer*         *Commissioner of Patents and Trademarks*